US008489374B2

(12) United States Patent
Dogru

(10) Patent No.: US 8,489,374 B2
(45) Date of Patent: Jul. 16, 2013

(54) THREE DIMENSIONAL WELL BLOCK RADIUS DETERMINER MACHINE AND RELATED COMPUTER IMPLEMENTED METHODS AND PROGRAM PRODUCTS

(75) Inventor: Ali Haydar Dogru, Dhahran (SA)

(73) Assignee: Saudi Arabian Oil Company (SA)

( * ) Notice: Subject to any disclaimer, the term of this patent is extended or adjusted under 35 U.S.C. 154(b) by 796 days.

(21) Appl. No.: 12/611,209

(22) Filed: Nov. 3, 2009

(65) Prior Publication Data

US 2010/0114544 A1    May 6, 2010

Related U.S. Application Data

(60) Provisional application No. 61/110,824, filed on Nov. 3, 2008.

(51) Int. Cl.
*G06G 7/48* (2006.01)
(52) U.S. Cl.
USPC ............................................................ 703/10
(58) Field of Classification Search
USPC ...................................................... 703/9, 10
See application file for complete search history.

(56) References Cited

U.S. PATENT DOCUMENTS

| | | | |
|---|---|---|---|
| 6,766,255 | B2 | 7/2004 | Stone |
| 6,945,095 | B2 | 9/2005 | Johansen |
| 7,096,122 | B2 | 8/2006 | Han |
| 7,177,764 | B2 | 2/2007 | Stone |
| 7,257,491 | B2 | 8/2007 | Despax |
| 7,430,500 | B2 | 9/2008 | Lei et al. |
| 2008/0120036 | A1 | 5/2008 | Kimminau et al. |
| 2008/0167849 | A1 | 7/2008 | Hales et al. |
| 2008/0235280 | A1* | 9/2008 | Schoen et al. ............. 707/104.1 |
| 2008/0288172 | A1 | 11/2008 | Stone |
| 2009/0205819 | A1* | 8/2009 | Dale et al. ................ 166/250.01 |

OTHER PUBLICATIONS

Jones Shu (Comparison of Various Techniques for computing well index, 2005).*
Engineering Manual (Analysis of single Wells, chap.4, 1992).*
Louis J. Durlofsky, (An Approximate Model for Well Productivity in Heterogeneous Porous Media, 2000).*
International Preliminary Report on Patentability from PCT/US2009/062914 mailed on May 12, 2011.
Dogru, Ali H., Equivalent Well Block Radius for Three Dimensional Flow, SPE International, 2008, pp. 1-28, SPE 118845.

(Continued)

*Primary Examiner* — David Silver
*Assistant Examiner* — Andre Pierre Louis
(74) *Attorney, Agent, or Firm* — Bracewell & Giuliani LLP

(57) ABSTRACT

Three dimensional well block radius determiner machines, systems, program products, and computer implemented methods are provided to determine a three dimensional equivalent well block radius of a perforated grid block cell, with three dimensional flow, of a three dimensional coordinate grid block constructed over a three dimensional simulated well formation in a finite difference petroleum reservoir simulator. Various embodiments of the invention, for example, can beneficially account for both horizontal and vertical flow of oil through a well perforation without the need for complicated, expensive, and time-consuming numerical or iterative solutions. Embodiments of the present invention, for example, can be used as a part of legacy simulators thereby providing more accurate well block radius calculations, by accounting for both horizontal and vertical perforation flow, without introducing significant implementation hurdles, development costs, or simulation runtime delays.

32 Claims, 23 Drawing Sheets

OTHER PUBLICATIONS

Peaceman, Donald W., Interpretation of Wellblock Pressures in Numerical Reservoir Simulation: Part 3—Off-Center and Multiple Wells within a Wellblock, SPE Reservoir Engineering, May 1990, pp. 227-232.

Peaceman, D.W., Interpretation of Well-Block Pressures in Numerical Reservoir Simulation, Exxon Production Research Co. Houston, Jun. 1978, pp. 183-194 (inclusive of pp. 1-4 of SPE 6988).

Wolfsteiner, Christian., Approximate Model for Productivity of Nonconventional Wells in Heterogeneous Reservoirs, SPE Journal 5 (2), Jun. 2000, pp. 218-226.

Dogru, A.H., A Parallel Reservoir Simulator for Large-Scale Reservoir Simulation, SPE Reservoir Evaluation & Engineering, Feb. 2002, pp. 11-23.

Muskat, Morris., Physical Principles of Oil Production, International Human Resources Development Corporation, Oct. 24, 1983, Boston.

* cited by examiner

| Perforated layer | Grid : 85x85x11 True Solution Rate B/d | Grid : 5x5x11 2-D Well Index | | Grid : 5x5x11 3-D Well Index | |
|---|---|---|---|---|---|
| | | Rate/d | Error,% | Rate/d | Error,% |
| 1 | 2,550 | 1733 | 37 | 2,625 | 4 |
| 6 | 2,875 | 1790 | 37 | 2,712 | 4 |
| 11 | 2,919 | 1846 | 37 | 2,796 | 4 |

*FIG. 27*

| Perforated layers | Grid : 85x85x11 True Solution Rate B/d | Grid : 5x5x11 2-D Well Index | | Grid : 5x5x11 3-D Well Index | |
|---|---|---|---|---|---|
| | | Rate/d | Error,% | Rate/d | Error,% |
| 1,2,3,4 | 8,100 | 6,553 | 19 | 8,000 | 2.0 |
| 5,6,7,8 | 8,365 | 6,685 | 20 | 8,117 | 1.8 |
| 9,10,11 | 8,484 | 6,852 | 20 | 8,350 | 1.5 |

*FIG. 28*

THREE DIMENSIONAL WELL BLOCK RADIUS DETERMINER MACHINE AND RELATED COMPUTER IMPLEMENTED METHODS AND PROGRAM PRODUCTS

RELATED APPLICATIONS

This application claims priority to and the benefit of U.S. patent application Ser. No. 61/110,824 which is hereby incorporated herein by reference in its entirety.

BACKGROUND OF THE INVENTION

1. Field of the Invention

The invention generally relates to the field of well management and petroleum reservoir simulation. More specifically, this invention generally relates to the determination of an equivalent well block radius that takes into consideration the effects of three dimensional flow.

2. Description of Related Art

In the petroleum industry, well management techniques, such as reservoir simulation, are used to predict the future performance of a reservoir. Generally, well management techniques allow reservoir simulation engineers to research, investigate, analyze, and evaluate different field-development schemes, hydrocarbon-depletion strategies, pressure-maintenance requirements, and drilling and workover rig time estimates. Such research, investigation, analysis, and evaluation assists well managers in developing producing strategies. A typically producing strategy considers when and how to initiate actions such as workovers, shut-ins, drilling, connecting a well to a surface facility, or abandoning a well.

Since the development of early parallel computers, the oil industry has focused on the attractive speed of such machines to solve complicated well management problems. Initial inquiries and research focused on the preliminary question of whether it would even be possible to develop a truly parallel reservoir simulator. Contrary to seismic imaging algorithms and processes, it is well known by those skilled in the art that petroleum reservoir simulator algorithms are not naturally parallel as they are more recursive in nature and variables in such simulators are strongly interdependent on each other. Particularly, variables tend to display strong coupling and nonlinearity. If parallel code could be developed, the speed of computations in a reservoir simulator would increase by at least an order of magnitude, and as a result, reservoir simulators could handle larger and more complex scenarios. Beneficially, parallel code was subsequently developed for reservoir simulators that ultimately aided in the understanding of fluid flow in a complex reservoir. Moreover, parallelization of reservoir simulators provided an avenue to properly model and understand reservoir heterogeneities which resulted ultimately in more accurate well management predictions.

Parallelized reservoir simulators typically divide a simulated reservoir field into a series of blocks or grid cells. For example, a grid size of fifty (50) meters or less is often used for small and medium-size reservoir simulations. By contrast, simulations of many of the world's largest reservoirs, such as the giant reservoirs in the Middle East, use grid block sizes of 250 meters or larger. Even with such large grid block sizes, a model of such giant reservoirs can easily result in a need to process and analyze more than one (1) million grid block cells. Furthermore, each of these one (1) million or more cells can be perforated at the cell boundaries thereby resulting in three dimensional flow (i.e., both horizontal and vertical flow) of petroleum through and across one or more of the grid cells. Particularly, it is well known that for partially completed wells the bottom perforations are subject to strong vertical flow. Accordingly well prediction measurements and analysis should take into account vertical flow as well as horizontal flow in order to increase the accuracy of such well predictions in a parallel reservoir simulator.

As an example, water and gas coning is frequently encountered in oil wells. Gas coning is the tendency of gas in a gas-drive reservoir to push oil downward in an inverse code contour toward casing perforations. In extreme conditions, gas, not oil, will be produced from the well. Water coning is the change in the oil-water contact profiles as a result of drawdown pressures during production. Coning often occurs in vertical or slightly deviated wells and is affected by the characteristics of the fluids involved and the ratio of horizontal to vertical permeability. For such wells, rate calculations by a reservoir simulator are critical in order to design field production rates at certain levels to avoid bottom water coning or gas coning from the gas cap. A determined equivalent well block radius is used to calculate well productivity indices and ultimately production and injection rate of a well, as is known and understood by those skilled in the art. Any errors or inaccuracies in the calculation of the equivalent well block radius will yield erroneous well productivity indices and, accordingly, erroneous well rates. Ultimately, an erroneous equivalent well block radius calculation can lead to inaccurate predictions of water and gas breakthrough times at the wells.

The conventional approach to calculate equivalent well block radiuses for grid block cells in a reservoir simulator, well productivity indices for each well grid block cell, and ultimately production and injection rate of a well, as known and understood by those skilled in the art, only produces accurate results for two dimensional, horizontal well flow. The conventional approach does not take into account flow in the vertical direction. Therefore, for any well where vertical flow is an important factor, the conventional approach will yield erroneous well production or injection rates. For simulations of giant reservoirs, such as those in the Middle East, inaccurate calculations of well block radiuses for over 100 grid block cells can yield disastrously inaccurate results.

There exists in the art a numerical solution, in the form of a software package, for the productivity index and well production rate of an arbitrarily shaped well that does account for three dimensional, or horizontal and vertical, flow. Nevertheless, no specific formula is provided in the art to determine the productivity indices for a well with three dimensional flow. Accordingly, the numerical solution is difficult to calculate and cannot be coded into a reservoir simulator such that it can be easily executed in parallel processes. Furthermore, the existing numerical approach is computationally expensive and difficult to implement in legacy simulators that rely on analytical equations rather than numerical methods.

SUMMARY OF THE INVENTION

For a perforated well grid block cell, if there is any vertical flow from bottom or top of the grid block into the grid block, well indices and thus the well flow rates calculated using the conventional two dimensional approach for a square-grid equivalent well block radius will be in error because the approach does not account for any of the vertical flow. Accordingly, existing approaches either involve a complicated, expensive, and time-consuming numerical solution or an expensive and time-consuming iterative application of the conventional two dimensional approach to determine the equivalent well block radius such wells. Additionally, neither of these current approaches can be easily applied through parallel processing in a parallel finite difference petroleum reservoir simulator. Simply stated, although the existing approaches may, in some limited instances, reduce productivity index calculation errors attributed to the presence of vertical flow through perforated grid block cells, such approaches are computationally expensive and difficult to implement. As used throughout, the terms finite difference petroleum reservoir simulator and petroleum reservoir simulator can each include, for example, a finite difference petroleum reservoir simulator, a parallel petroleum reservoir simulator, a numerical petroleum reservoir simulator, and any other petroleum reservoir simulator now existing or herein after developed as is known and understood by those skilled in the art.

In view of the foregoing, and as petroleum field simulation becomes of even greater importance to energy companies as they strive to tap the potential of more remote mineral deposits using an increasingly elaborate network of wells and reservoirs, applicants recognize a need for a more efficient and computationally inexpensive systems, machine and process for determining a three dimensional equivalent well block which can then beneficially be used to determine well perforation indices and well perforation rates. More particularly, Applicants recognize a need for various machines, systems, computer implemented methods, and program products for determining a three dimensional equivalent well block radius of a petroleum well with three dimensional flow in a finite difference petroleum reservoir simulator. Such machines, systems computer implemented methods, and program products, according to various exemplary embodiments of the present invention, can beneficially account for both horizontal and vertical flow of oil through a well perforation without the need for complicated, expensive, and time-consuming numerical or iterative solutions. Furthermore, the present invention can be applied to any well block grid cell dimension, including large grid cells or entire wells, thereby eliminating the iterative process of prior systems and methods and increasing the computational efficiency of such calculations.

Moreover, such machines, computer implemented methods, and program products can be used, for example, as a part of legacy simulators thereby providing more accurate well block radius calculations, by accounting for both horizontal and vertical perforation flow, without adding significant implementation hurdles, development costs, or runtime delays. Such advancements, according to exemplary embodiments of the present invention, would beneficially allow energy companies to generate more accurate petroleum reservoir simulation models thereby lowering the cost of oil and gas extraction and ultimately the price of energy to consumers. Computationally efficient well block radius determinations, that take into account both horizontal and vertical flow through a perforation, may beneficially raise the supply of oil thereby lowering the price at the pump for consumers worldwide. Various machines, computer implemented methods, and computer program products according to exemplary embodiments of the present invention can, for example, further produce more accurate perforation index calculations and perforation rate calculations thereby introducing a significant amount of correction to similar perforation index and perforation rate calculations determined pursuant to current approaches. Therefore, according to various exemplary embodiments of the present invention, field production rates can be more accurately determined to avoid water and gas coning.

Beneficially, embodiments of the present invention, for example, can handle reservoir simulation for complicated scenarios where formation heterogeneity is involved along with non-equal three dimensional coordinate grid cell sizes by employing variable coefficients in the vertical axis, or vertical direction, which can be solved numerically to calculate the new equivalent well block radius. Various exemplary embodiments of the present invention assume that the grid block that contains the well is sufficiently large and the interference effects of the surrounding wells are small. Additionally, embodiments of the present invention also assume that the time step size of the petroleum reservoir simulator in which such embodiment of the present invention is implemented is sufficiently large such that the semi-steady state flow is valid around the well. For many large reservoirs in the world this assumption is valid. In some outlying cases (i.e., very small grid blocks around a well and wells with transient flow conditions), however, such an assumption is not valid.

Particularly, an exemplary embodiment of the present invention provides a three dimensional equivalent well block radius determiner machine to determine a three dimensional equivalent well block radius of a perforation of a well with three dimensional flow in a finite difference petroleum reservoir simulator. The three dimensional equivalent well block radius determiner machine, according to such an exemplary embodiment of the present invention can beneficially include a database storing a three dimensional simulated well formation generated responsive to three dimensional petroleum reservoir simulation data received from a plurality of petroleum reservoir sensors, and a computer adapted to be in communication with the database and having at least a processor and memory. Beneficially, the plurality of petroleum reservoir sensors can include, for example, a total reservoir thickness sensor, a well radius sensor, and a well perforation height sensor. Furthermore, the three dimensional simulated well formation can include one or more well perforations positioned within. As used throughout, a well perforation, as is known and understood by those skilled in the art, is a hole punched in the casing or lining of an oil well to connect the oil well to a reservoir.

Beneficially, the three dimensional simulated well formation can be, for example, a three dimensional computer generated data model of a real well formation based on data gathered from a plurality of petroleum reservoir sensors. Alternatively, the three dimensional simulated well formation, according to an exemplary embodiment of the present invention, can be a three dimensional computer generated data model of a simulated well formation based on data previously generated by one or more petroleum reservoir simulators. The three dimensional simulated well formation can be expressed, for example, as a matrix of data values or expressions corresponding to various sensor readings or simulated data related to a real or simulated petroleum reservoir, respectively. The three dimensional simulated well formation can also, according to an exemplary embodiment of the present invention, be expressed in the form of an array, a linked-list, a matrix, a queue, a stack, a tree, a binary tree, a b-tree, a hash table, a heap, a binomial heap, a set, a disjoint set, or any other data structure now or hereinafter developed as is known or understood by those skilled in the art. Furthermore, the three dimensional well formation data can include, for example, data indicating a total thickness of a reservoir formation, data indicating the radius of a well penetrating through a grid block, and data indicating the vertical height of a well perforation.

Such a three dimensional equivalent well block radius determiner machine according to various exemplary embodiments of the present invention can also include, for example, a grid block constructor computer readable program product, a partial penetration factor determiner computer readable program product, a vertical flow correction factor computer readable program product, and a three dimensional equivalent well block radius determiner computer readable program product. More specifically, the grid block constructor computer readable program product, according to an exemplary embodiment of the present invention, can be stored in a tangible computer readable storage medium and can include instructions that, when executed by the computer, cause the computer to perform the operation of constructing a three dimensional coordinate grid block, as is known and understood by those skilled in the art, over the three dimensional simulated well formation stored in the database. The three dimensional coordinate grid block, as is known and understood by those skilled in the art, can be, for example, a Cartesian coordinate system grid with three dimensions, two in the horizontal plane, length and width, and one in the vertical plane, depth (or height).

Furthermore, the partial penetration factor determiner computer readable program product, according to various exemplary embodiments of the present invention, can be stored, for example, in a tangible computer readable storage medium and can include instructions that, when executed by the computer, cause the computer to perform the operation of determining a partial penetration factor for one of the one or more well perforations responsive to a total quantity count of the one or more well perforations and a ratio of a collective vertical height of the one or more well perforations and a total thickness of the three dimensional coordinate grid block. As is known and understood by those skilled in the art, the total quantity count of the one or more well perforations can be a value representing the number of well perforations positioned within the three dimensional simulated well formation. Additionally, as is known and understood by those skilled in the art, the collective vertical height of the one or more well perforations is the additive total vertical height of all of the well perforations positioned within the three dimensional simulated well formation. For example, if the three dimensional simulated well formation included three perforations, each with a height of ten (10) meters, the collective vertical height of the one or more well perforations would be thirty (30) meters. Furthermore, as is known and understood by those skilled in the art, the total thickness of the three dimensional coordinate grid block is the thickness of the three dimensional coordinate grid block constructed by the grid block constructor computer readable program product measured, for example, from the lowest depth of the three dimensional coordinate grid block to the highest height of the three dimensional coordinate grid block.

Also according to various exemplary embodiments of the present invention, the vertical flow correction factor computer readable program product can be, for example, stored in a tangible computer readable storage medium and can include instructions that, when executed by the computer, cause the computer to perform the operation of determining a vertical flow correction factor for one of the one or more well perforations responsive to the total quantity count of the one or more well perforations and responsive to determining a three dimensional coordinate location of the one of the one or more well perforations positioned within the three dimensional coordinate grid block. As is known and understood by those skilled in the art, the term three dimensional coordinate location, as used herein, means a Cartesian coordinate system location defined in terms of three values, one value for each of the three dimensions of the Cartesian coordinate system. More specifically, as is known and understood by those skilled in the art, the three dimensional coordinate location of the one of the one or more well perforations can be, for example, defined by three values, two of the three values indicating the coordinate location of the one of the one or more well perforations within the horizontal plane of the three dimensional coordinate grid block and the third of the values indicating the coordinate location of the one of the one or more well perforations within the vertical plane of the three dimensional coordinate grid block.

Additionally, the three dimensional equivalent well block radius determiner computer readable program product, according to various exemplary embodiments of the present invention, can, for example, be stored in a tangible computer readable storage medium and can include instructions that, when executed by the computer, cause the computer to perform the operation of determining a three dimensional equivalent well block radius, as is known and understood by those skilled in the art, of the one of the one or more well perforations responsive to determining the partial penetration factor and the vertical flow correction factor. Generally speaking, and as explained in more detail below, the three dimensional equivalent well block radius can beneficially be used to determine a perforation index for the one of the plurality of well perforations and ultimately the perforation rate for the one of the plurality of well perforations include in the three dimensional simulated well formation.

Furthermore, according to various exemplary embodiments of the present invention, the grid block constructor computer readable program product can further include instructions that, when executed by the computer, cause the computer to perform the operation of superimposing a uniform grid positioned over the three dimensional simulated well formation in an areal direction and a uniform grid positioned over the three dimensional simulated well formation in a vertical direction to thereby create a plurality of grid block cells each having equal dimensions in the areal direction and constant thickness in the vertical direction. Furthermore, the three dimensional equivalent well block radius determiner machine, according to exemplary embodiments of the present invention, can further include a well perforation mapping computer readable program product. Such a well perforation mapping computer readable program product, according to an embodiment of the present invention, can be stored in a tangible computer readable storage medium and can include, for example, instructions that, when executed by the computer, cause the computer to perform the operation of mapping each of the one or more well perforations to one of the plurality of grid block cells to thereby define one or more perforated grid block cells. Because each of the one or more well perforations can be beneficially mapped to one of the plurality of grid block cells, the three dimensional equivalent well block radius determiner computer readable program product can beneficially determine a three dimensional well block radius of one of the plurality of grid block cells housing the one of the one or more well perforations responsive to determining the partial penetration factor and the vertical flow correction factor.

Moreover, according to an exemplary embodiment of the present invention, each of the plurality of grid block cells can have a uniform vertical height, thereby defining a uniform vertical height of a grid block cell, and a uniform horizontal length, thereby defining a uniform horizontal length of a grid block cell. Beneficially, according to an exemplary embodiment of the present invention, the uniform vertical height of a grid block cell and the uniform horizontal length of a grid block cell can each be associated with one of the three dimensions of the Cartesian coordinate system used to describe the three dimensional coordinate grid block and the location of each of the plurality of grid block cells positioned within the three dimensional coordinate grid block. Additionally, the three dimensional coordinate grid block can beneficially include a well penetrating through the three dimensional coordinate grid block, and the three dimensional well formation simulation data can include a radius of the well penetrating through the three dimensional coordinate grid block and a vertical height of the one of the one or more well perforations positioned within the one of the one or more perforated grid block cells.

In addition, according to an exemplary embodiment of the present invention, a three dimensional well block radius determiner machine can further include a data initializer computer readable program product stored in a tangible computer readable storage medium. Beneficially, such a data initializer computer readable program product can beneficially include instructions that, when executed by the computer, cause the computer to perform the operations of: (a) determining the uniform vertical height of a grid block cell; (b) determining the uniform horizontal length of a grid block cell; (c) determining a total thickness of the three dimensional coordinate grid block, (d) determining a horizontal well formation permeability of the three dimensional simulated well formation, (e) determining a vertical well formation permeability of the three dimensional simulated well formation, (f) identifying a plurality of grid block cells positioned adjacent to the one of the one or more perforated grid block cells, to thereby define a plurality of adjacent grid block cells, and (g) mapping a depth of the one of the one or more perforated grid block cells and each of the plurality of adjacent grid block cells positioned within the three dimensional coordinate grid block. Furthermore, according to various exemplary embodiments of the present invention, the three dimensional coordinate location of the one of the one or more perforated grid block cells and the plurality of three dimensional coordinate locations of each of the plurality of adjacent grid block cells can each include at least a horizontal coordinate location and a vertical coordinate location. Beneficially, according to an exemplary embodiment of the present invention, the horizontal coordinate location and the vertical coordinate location can each be associated with one of the three dimensions of the Cartesian coordinate system used to describe the three dimensional coordinate grid block and the location of each of the plurality of grid block cells positioned within the three dimensional coordinate grid block.

Also according to various exemplary embodiments of the present invention, the partial penetration factor for the one of the one or more well perforations can be determined, for example, responsive to determining the uniform vertical height of a grid block cell, the total thickness of the three dimensional coordinate grid block, and responsive to the radius of the well penetrating through the three dimensional coordinate grid block and the vertical height of the one of the one or more well perforations. Furthermore, the vertical flow correction factor for the one of the one or more perforated grid block cells, according to various exemplary embodiments of the present invention, can be determined responsive to determining the uniform vertical thickness of a grid block cell and the uniform horizontal length of a grid block cell and responsive to mapping the depth of each of the one of the one or more perforated grid block cells and each of the plurality of adjacent grid block cells positioned within the three dimensional coordinate grid block.

In a particular exemplary embodiment of the present invention, the one or more perforated grid block cells can be only one perforated grid block cell housing one well perforation. Furthermore, the three dimensional coordinate grid block can beneficially include, by way of example, a plurality of top three dimensional coordinate locations defining a top of the three dimensional coordinate grid block, a plurality of bottom three dimensional coordinate locations defining a bottom of the three dimensional coordinate grid block, and a plurality of middle three dimensional coordinate locations defining locations positioned in between the plurality of top three dimensional coordinate locations and the plurality of bottom three dimensional coordinate locations, to thereby define a middle of the three dimensional coordinate grid block.

In such an exemplary embodiment of the present invention, the three dimensional equivalent well block radius determiner computer readable program product can further include instructions that, when executed by the computer, cause the computer to perform the operation of determining whether the one of the one or more perforated grid block cells is positioned within the three dimensional coordinate grid block at the top of the three dimensional coordinate grid block, the bottom of the three dimensional coordinate grid block, or the middle of the three dimensional coordinate grid block. Furthermore, the vertical flow correction factor for the one of the one or more perforated grid block cells can be beneficially determined responsive to the uniform vertical height of a grid block cell, the uniform horizontal length of a grid block cell, the vertical coordinate location of the one of the one or more perforated grid block cells, the horizontal coordinate location of the one of the one or more perforated grid block cells, responsive to mapping the plurality of adjacent grid block cells, and responsive to determining whether the one of the one or more perforated grid block cells is positioned at the top of the three dimensional coordinate grid block, the bottom of the three dimensional coordinate grid block, or the bottom of the three dimensional grid block.

Exemplary embodiments according to the present invention also provide a three dimensional equivalent well block radius determiner machine to determine a three dimensional equivalent well block radius of a perforated grid block cell, with three dimensional flow, of a three dimensional coordinate grid block constructed over a three dimensional simulated well formation in a finite difference petroleum reservoir simulator (as known and understood by those skilled in the art). Such a three dimensional equivalent well block radius determiner machine, according to an embodiment of the present invention, can include a first database, a second database, a computer, a simulator initializer computer readable program product, and a three dimensional equivalent well block radius determiner computer readable program product. Beneficially, the first database can be configured to store petroleum reservoir simulation data received from a plurality of petroleum reservoir sensors adapted to receive data describing an anisotropic porous media well formation located within a petroleum reservoir. The second database, by way of example, can be configured to store a three dimensional simulated well formation generated responsive to the well formation simulation data stored in the first database. Furthermore, the computer can have, for example, at least a processor and memory and can be adapted to be in communication with the first and second database.

Beneficially, the simulator initializer computer readable program product can be stored in a tangible computer readable storage medium. Furthermore, such a simulator initializer computer readable program product according to exemplary embodiments of the present invention, can include instructions that, when executed by the computer, cause the computer to perform the operations of: (a) constructing a three dimensional coordinate grid block, having a plurality of grid block cells, over the three dimensional simulated well formation stored in the second database; and (b) mapping, responsive to constructing the three dimensional coordinate grid block, each of the one or more well perforations to one of the plurality of grid block cells to thereby define one or more perforated grid block cells. According to various embodiments of the present invention, the three dimensional simulated well formation can include one or more well perforations, as described above and as is known and understood by those skilled in the art.

Also according to various exemplary embodiments of the present invention, the three dimensional equivalent well block radius determiner computer readable program product can be beneficially stored in a tangible computer readable storage medium. Additionally, such a three dimensional equivalent well block radius determiner computer readable program product can include instructions that, when executed by the computer, cause the computer to perform the operations of determining a partial penetration factor for one of the one or more perforated grid block cells, determining a vertical flow correction factor for the one of the one or more perforated grid block cells, and determining a three dimensional equivalent well block radius of the one of the one or more perforated grid block cells. More specifically, the operation of determining the partial penetration factor for the one of the one or more perforated grid block cells can beneficially be responsive to the operation of constructing the three dimensional uniform square coordinate grid block by the simulator initializer computer readable program product. Additionally, the partial penetration factor for the one of the one or more perforated grid block cells can be based, for example, on a total quantity count (as is known and understood by those skilled in the art) of the one or more well perforations and a ratio of a collective vertical height of the one or more well perforations and a total thickness of the three dimensional coordinate grid block.

Moreover, the operation of determining the vertical flow correction factor for the one of the one or more perforated grid block cells can be, for example, responsive to the operation of constructing the three dimensional coordinate grid block and the operation of mapping each of the one or more well perforations to one of the plurality of grid block cells. More particularly, the vertical flow correction factor for the one of the one or more perforated grid block cells can, for example, be based on the total quantity count of the one or more perforated grid block cells and a three dimensional coordinate location of the one of the one or more perforated grid block cells positioned within the three dimensional uniform square coordinate grid block. Responsive to determining the partial penetration factor and the vertical flow correction factor for the one of the one or more perforated grid block cells, a three dimensional equivalent well block radius can be determined by the three dimensional equivalent well block radius determiner computer readable program product.

Various embodiments of the present invention also beneficially provide a computer readable program product stored in a tangible computer readable storage medium and including instructions that when executed by a computer cause the computer to perform the operation of constructing a three dimensional uniform square coordinate grid block, having a plurality of square grid block cells, over a three dimensional simulated well formation generated responsive to petroleum reservoir simulation data received from a plurality of petroleum reservoir sensors, the three dimensional simulated well formation including one or more well perforations, each of the one or more well perforations being located in one or more perforated square grid block cells. Furthermore, such a computer readable program product according to various embodiments of the present invention can further include instructions that when executed by a computer cause the computer to perform the operation of determining, responsive to constructing the three dimensional uniform square coordinate grid block, a partial penetration factor for one of the perforated square grid block cells based on a total quantity count of the one or more perforated square grid block cells and a ratio of a collective vertical height of the one or more well perforations and a total thickness of the three dimensional uniform square coordinate grid block.

Additionally, a computer readable program product according to various exemplary embodiments of the present invention can further include, for example, instructions that when executed by a computer cause the computer to perform the operation of determining, responsive to constructing the three dimensional uniform square coordinate grid block, a vertical flow correction factor for the one of the one or more perforated square grid block cells based on the total quantity count of the one or more well perforations and a three dimensional coordinate location of the one of the one or more perforated square grid block cells positioned within the three dimensional uniform square coordinate grid block. Also according to an exemplary embodiment of the present invention, a computer readable program product can further include instructions that when executed by a computer cause the computer to perform the operation of determining, responsive to determining the partial penetration factor and the vertical flow correction factor for the one of the one or more perforated square grid block cells, a three dimensional equivalent well block radius of the one of the one or more perforated square grid block cells.

Exemplary embodiments of the present invention also beneficially provide a computer implemented method to determine a three dimensional equivalent well block radius of a perforated square grid block cell, with three dimensional flow, of a well formation in a finite difference petroleum reservoir simulator. Beneficially, the computer implemented method can include the step of generating, by a computer in a first computer process, a three dimensional simulated well formation responsive to information received from a plurality of petroleum reservoir sensors adapted to receive well formation simulation data describing an anisotropic porous media well formation located within a petroleum reservoir. Such a computer implemented method according to exemplary embodiments of the present invention can also include the step of constructing, by the computer in a second computer process, responsive to generating the three dimensional simulated well formation by the computer in the first computer process, a three dimensional uniform square coordinate grid block. Beneficially, the three dimensional uniform square coordinate grid block can have, for example, a plurality of square grid block cells over the three dimensional simulated well formation. Moreover, the three dimensional uniform square coordinate grid block can be formed, according to an exemplary embodiment of the present invention, from a superimposition of a uniform grid positioned over the three dimensional simulated well formation in an areal direction and a uniform grid positioned over the three dimensional simulated well formation in a vertical direction such that each of the resulting plurality of square grid block cells has equal dimensions in the areal direction and constant thickness in the vertical direction.

A computer implemented method according to exemplary embodiments of the present invention can also include the step of counting, by the computer in a third computer process, a quantity of one or more well perforations positioned within the three dimensional uniform square coordinate grid block constructed by the computer in the second computer process.

Each of the one or more well perforations, for example, can be beneficially positioned within one of the plurality of square grid block cells to thereby define one or more perforated square grid block cells. Additionally, according to various exemplary embodiments of the present invention, the computer implemented can further include the step of determining, by the computer in a fourth computer process, responsive to counting the quantity of well perforations by the computer in the third computer process, when the three dimensional uniform square coordinate grid block includes one perforated square grid block cell, a partial penetration factor for the one perforated square grid block cell based on a ratio of a vertical height of the one perforated square grid block cell and a total thickness of the three dimensional uniform square coordinate grid block. Such a computer implemented method can also include, for example, the step of determining, by the computer in a fifth computer process, when the three dimensional uniform square coordinate grid block includes more than one perforated square grid block cells, a partial penetration factor for more than one perforated square grid block cells based on the quantity of well perforations positioned within the three dimensional uniform square coordinate grid block, counted by the computer in the third computer process, and a ratio of a total vertical height of the more than one perforated square grid block cells and a total thickness of the three dimensional uniform square coordinate grid block.

Moreover, a computer implemented method according to embodiments of the present invention can further include the step of mapping, by the computer in a sixth computer process, responsive to counting the quantity of well perforations by the computer in the third computer process, when the three dimensional uniform square coordinate grid block includes one perforated square grid block cell, a three dimensional coordinate location of the one perforated square grid block cell positioned within the three dimensional uniform square coordinate grid block. Additionally, the computer implemented method can beneficially include the step of determining, by the computer in a seventh computer process, when the three dimensional uniform square coordinate grid block includes one perforated square grid block cell, a vertical flow correction factor for one perforated square grid block cell responsive to counting the quantity of well perforations by the computer in the third computer process and mapping the three dimensional coordinate location of the perforated square grid block cell positioned within the three dimensional uniform square coordinate grid block by the computer in the sixth computer process.

Such a computer implemented method can also include, for example, the step of determining, by the computer in an eighth computer process, when the three dimensional uniform square coordinate grid block includes more than one perforated square grid block cells, a vertical flow correction factor for more than one perforated square grid block cells responsive counting the quantity of well perforations by the computer in the third computer process. The computer implemented method can further include the step of determining, by the computer in a ninth computer process, when the three dimensional uniform square coordinate grid block includes one perforated square grid block cell, a three dimensional equivalent well block radius associated of the one perforated square grid block cell responsive to determining, by the computer, the partial penetration factor for the one perforated square grid block cell in the fourth computer process and the vertical flow correction factor for one perforated square grid block cell in the seventh computer process. Furthermore, such a computer implemented method according to various exemplary embodiments of the present invention can include the step of determining, by the computer in a tenth computer process, when the three dimensional uniform square coordinate grid block includes more than one perforated square grid block cells, a three dimensional equivalent well block radius of one of the more than one perforated square grid block cells responsive to determining, by the computer, the partial penetration factor for more than one perforated square grid block cells in the fifth computer process and the vertical flow correction factor for more than one perforated square grid block cells in eighth computer process.

Various embodiments of the present invention can provide numerous benefits, including but not limited to the following: (1) embodiments of the present invention can be implemented in parallel petroleum reservoir simulators; (2) embodiments of the present invention can be implemented in legacy petroleum reservoir simulators do that such legacy petroleum simulators can accurately take into account the effects of vertical flow in addition to horizontal flow without requiring significant modification of legacy petroleum simulator code; (3) embodiments of the present invention take into account vertical flow, in addition to horizontal flow, in determining an equivalent well block radius for a well perforation; (4) embodiments of the present invention can reduce gas and water coning thereby resulting in more efficient and cost-effective production of oil and gas; (4) embodiments of the present invention can increase the accuracy of determined well production indices and well production rates for a perforate grid block cell of a simulated petroleum reservoir well formation; (5) embodiments of the present invention can determine well production indices and well production rates for three dimensional flow without using time-consuming and complicated numerical or iterative approaches; (6) embodiments of the present invention can reduce equivalent well block radius calculation errors attributed to the failure of current approaches to consider and take into account the effects of vertical flow; (7) embodiments the present invention can determine an equivalent well block radius for any well grid block dimension, including large grid cells or entire wells, thereby eliminating the iterative process of current approaches and increasing the computational efficiency of such determinations; (8) embodiments of the present invention can account for vertical as well as horizontal flow of oil through a well perforation without the need for complicated, expensive, and time-consuming numerical or iterative solutions; and (9) embodiments of the present invention increase the accuracy of petroleum reservoir simulations while reducing the cost of such simulations thereby potentially increasing the supply of oil and consequently lowering the price of oil for consumers worldwide.

BRIEF DESCRIPTION OF THE DRAWINGS

So that the manner in which the features and benefits of various embodiments of the invention, as well as others which will become apparent, can be understood in more detail, a more particular description of the various embodiments of the invention can be had by reference to the embodiments thereof which are illustrated in the appended drawings, which form a part of this specification. It is also to be noted, however, that the drawings illustrate only various embodiments of the invention and are therefore not to be considered limiting of the invention's scope as it can include other effective embodiments as well.

FIG. 27 is a data table presenting the results of a two dimensional well perforation index simulator, a three dimensional well perforation index simulator according to an exemplary embodiment of the present invention, and a fine grid well performance index simulator for single well perforations located at the top, middle, and bottom of the well formation according to an exemplary embodiment of the present invention.

FIG. 28 is a data table presenting the results of a two dimensional well perforation index simulator, a three dimensional well perforation index simulator according to an exemplary embodiment of the present invention, and a fine grid well performance index simulator for multiple well perforations located at the top, middle, and bottom of the well formation according to an exemplary embodiment of the present invention.

DETAILED DESCRIPTION

Figure 1:
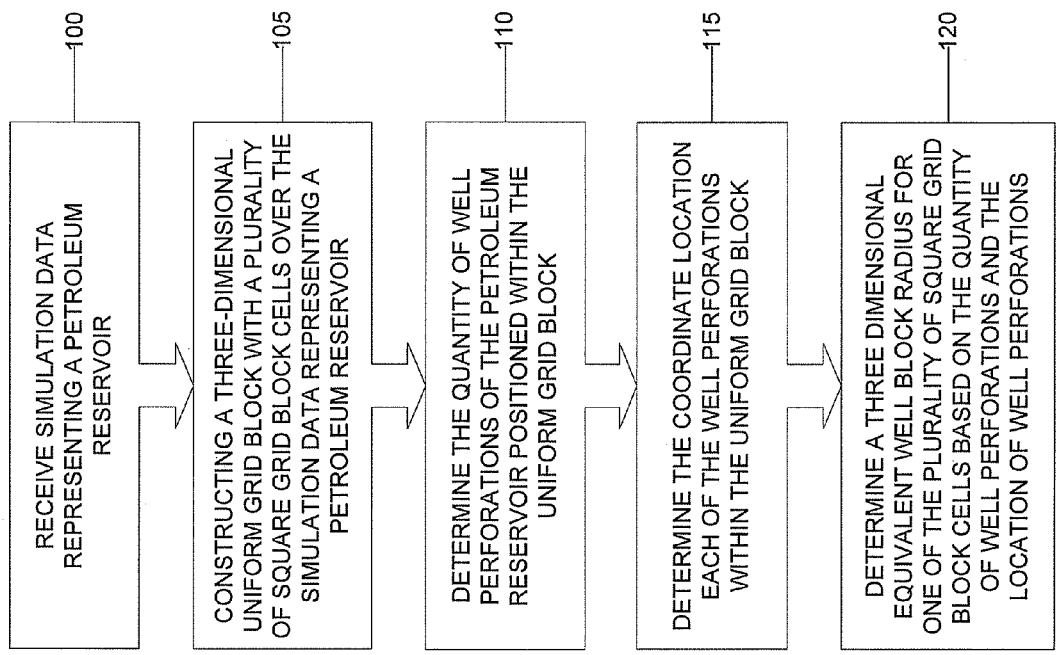
FIG. 1 is a high-level schematic block flow diagram of a computer implemented method to determine a three dimensional equivalent well block radius of a perforated grid block cell of a well in a petroleum reservoir simulator according to an exemplary embodiment of the present invention.

The present invention will now be described more fully hereinafter with reference to the accompanying drawings which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follows, like parts are marked throughout the specification and drawings with the same reference numerals, respectively. The prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

In the drawings and description that follows, like parts are marked throughout the specification and drawings with the same reference numerals, respectively. The drawings are not necessarily to scale. Certain features of the disclosure can be shown exaggerated in scale or in somewhat schematic form and some details of conventional elements can not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below can be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Embodiments of the present invention advantageously provide, for example, systems, machines, computer readable program products, and associated computer implemented methods to determine a three dimensional equivalent well block radius of a perforated grid block cell, with three dimensional flow, of a three dimensional coordinate grid block constructed over a three dimensional simulated well formation in a finite difference petroleum reservoir simulator. As used throughout, the terms finite difference petroleum reservoir simulator and petroleum reservoir simulator can each include, for example, a finite difference petroleum reservoir simulator, a parallel petroleum reservoir simulator, a numerical petroleum reservoir simulator, and any other petroleum reservoir simulator now existing or herein after developed as is known and understood by those skilled in the art.

The three dimensional equivalent well block radius determined according to various systems, machines, computer readable program products, and associated computer implemented methods, according to various exemplary embodiments of the present invention, can beneficially be used to further determine well perforation indices and well perforation rates. As various embodiments of the present invention are more efficient and computational inexpensive than various current machines, systems, computer readable program products, and methods, such various embodiments of the present invention potentially of great importance to energy companies as they strive to tap the potential of more remote mineral deposits using an increasingly elaborate network of wells and reservoirs.

Such machines, systems computer implemented methods, and program products, according to various exemplary embodiments of the present invention, can beneficially account for both horizontal and vertical flow of oil through a well perforation without the need for complicated, expensive, and time-consuming numerical or iterative solutions. Furthermore, the present invention can be applied to any well block grid cell dimension, including large grid cells or entire wells, thereby eliminating the iterative process of prior systems and methods and increasing the computational efficiency of such calculations. Moreover, such machines, computer implemented methods, and program products can be used, for example, as a part of legacy simulators thereby providing more accurate well block radius calculations, by accounting for both horizontal and vertical perforation flow, without adding significant implementation hurdles, development costs, or runtime delays. Such advancements, according to exemplary embodiments of the present invention, would beneficially allow energy companies to generate more accurate petroleum reservoir simulation models thereby lowering the cost of oil and gas extraction and ultimately the price of energy to consumers. Computationally efficient well block radius determinations, that take into account both horizontal and vertical flow through a perforation, may beneficially raise the supply of oil thereby lowering the price at the pump for consumers worldwide. Various machines, computer implemented methods, and computer program products according to exemplary embodiments of the present invention can, for example, further produce more accurate perforation index calculations and perforation rate calculations thereby introducing a significant amount of correction to similar perforation index and perforation rate calculations determined pursuant to current approaches. Therefore, according to various exemplary embodiments of the present invention, field production rates can be more accurately determined to avoid water and gas coning.

As is perhaps best illustrated by FIG. 1, various embodiments of the present invention can include, by way of example, a computer implemented method to determine a three dimensional equivalent well block radius of a perforated grid block cell of a three dimensional coordinate grid block constructed over a three dimensional simulated well formation in a reservoir simulator. Generally speaking, such a computer implemented method can include, for example, the steps of receiving petroleum reservoir simulation data, as is known and understood by those skilled in the art, from a plurality of petroleum reservoir sensors (block 100) and establishing a three dimensional uniform grid block with a plurality of grid block cells over the petroleum reservoir simulation data (block 105). Beneficially, the petroleum reservoir simulation data can, when processed by a computer, can represent a three dimensional simulated well formation positioned within a finite difference petroleum reservoir simulator. Furthermore, the three dimensional uniform grid block can include a plurality of grid block cells where at least one of the plurality of grid block cells houses a perforation of the three dimensional simulated well formation to thereby define at least one perforated grid block cell.

Such a computer implemented method, according to various exemplary embodiments of the present invention can further include, for example, the steps of determining the quantity of well perforations of the three dimensional simulated well formation positioned within the three dimensional uniform grid block (block 110) and determining the three dimensional coordinate location within the three dimensional uniform grid block of each of the well perforations of the three dimensional simulated well formation (block 115). Beneficially, responsive to determining the quantity of the well perforations of the three dimensional simulated well formation positioned within the three dimensional uniform grid block (block 110) and responsive to determining the three dimensional coordinate location within the three dimensional uniform grid block of each of the well perforations of the three dimensional simulated well formation (block 115), a computer implemented method according to an exemplary embodiment of the present invention can further include the step of determining a three dimensional equivalent well block radius for one of the at least one perforated grid block cells of the three dimensional simulated well formation (block 120).

Figure 2:
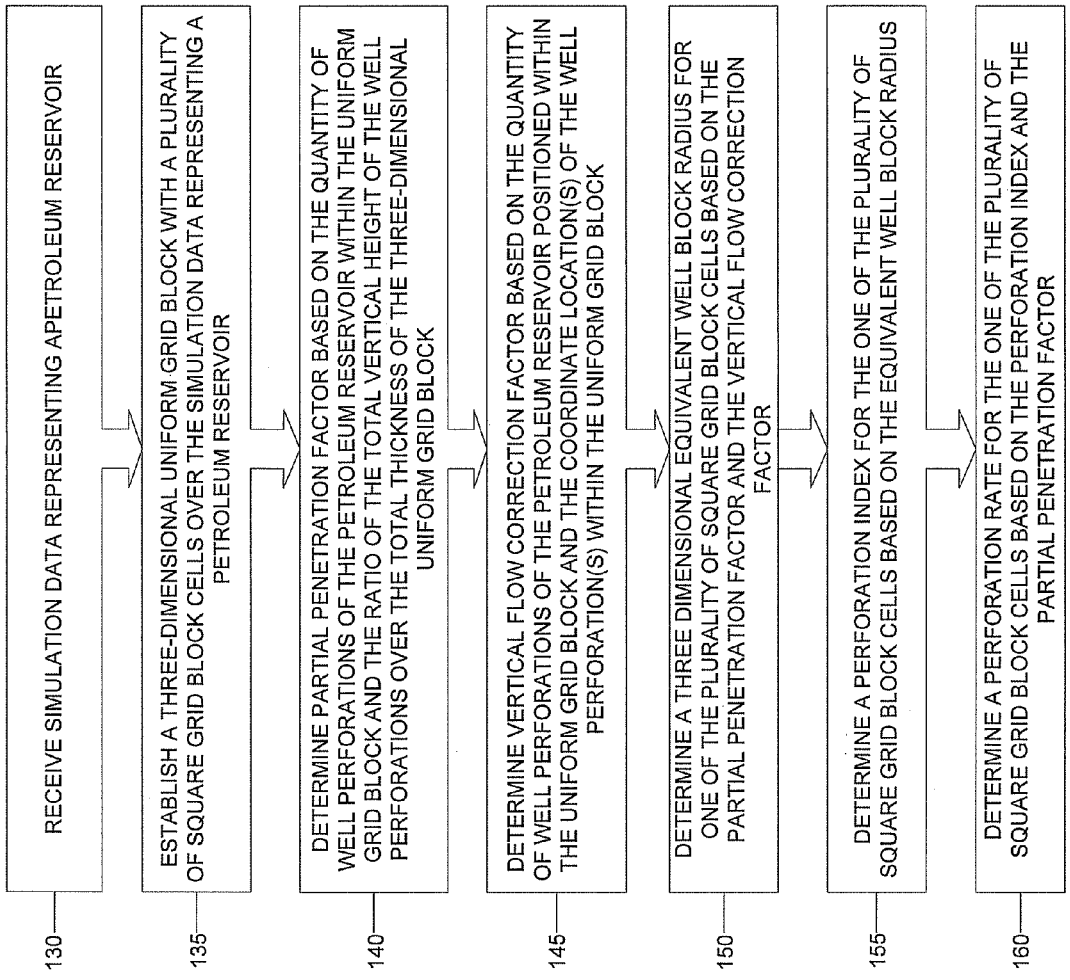
FIG. 2 is a high-level schematic block flow diagram of a computer implemented method to determine a three dimensional equivalent well block radius of a perforated grid block cell, with three dimensional flow, of a well in a finite difference petroleum reservoir simulator according to an exemplary embodiment of the present invention.

As is perhaps best illustrated by FIG. 2, various embodiments of the present invention also provide a computer implemented method to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention. Such a computer implemented method can include, by way of example, the step of receiving petroleum reservoir simulation data, as is known and understood by those skilled in the art, from a plurality of petroleum reservoir sensors (block 130) and establishing a three dimensional uniform grid block with a plurality of grid block cells over the petroleum reservoir simulation data (block 135). One or more of the plurality of grid block cells can, for example, house one of one or more well perforations to thereby define one or more perforated grid block cells. Beneficially, the petroleum reservoir simulation data can represent and describe an anisotropic porous media, as is known and understood by those skilled in the art. As used throughout, the term anisotropic porous media, as is known and understood by those skilled in the art, can include a petroleum reservoir.

The plurality of petroleum reservoir sensors can, for example, be positioned and adapted to receive well formation simulation data describing an anisotropic porous media well formation located within a petroleum reservoir. Furthermore, the plurality of petroleum reservoir sensors can include, for example, a total reservoir thickness sensor, a well radius sensor, and a well perforation height sensor. Moreover, as used throughout, a well perforation, as is known and understood by those skilled in the art, is a hole punched in the casing or lining of an oil well to connect the oil well to a reservoir. Additionally, the three dimensional simulated well formation can be, for example, a three dimensional computer generated data model of a real well formation based on data gathered from a plurality of petroleum reservoir sensors. Alternatively, the three dimensional simulated well formation, according to an exemplary embodiment of the present invention, can be a three dimensional computer generated data model of a simulated well formation based on data previously generated by one or more petroleum reservoir simulators. The three dimensional simulated well formation can be expressed, for example, as a matrix of data values or expressions corresponding to various sensor readings or simulated data related to a real or simulated petroleum reservoir, respectively.

The three dimensional simulated well formation can also, according to an exemplary embodiment of the present invention, be expressed in the form of an array, a linked-list, a matrix, a queue, a stack, a tree, a binary tree, a b-tree, a hash table, a heap, a binomial heap, a set, a disjoint set, or any other data structure now or hereinafter developed as is known or understood by those skilled in the art. Furthermore, the three dimensional well formation data can include, for example, data indicating a total thickness of a reservoir formation, data indicating the radius of a well penetrating through a grid block, and data indicating the vertical height of a well perforation. Also according to an embodiment of the present invention, such a computer implemented method can include, for example, the step of generating, by a computer in a first computer process, a three dimensional simulated well formation responsive to the petroleum reservoir simulation data received from the plurality of petroleum reservoir sensors.

As illustrated by FIG. 2, a computer implemented method according to various embodiments of the present invention can also include the steps of determining a partial penetration factor of one of the one or more perforated grid block cells based on the quantity of the one or more well perforations of the three dimensional simulated well formation located within the three dimensional uniform grid block and the ratio of the total vertical height of the one or more well perforations located within the three dimensional uniform grid block (block 140). Moreover, such a computer implemented method according to various embodiments of the present invention can include, for example, the step of determining a vertical flow correction factor for one of the one or more perforated grid block cells based on the quantity of the one or more well perforations of the three dimensional simulated well formation located within the three dimensional uniform grid block and the coordinate locations of the one or more well perforations located within the three dimensional uniform grid block (block 145).

Responsive to determining a partial penetration factor and a vertical flow correction factor for one of the one or more perforated grid block cells, such a computer implemented method according to various exemplary embodiments of the present invention can further include the step of determining a three dimensional equivalent well block radius for the one of the one or more perforated grid block cells (block 150). Additionally, a computer implemented method according to various exemplary embodiments of the present invention can further include the beneficial steps of determining a perforation index, as is known and understood by those skilled in the art and explained in greater detail below, for the one of the one or more perforated grid block cells (block 155) and determining a perforation rate, as is known and understood by those skilled in the art and explained in greater detail below, for the one of the one or more perforated grid block cells (block 160).

Figure 3:
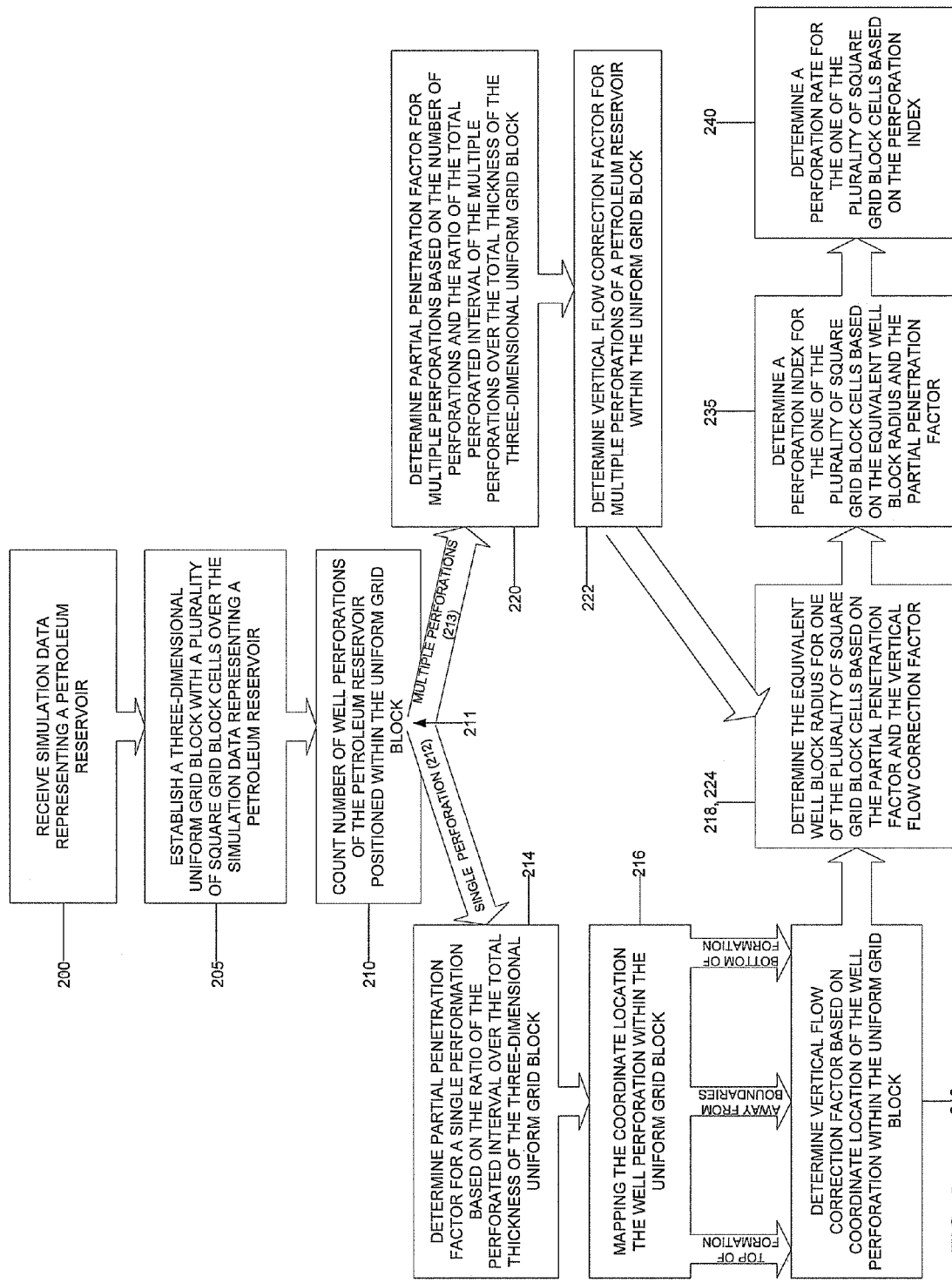
FIG. 3 is a low-level, detailed schematic block flow diagram of a computer implemented method to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.

FIG. 3, by way of example, perhaps best illustrates a computer implemented method to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention. Advantageously, such a computer implemented method can include, for example, the step of generating, by a computer in a first computer process, a three dimensional simulated well formation responsive to information received from a plurality of petroleum reservoir sensors adapted to receive well formation simulation data describing an anisotropic porous media well formation located within a petroleum reservoir (block 200). Such a computer implemented method according to exemplary embodiments of the present invention can also include the step of constructing, by the computer in a second computer process, responsive to generating the three dimensional simulated well formation by the computer in the first computer process, a three dimensional uniform square coordinate grid block (block 205). Beneficially, the three dimensional uniform square coordinate grid block can have, for example, a plurality of square grid block cells over the three dimensional simulated well formation. Moreover, the three dimensional uniform square coordinate grid block can be formed, according to an exemplary embodiment of the present invention, from a superimposition of a uniform grid positioned over the three dimensional simulated well formation in an areal direction and a uniform grid positioned over the three dimensional simulated well formation in a vertical direction such that each of the resulting plurality of square grid block cells has equal dimensions in the areal direction and constant thickness in the vertical direction.

A computer implemented method according to exemplary embodiments of the present invention can also include the step of counting, by the computer in a third computer process, the quantity of one or more well perforations positioned within the three dimensional uniform square coordinate grid block constructed by the computer in the second computer process (block 210). That is, a computer implemented method according to exemplary embodiments of the present invention can include the step of determining, by the computer in a third computer process, the number of well perforations positioned within the three dimensional uniform square coordinate grid block constructed by the computer in the second computer process (block 210). Each of the one or more well perforations, for example, can be beneficially positioned within one of the plurality of square grid block cells to thereby define one or more perforated square grid block cells.

As is perhaps shown by the forked path illustrated in FIG. 3 (211), a computer implemented method according to various exemplary embodiments of the present invention can beneficially take two paths depending on the number of well perforations positioned (or perforated square grid block cells) positioned within the three dimensional uniform square coordinate grid block. For example, if there is only a single square grid block cell positioned within the three dimensional uniform square coordinate grid block, a certain methodical path (illustrated, for example, at the left side 212 of FIG. 3) is followed according to an exemplary embodiment of the present invention. If alternatively, there are more than one square grid block cells positioned within the three dimensional uniform square coordinate grid block, a certain methodical path (illustrated, for example, at the right side 213 of FIG. 3) is followed according to an exemplary embodiment of the present invention.

More particularly, such a computer implemented method includes the following three steps when the three dimensional uniform square coordinate grid block includes one perforated square grid block cell. Exemplary embodiments of the present invention, for instance, can include the step of determining, by the computer in a fourth computer process, responsive to counting the quantity of the one or more well perforations by the computer in the third computer process, when the three dimensional uniform square coordinate grid block includes one perforated square grid block cell, a partial penetration factor for the one perforated square grid block cell based on a ratio of a vertical height of the one perforated square grid block cell and a total thickness of the three dimensional uniform square coordinate grid block (block 214). Moreover, a computer implemented method according to various embodiments of the present invention can further include the step of mapping, by the computer in a sixth computer process, responsive to counting the quantity of well perforations by the computer in the third computer process, when the three dimensional uniform square coordinate grid block includes one perforated square grid block cell, a three dimensional coordinate location of the one perforated square grid block cell positioned within the three dimensional uniform square coordinate grid block (block 215). The step of mapping, as is known and understood by those skilled in the art, includes the steps of determining and locating a coordinate location of the one perforated square grid block cell positioned within the three dimensional uniform square coordinate grid block. Additionally, the computer implemented method can beneficially include the step of determining, by the computer in a seventh computer process, when the three dimensional uniform square coordinate grid block includes one perforated square grid block cell, a vertical flow correction factor for one perforated square grid block cell responsive to counting the quantity of well perforations by the computer in the third computer process and mapping the three dimensional coordinate location of the perforated square grid block cell positioned within the three dimensional uniform square coordinate grid block by the computer in the sixth computer process (block 216).

In instances where there are more than one perforated square grid block cells positioned within the uniform square coordinate grid block, such a computer implemented method can also include, the following steps. For example, a computer implemented method according to an embodiment of the present invention can beneficially include the step of determining, by the computer in a fifth computer process, when the three dimensional uniform square coordinate grid block includes more than one perforated square grid block cells, a partial penetration factor for more than one perforated square grid block cells based on the quantity of well perforations positioned within the three dimensional uniform square coordinate grid block, counted by the computer in the third computer process, and a ratio of a total vertical height of the more than one perforated square grid block cells and a total thickness of the three dimensional uniform square coordinate grid block (block 220). Such a computer implemented method can also include, for example, the step of determining, by the computer in an eighth computer process, when the three dimensional uniform square coordinate grid block includes more than one perforated square grid block cells, a vertical flow correction factor for more than one perforated square grid block cells responsive counting the quantity of well perforations by the computer in the third computer process (block 220).

Responsive to completing the above described steps based on the quantity of perforated square grid block cells positioned within the three dimensional uniform square coordinate grid block, a computer implemented method can further include the steps to determine a three dimensional equivalent well block radius for a perforated square grid block cell. This step, however, also depends on the quantity of perforated square grid block cells positioned within the three dimensional uniform square coordinate grid block. Specifically, such a computer implemented method according to various exemplary embodiments of the present invention can include, for example, the step of determining, by the computer in a ninth computer process, when the three dimensional uniform square coordinate grid block includes one perforated square grid block cell, a three dimensional equivalent well block radius associated of the one perforated square grid block cell responsive to determining, by the computer, the partial penetration factor for the one perforated square grid block cell in the fourth computer process and the vertical flow correction factor for one perforated square grid block cell in the seventh computer process (block 218). Furthermore, such a computer implemented method according to various exemplary embodiments of the present invention can include the step of determining, by the computer in a tenth computer process, when the three dimensional uniform square coordinate grid block includes more than one perforated square grid block cells, a three dimensional equivalent well block radius of one of the more than one perforated square grid block cells responsive to determining, by the computer, the partial penetration factor for more than one perforated square grid block cells in the fifth computer process and the vertical flow correction factor for more than one perforated square grid block cells in eighth computer process (block 224).

Once a three dimensional equivalent well block radius has been determined for either the one perforated square grid block cell or one of the one or more perforated square grid block cells (i.e., depending on the quantity of perforated square grid block cells positioned within the three dimensional uniform square coordinate grid block), a computer implemented method according to exemplary embodiments of the present invention can further include the step of determining a perforation index for the one of the one or more perforated square grid block cells responsive to determining the three dimensional equivalent well block radius for the one of the one or more perforated square grid block cells (block 235). Furthermore, a computer implemented method according to an exemplary embodiment of the present invention can also include the beneficial step of determining a perforation rate for the one of the one or more perforated square grid block cells responsive to determining the perforation index for the one of the one or more perforated square grid block cells (block 240).

Figure 4:
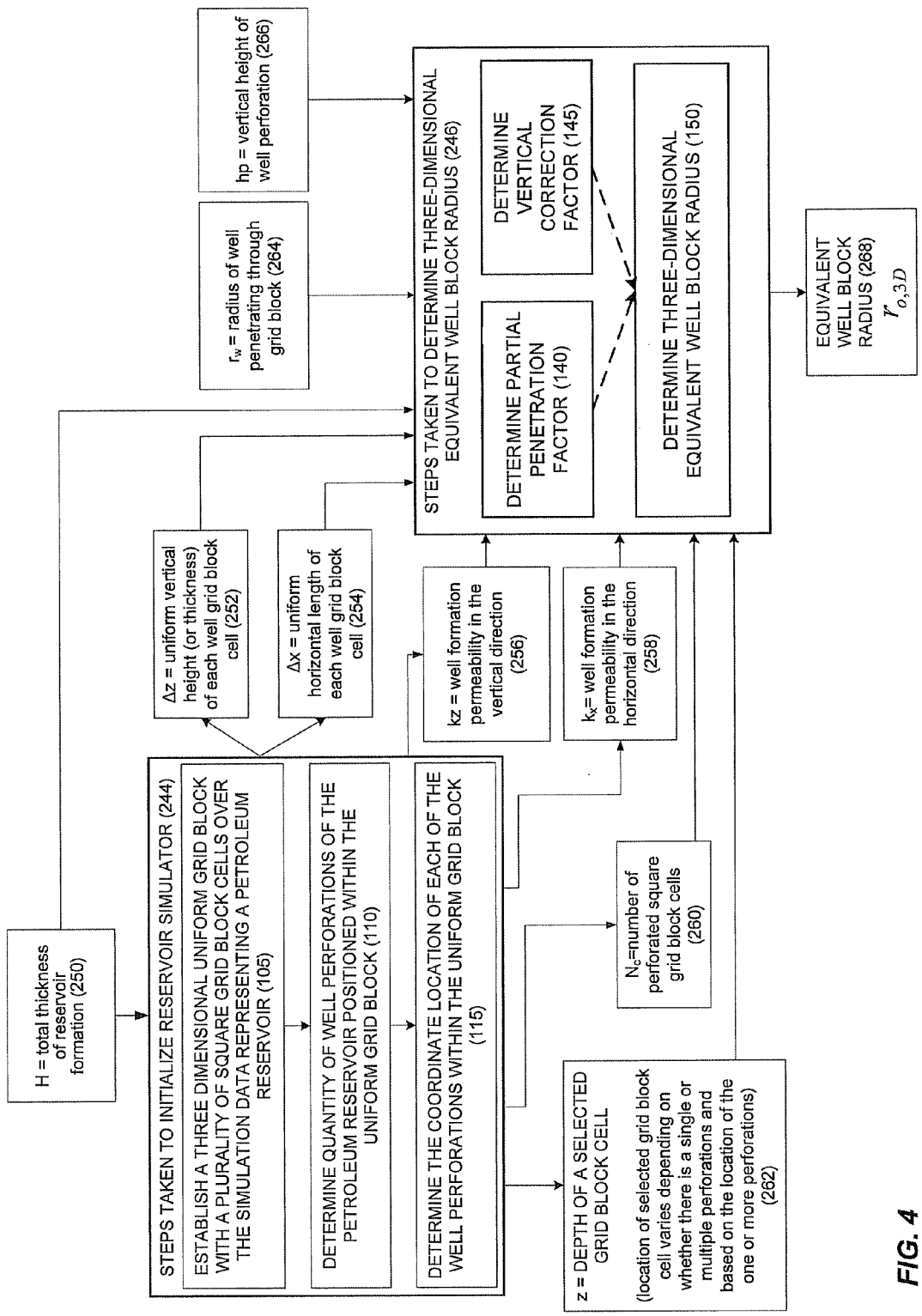
FIG. 4 is a low-level, detailed schematic block flow diagram illustrating a plurality of mathematical inputs used by or otherwise associated with a computer implemented method to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.

As is perhaps best illustrated in FIG. 4, the steps of a computer implemented according to an embodiment of the present invention can be conceptually divided into two main categories, steps taken to initialize a reservoir simulator (block 244) and steps taken to determine a three dimensional equivalent well block radius (block 246). Generally speaking, the first category (i.e., the steps taken to initialize a reservoir simulator) (block 244) can include the steps of establishing a three dimensional uniform grid block with a plurality of grid block cells over simulation data representing a petroleum reservoir (block 105), determining the quantity of well perforations of the petroleum reservoir positioned within the three dimensional uniform grid block (block 110), and determining the coordinate location of each of the well perforations positioned within the three dimensional uniform grid block (block 115). The second category (i.e., the steps taken to determine a three dimensional equivalent well block radius) (block 246) can include the steps of determining a partial penetration factor for one of the well perforations positioned within the three dimensional uniform grid block (block 140), determining a vertical flow correction factor for the one of the well perforations positioned within the three dimensional uniform grid block (block 145), and determining a three dimensional equivalent well block radius for the uniform grid block cell housing the one of the well perforations positioned within the three dimensional uniform grid block (block 150).

Beneficially, as illustrated by FIG. 4, the steps taken to initialize a reservoir simulator (block 244) can receive as input information, the total thickness of a reservoir formation (block 250) indicated or represented mathematically by H. Furthermore, the steps taken to initialize a reservoir simulator (block 244) according to an exemplary embodiment of the present invention can provide as output information, a vertical thickness of each well grid block cell positioned within the three dimensional uniform grid block (block 252) (indicated or represented mathematically by $\Delta z$), a horizontal length of each well grid block cell positioned within the three dimensional uniform grid block (block 254) (indicated or represented mathematically by $\Delta x$), a well formation permeability in the vertical direction (block 256) (indicated or represented mathematically by $k_z$), a well formation permeability in the horizontal direction (block 258) (indicated or represented mathematically by $k_x$), the quantity of perforated square grid block cells positioned within the three dimensional uniform grid block (block 260) (indicated or represented mathematically by $N_c$), and a depth of a selected grid block cell positioned within the three dimensional uniform grid block (block 262) (indicated or represented mathematically by z). According to exemplary embodiments of the present invention, and as explained in additional detail below, the location of the selected grid block cell (z) can vary depending on whether there is a single or multiple well perforations and based on the coordinate location of the one or more well perforations.

Moreover, the steps taken to determine a three dimensional equivalent well block radius (block 246) according to various exemplary embodiments of the present invention can receive as input information, the following: (1) the radius of a well penetrating through a grid block cell (block 264) (indicated or represented mathematically by $r_w$); (2) the vertical height of a one or more well perforations (block 266) (indicated or represented mathematically by $h_p$); (3) a vertical thickness of each well grid block cell positioned within the three dimensional uniform grid block (block 252) (indicated or represented mathematically by $\Delta z$); (4) a horizontal length of each well grid block cell positioned within the three dimensional uniform grid block (block 254) (indicated or represented mathematically by $\Delta x$); (5) a well formation permeability in the vertical direction (block 256) (indicated or represented mathematically by $k_z$); (6) a well formation permeability in the horizontal direction (block 258) (indicated or represented mathematically by $k_x$); (7) the quantity of perforated square grid block cells positioned within the three dimensional uniform grid block (block 260) (indicated or represented mathematically by $N_c$); (8) and a depth of a selected grid block cell positioned within the three dimensional uniform grid block (block 262) (indicated or represented mathematically by z); and (9) the total thickness of a reservoir formation (block 250) (indicated or represented mathematically by H). Beneficially, the steps taken to determine a three dimensional equivalent well block radius according to a exemplary embodiments of the present invention can provide as output, a three dimensional equivalent well block radius (block 268) (indicated or represented mathematically by $r_{o,3D}$).

Figure 5:
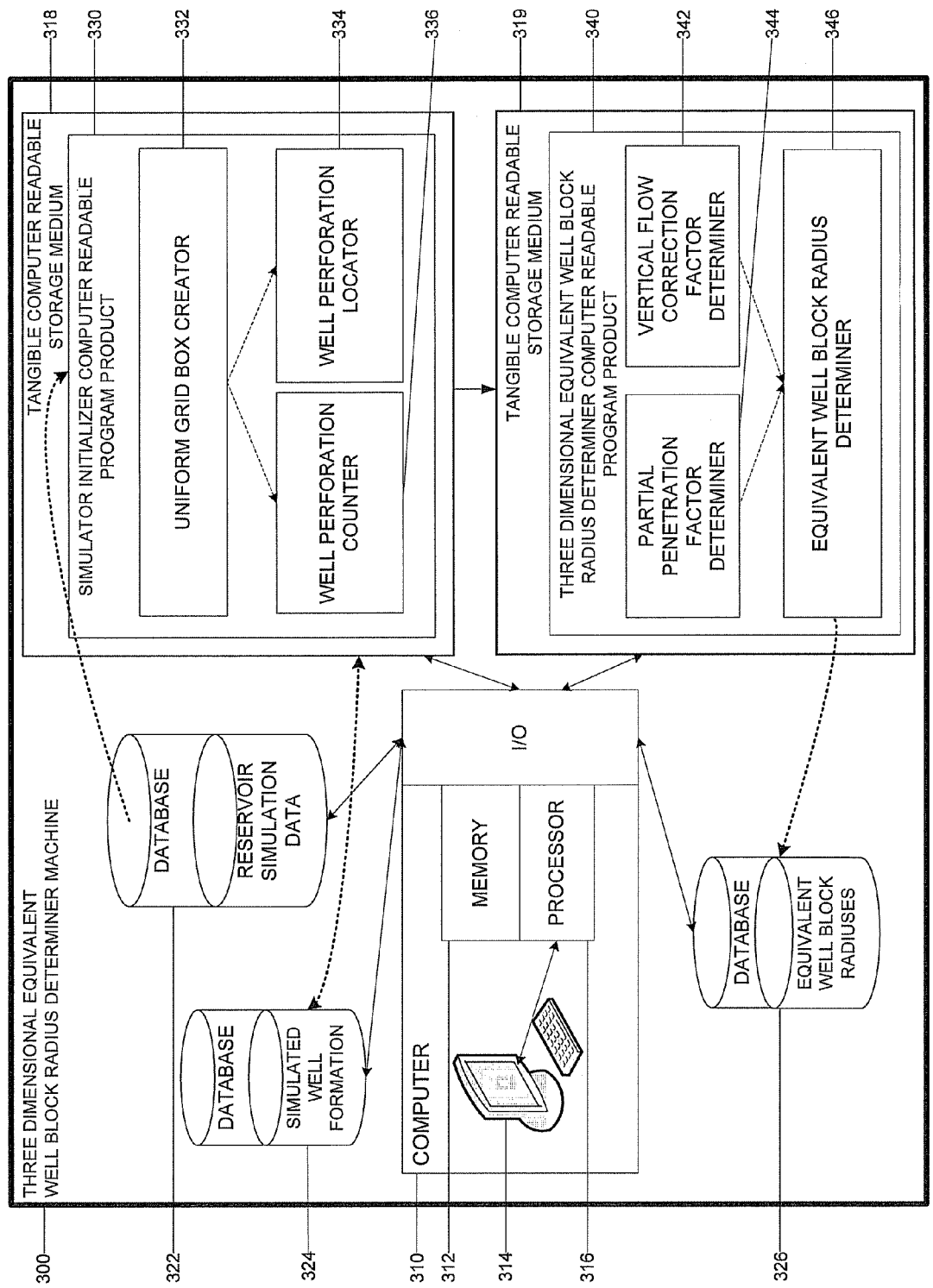
FIG. 5 is a schematic block diagram of a three dimensional equivalent well block radius determiner machine to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.

Exemplary embodiments of the present invention also advantageously provide, as is perhaps best illustrated by FIG. 5, a three dimensional equivalent well block radius determiner machine 300 to determine a three dimensional equivalent well block radius of a perforated grid block cell, with three dimensional flow, of a three dimensional coordinate grid block constructed over a three dimensional simulated well formation in a finite difference petroleum reservoir simulator (as known and understood by those skilled in the art). Such a three dimensional equivalent well block radius determiner machine 300, according to an embodiment of the present invention, can include a first database 322, a second database 324, a computer 310, a simulator initializer computer readable program product 330, and a three dimensional equivalent well block radius determiner computer readable program product 340. Beneficially, the first database 322 can be configured to store petroleum reservoir simulation data received from a plurality of petroleum reservoir sensors adapted to receive data describing an anisotropic porous media well formation located within a petroleum reservoir. The second database 324, by way of example, can be configured to store a three dimensional simulated well formation generated responsive to the well formation simulation data stored in the first database 322. Furthermore, the computer 310 can have, for example, at least a processor 316 and memory 312 and can be adapted to be in communication with the first 322 and second database 324. Additionally, according to various embodiments of the present invention, for example, the computer can include a display 314 and the computer can be adapted to be in communication with one or more output devices (as herein defined below and as known and understood by those skilled in the art). The one or more output devices, for example, can be advantageously adapted to be in communication with the computer via a communications network (as herein defined below and as known and understood by those skilled in the art).

Beneficially, the simulator initializer 330 computer readable program product can be stored in a tangible computer readable storage medium 318. Furthermore, such a simulator initializer computer readable program product 330 according to exemplary embodiments of the present invention, can include instructions that, when executed by the computer 310, cause the computer 310 to perform the operations of: (a) constructing a three dimensional coordinate grid block 332, having a plurality of grid block cells, over the three dimensional simulated well formation stored in the second database 324; and (b) mapping, responsive to constructing the three dimensional coordinate grid block, each of the one or more well perforations to one of the plurality of grid block cells to thereby define one or more perforated grid block cells 334. According to various embodiments of the present invention, the three dimensional simulated well formation can include one or more well perforations, as described above and as is known and understood by those skilled in the art.

Beneficially, the simulator initializer computer readable program product can further include instructions that, when executed by the computer 310, cause the computer 310 to perform the operation of converting the three dimensional well formation, the three dimensional coordinate grid block, and the one or more well perforations, and the one or more perforated grid block cells into a human-readable graphical form (as is known and understood by those skilled in the art) capable of being displayed on the display 314 or outputted to one or more output devices adapted to be in communication with the computer. Furthermore, the simulator initializer computer readable program product can further include instructions that, when executed by the computer 310, cause the computer 310 to perform the operation of displaying on the display 314, the three dimensional well formation, the three dimensional coordinate grid block, and the one or more well perforations, and the one or more perforated grid block cells in human-readable graphical form.

Also according to various exemplary embodiments of the present invention, the three dimensional equivalent well block radius determiner computer readable program product 340 can be beneficially stored in a tangible computer readable storage medium 319. Additionally, such a three dimensional equivalent well block radius determiner computer 310 readable program product 340 can include instructions that, when executed by the computer, cause the computer 310 to perform the operations of determining a partial penetration factor for one of the one or more perforated grid block cells 342, determining a vertical flow correction factor for the one of the one or more perforated grid block cells 344, and determining a three dimensional equivalent well block radius of the one of the one or more perforated grid block cells 346. More specifically, the operation of determining the partial penetration factor for the one of the one or more perforated grid block cells 342 can beneficially be responsive to the operation of constructing the three dimensional uniform square coordinate grid block 332 by the simulator initializer computer readable program product 330. Additionally, the partial penetration factor for the one of the one or more perforated grid block cells can be based, for example, on a total quantity count (as is known and understood by those skilled in the art) of the one or more well perforations and a ratio of a collective vertical height of the one or more well perforations and a total thickness of the three dimensional coordinate grid block.

Moreover, the operation of determining the vertical flow correction factor for the one of the one or more perforated grid block cells 344 can be, for example, responsive to the operation of constructing the three dimensional coordinate grid block 332 and the operation of mapping each of the one or more well perforations to one of the plurality of grid block cells 334. More particularly, the vertical flow correction factor for the one of the one or more perforated grid block cells can, for example, be based on the total quantity count of the one or more perforated grid block cells and a three dimensional coordinate location of the one of the one or more perforated grid block cells within the three dimensional uniform square coordinate grid block. Responsive to determining the partial penetration factor 342 and the vertical flow correction factor 344 for the one of the one or more perforated grid block cells, a three dimensional equivalent well block radius can be determined 346 by the three dimensional equivalent well block radius determiner computer readable program product 340. Beneficially, the three dimensional equivalent well block radius determiner computer readable program product 346 can also include, for example, instructions that, when executed by the computer 310, cause the computer 310 to store the determined three dimensional equivalent well block radius in a third database 346, positioned to be in communication with the computer 410.

According to an exemplary embodiment of the present invention, the three dimensional coordinate grid block can include a well penetrating through the three dimensional coordinate grid block (as is known and understood by those skilled in the art), and each of the plurality of grid block cells can have a uniform vertical height, thereby defining a uniform vertical height of a grid block cell, and a uniform horizontal length, thereby defining a uniform horizontal length of a grid block cell. Furthermore, the petroleum reservoir simulation data stored in the first database 322 can beneficially include a radius of the well penetrating through the three dimensional coordinate grid block (as is known and understood by those skilled in the art) and a vertical height of the one of the one or more well perforations positioned within the one of the one or more perforated grid block cells. Additionally, the simulator initializer computer readable program product 330 can further include, for example, instructions that, when executed by the computer 310, cause the computer 310 to perform the operations of determining the uniform vertical height of a grid block cell, determining the uniform horizontal length of a grid block cell, determining a total thickness of the three dimensional coordinate grid block, determining a horizontal well formation permeability of the three dimensional simulated well formation, determining a vertical well formation permeability of the three dimensional simulated well formation, identifying a plurality of grid block cells positioned adjacent to the one of the one or more perforated grid block cells (to thereby define a plurality of adjacent grid block cells), and mapping a depth of the one of the one or more perforated grid block cells and each of the plurality of adjacent grid block cells positioned within the three dimensional coordinate grid block. Moreover, according to various exemplary embodiments of the present invention, the three dimensional coordinate location of the one of the one or more perforated grid block cells and the plurality of three dimensional coordinate locations of each of the plurality of adjacent grid block cells can each include at least a horizontal coordinate location and a vertical coordinate location.

Also according to an exemplary embodiment of the present invention, the partial penetration factor for the one of the one or more perforated grid block cells can be, by way of example, determined responsive to determining the uniform vertical height of a grid block cell, the total thickness of the three dimensional coordinate grid block, and responsive to the radius of the well penetrating through the three dimensional coordinate grid block and the vertical height of the one of the one or more well perforations. Additionally, the vertical flow correction factor for the one of the one or more perforated grid block cells can be beneficially determined responsive to determining the uniform vertical thickness of a grid block cell and the uniform horizontal length of a grid block cell and responsive to mapping the depth of each of the one of the one or more perforated grid block cells and each of the plurality of adjacent grid block cells positioned within the three dimensional coordinate grid block.

Furthermore, the one or more perforated grid block cells can beneficially be a perforated grid block housing one well perforation. In addition, the three dimensional coordinate grid block can beneficially include, for example, a plurality of top three dimensional coordinate locations defining a top of the three dimensional coordinate grid block, a plurality of bottom three dimensional coordinate locations defining a bottom of the three dimensional coordinate grid block, and a plurality of middle three dimensional coordinate locations defining locations positioned in between the plurality of top three dimensional coordinate locations and the plurality of bottom three dimensional coordinate locations, to thereby define a middle of the three dimensional coordinate grid block. That said, the three dimensional equivalent well block radius determiner computer readable program product 340 can further include, for example, instructions that, when executed by the computer 310, cause the computer 310 to perform the operation of determining whether the one of the one or more perforated grid block cells is positioned within the three dimensional coordinate grid block at the top of the three dimensional coordinate grid block, the bottom of the three dimensional coordinate grid block, or the middle of the three dimensional coordinate grid block. Additionally, the vertical flow correction factor for the one of the one or more perforated grid block cells can be determined, for example, responsive to the uniform vertical height of a grid block cell (indicated or represented mathematically by $\Delta z$), the uniform horizontal length of a grid block cell (indicated or represented mathematically by $\Delta x$), the well formation permeability in the vertical direction (indicated or represented mathematically by $k_z$), the well formation permeability in the horizontal direction (indicated or represented mathematically by $k_x$), responsive to mapping the plurality of adjacent grid block cells, and responsive to determining whether the one of the one or more perforated grid block cells is positioned at the top of the three dimensional coordinate grid block, the bottom of the three dimensional coordinate grid block, or the bottom of the three dimensional grid block.

According to various exemplary embodiments of the present invention, the three dimensional coordinate grid block constructed by the simulator initializer computer readable program product 330 can beneficially be constructed by superimposing a uniform grid positioned over the three dimensional simulated well formation, stored in the second database 324, in an areal direction and a uniform grid positioned over the three dimensional simulated well formation, stored in the second database 324, in a vertical direction where each of the resulting plurality of square grid block cells has equal dimensions in the areal direction and constant thickness in the vertical direction. Additionally, the simulator initialize computer readable program product 330 can further include, by way of example, instructions that, when executed by the computer 310, cause the computer 310 to perform the operations of: (1) generating a three dimensional simulated well formation responsive to the well formation simulation data stored in the first database 322; (2) counting the one or more well perforations positioned within the three dimensional coordinate grid block to thereby determine the total quantity count of the one or more perforated square grid block cells 336; and (3) determining a three dimensional coordinate location of the one of the one or more perforated grid block cells within the three dimensional coordinate grid block.

Beneficially, the three dimensional equivalent well block radius determiner computer readable program product can further include instructions that, when executed by the computer 310, cause the computer 310 to perform the operation of converting the partial penetration factor, the vertical flow correction factor, and the equivalent well block radius into human-readable form (as is known and understood by those skilled in the art) capable of being displayed on the display 314 or outputted to one or more output devices adapted to be in communication with the computer. Furthermore, the three dimensional equivalent well block radius determiner computer readable program product can further include instructions that, when executed by the computer 310, cause the computer 310 to perform the operation of displaying on the display 314, the three dimensional well formation, the three dimensional coordinate grid block, and the one or more well perforations, and the one or more perforated grid block cells in human-readable graphical form.

Figure 6:
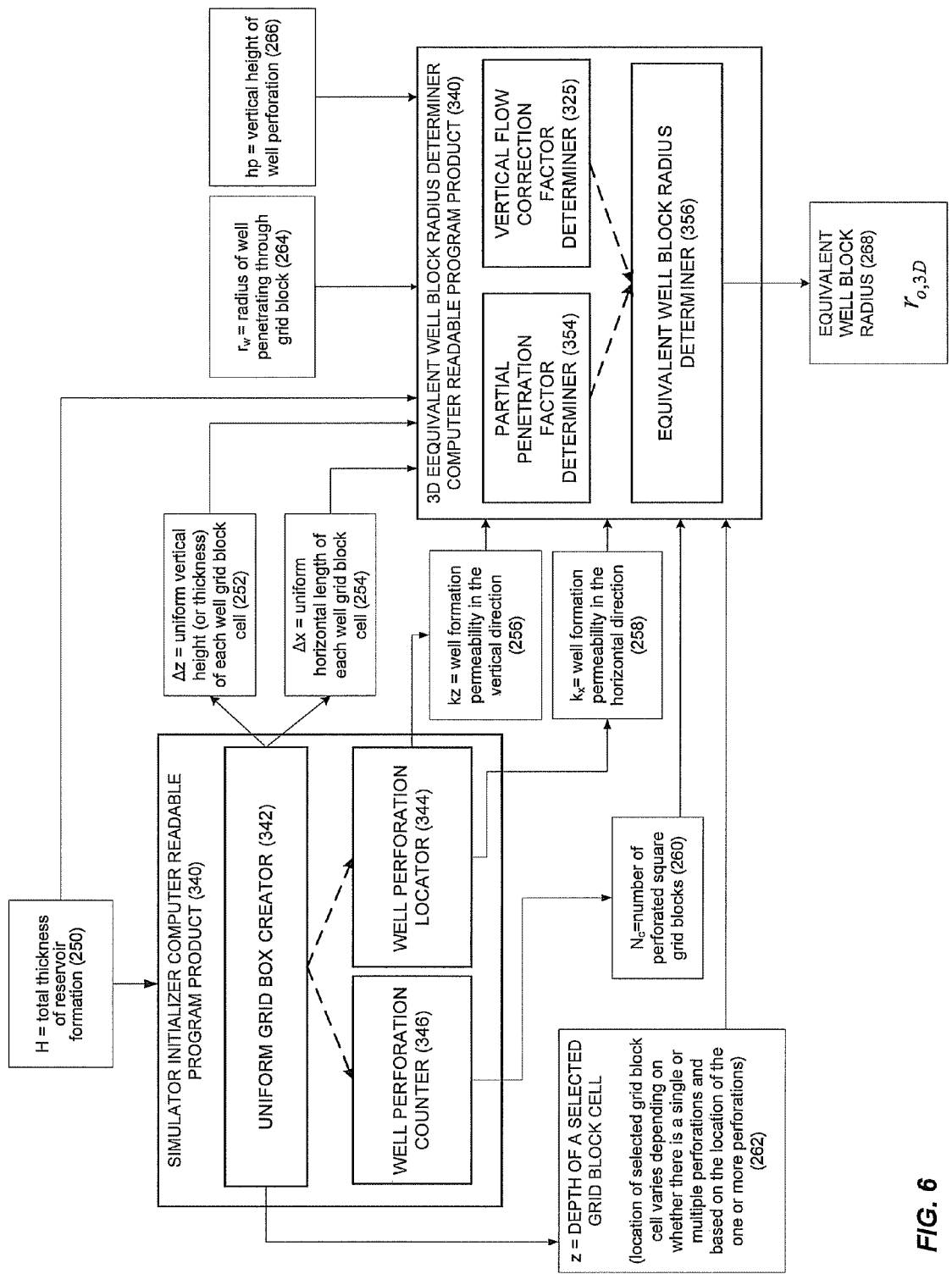
FIG. 6 is a low-level, detailed schematic block flow diagram illustrating a plurality of mathematical inputs used by or otherwise associated with a three dimensional equivalent well block radius determiner machine to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.

As is perhaps best illustrated by FIG. 6, and as explained with greater mathematical detail and precision below, the simulator initializer computer readable program product 340 can receive as input information, the total thickness of a reservoir formation (block 250) indicated or represented mathematically by H. Furthermore, the simulator initializer computer readable program product 340 can provide as output information, a vertical thickness of each well grid block cell positioned within the three dimensional uniform grid block (block 252) (indicated or represented mathematically by $\Delta z$), a horizontal length of each well grid block cell positioned within the three dimensional uniform grid block (block 254) (indicated or represented mathematically by $\Delta x$), a well formation permeability in the vertical direction (block 256) (indicated or represented mathematically by $k_z$), a well formation permeability in the horizontal direction (block 258) (indicated or represented mathematically by $k_x$), the quantity of perforated square grid block cells positioned within the three dimensional uniform grid block (block 260) (indicated or represented mathematically by $N_c$), and a depth of a selected grid block cell positioned within the three dimensional uniform grid block (block 262) (indicated or represented mathematically by z).

Moreover, the three dimensional equivalent well block radius determiner computer readable program product 340, according to various exemplary embodiments of the present invention, can receive as input information, the following: (1) the radius of a well penetrating through a grid block cell (block 264) (indicated or represented mathematically by $r_w$); (2) the vertical height of a one or more well perforations (block 266) (indicated or represented mathematically by $h_p$); (3) a vertical thickness of each well grid block cell positioned within the three dimensional uniform grid block (block 252) (indicated or represented mathematically by $\Delta z$); (4) a horizontal length of each well grid block cell positioned within the three dimensional uniform grid block (block 254) (indicated or represented mathematically by $\Delta x$); (5) a well formation permeability in a vertical direction (block 256) (indicated or represented mathematically by $k_z$); (6) a well formation permeability in a horizontal direction (block 258) (indicated or represented mathematically by $k_x$; (7) the quantity of perforated square grid block cells positioned within the three dimensional uniform grid block (block 260) (indicated or represented mathematically by $N_c$); (8) and a depth of a selected grid block cell positioned within the three dimensional uniform grid block (block 262) (indicated or represented mathematically by z); and (9) the total thickness of a reservoir formation (block 250) (indicated or represented mathematically by H). Beneficially, the three dimensional equivalent well block radius determiner computer readable program product 340 can provide as output, a three dimensional equivalent well block radius (block 268) (indicated or represented mathematically by $r_{o,3D}$).

Figure 7:
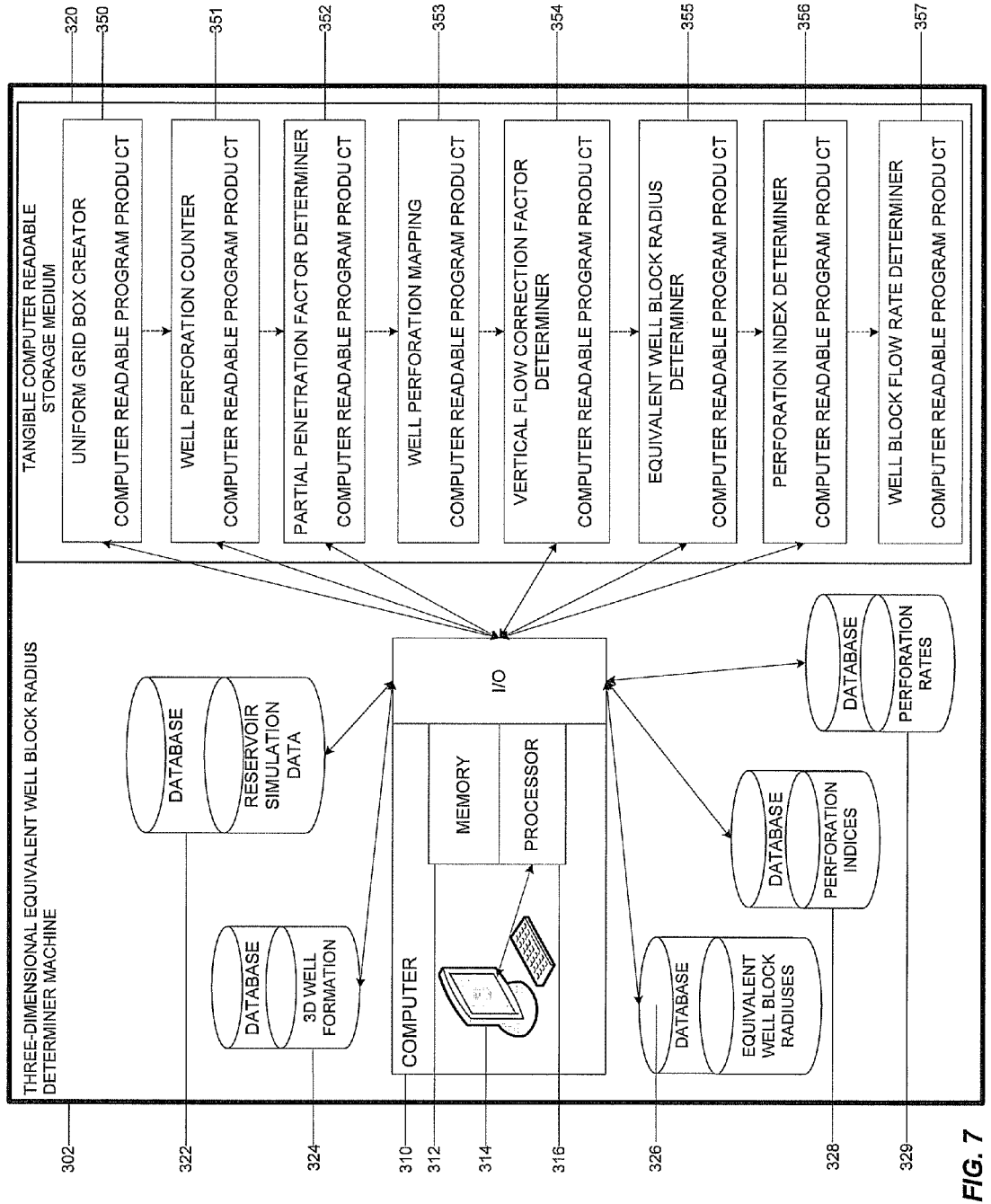
FIG. 7 is a schematic block diagram of a three dimensional equivalent well block radius determiner machine to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.

As is perhaps best illustrated by FIG. 7, embodiments of the present invention beneficially provide a three dimensional equivalent well block radius determiner machine 302 to determine a three dimensional equivalent well block radius of a perforation of a well with three dimensional flow in a finite difference petroleum reservoir simulator. The three dimensional equivalent well block radius determiner machine 302, according to such an exemplary embodiment of the present invention, can beneficially include a first database 322 configured to store three dimensional petroleum reservoir simulation data, a second database 324 configured to store three dimensional simulated well formations generated responsive to the three dimensional petroleum reservoir simulation data received from a plurality of petroleum reservoir sensors and stored in the first database 322, a third database configured to store one or more three dimensional equivalent well block radiuses 326, a fourth database configured to store one or more well block perforation indices 328, and a fifth database configured to store one or more well block perforation rates 329. The three dimensional equivalent well block radius determiner machine can also include a computer 310 adapted to be in communication with the first 322, second 324, third 326, fourth 328, and fifth 329 databases and having at least a processor 316 and memory 312.

Beneficially, a three dimensional simulated well formation (which can be stored in the second database 324) can be, for example, a three dimensional computer generated data model of a real well formation based on data gathered from a plurality of petroleum reservoir sensors. Alternatively, a three dimensional simulated well formation, according to an exemplary embodiment of the present invention, can be a three dimensional computer generated data model of a simulated well formation based on data previously generated by one or more petroleum reservoir simulators. The three dimensional simulated well formation can be expressed, for example, as a matrix of data values or expressions corresponding to various sensor readings or simulated data related to a real or simulated petroleum reservoir, respectively. The three dimensional simulated well formation can also, according to an exemplary embodiment of the present invention, be expressed in the form of an array, a linked-list, a matrix, a queue, a stack, a tree, a binary tree, a b-tree, a hash table, a heap, a binomial heap, a set, a disjoint set, or any other data structure now or hereinafter developed as is known or understood by those skilled in the art. Furthermore, the three dimensional well formation data can include, for example, data indicating a total thickness of a reservoir formation, data indicating the radius of a well penetrating through a grid block, and data indicating the vertical height of a well perforation.

Such a three dimensional equivalent well block radius determiner machine 302 according to various exemplary embodiments of the present invention can also include, for example, a grid block constructor computer readable program product 350, a well perforation counter computer readable program product 351, a partial penetration factor determiner computer readable program product 352, a well perforation mapping computer readable program product 353, a vertical flow correction factor computer readable program product 354, a three dimensional equivalent well block radius determiner computer readable program product 355, a perforation index determiner computer readable program product 356, and a well block flow rate determiner computer readable program product 357. More specifically, the grid block constructor computer readable program product 350, according to an exemplary embodiment of the present invention, can be stored in a tangible computer readable storage medium 320 and can include instructions that, when executed by the computer 302, cause the computer 302 to perform the operation of constructing a three dimensional coordinate grid block, as is known and understood by those skilled in the art, over a three dimensional simulated well formation stored in the second database 324. The three dimensional coordinate grid block, as is known and understood by those skilled in the art, can be, for example, a Cartesian coordinate system grid with three dimensions, two in the horizontal plane, length and width, and one in the vertical plane, depth (or height).

Furthermore, the partial penetration factor determiner computer readable program product 352, according to various exemplary embodiments of the present invention, can be stored, for example, in a tangible computer readable storage medium 320 and can include instructions that, when executed by the computer 310, cause the computer 310 to perform the operation of determining a partial penetration factor for one of the one or more well perforations responsive to a total quantity count of the one or more well perforations (determined by the well perforation counter computer readable program product 351 stored in a tangible computer readable medium 320) and a ratio of a collective vertical height of the one or more well perforations and a total thickness of the three dimensional coordinate grid block. As is known and understood by those skilled in the art, the total quantity count of the one or more well perforations can be a value representing the number of well perforations positioned within the three dimensional simulated well formation. Additionally, as is known and understood by those skilled in the art, the collective vertical height of the one or more well perforations is the additive total vertical height of all of the well perforations positioned within the three dimensional simulated well formation. For example, if the three dimensional simulated well formation included three perforations, each with a height of ten (10) meters, the collective vertical height of the one or more well perforations would be thirty (30) meters.

Furthermore, as is known and understood by those skilled in the art, the total thickness of the three dimensional coordinate grid block is the thickness of the three dimensional coordinate grid block constructed by the grid block constructor computer readable program product measured, for example, from the lowest depth of the three dimensional coordinate grid block to the highest height of the three dimensional coordinate grid block. Beneficially, the plurality of petroleum reservoir sensors can include, for example, a total reservoir thickness sensor, a well radius sensor, and a well perforation height sensor. Furthermore, the three dimensional simulated well formation can include one or more well perforations positioned within. As used throughout, a well perforation, as is known and understood by those skilled in the art, is a hole punched in the casing or lining of an oil well to connect the oil well to a reservoir.

Also according to various exemplary embodiments of the present invention, the vertical flow correction factor computer readable program product 354 can be, for example, stored in a tangible computer readable storage medium 320 and can include instructions that, when executed by the computer 310, cause the computer 310 to perform the operation of determining a vertical flow correction factor for one of the one or more well perforations responsive to the total quantity count of the one or more well perforations and responsive to determining a three dimensional coordinate location of the one of the one or more well perforations positioned within the three dimensional coordinate grid block by a well perforation mapping computer readable program product 353 stored in a tangible computer readable storage medium 320. As is known and understood by those skilled in the art, the term three dimensional coordinate location, as used herein, means a Cartesian coordinate system location defined in terms of three values, one value for each of the three dimensions of the Cartesian coordinate system. More specifically, as is known and understood by those skilled in the art, the three dimensional coordinate location of the one of the one or more well perforations can be, for example, defined by three values, two of the three values indicating the coordinate location of the one of the one or more well perforations within the horizontal plane of the three dimensional coordinate grid block and the third of the values indicating the coordinate location of the one of the one or more well perforations within the vertical plane of the three dimensional coordinate grid block.

Additionally, the three dimensional equivalent well block radius determiner computer readable program product 355, according to various exemplary embodiments of the present invention, can, for example, be stored in a tangible computer readable storage medium 320 and can include instructions that, when executed by the computer 310, cause the computer 310 to perform the operation of determining a three dimensional equivalent well block radius, as is known and understood by those skilled in the art, of the one of the one or more well perforations responsive to determining the partial penetration factor and the vertical flow correction factor. Generally speaking, and as explained in more detail below, the three dimensional equivalent well block radius can beneficially be used to determine a perforation index for the one of the plurality of well perforations and ultimately the perforation rate for the one of the plurality of well perforations include in the three dimensional simulated well formation. Thus, a three dimensional well block radius determiner machine 302 according to various exemplary embodiments of the present invention can further include a perforation index determiner computer readable program product 356 and a well block perforation rate determiner computer readable program product 357. The perforation index determiner computer readable program product 356 can be stored in a tangible computer readable storage medium 320 and can beneficially include instructions that, when executed by the computer 310, cause the computer 310 to perform the operation of determining a perforation index for the one of the one or more perforated grid block cells responsive to determining the three dimensional equivalent well block radius for the one of the one or more perforated grid block cells. The well block perforation rate determiner computer readable program product 357 can be stored in a tangible computer readable storage medium and can include, for example, instructions that, when executed by the computer 310, cause the computer 310 to perform the operation of determining a perforation rate for the one of the one or more perforated grid block cells responsive to determining the perforation index for the one of the one or more perforated grid block cells.

Furthermore, according to various exemplary embodiments of the present invention, the grid block constructor computer readable program product 350 can further include instructions that, when executed by the computer 310, cause the computer 310 to perform the operation of superimposing a uniform grid positioned over the three dimensional simulated well formation in an areal direction and a uniform grid positioned over the three dimensional simulated well formation in a vertical direction to thereby create a plurality of grid block cells each having equal dimensions in the areal direction and constant thickness in the vertical direction. Furthermore, the well perforation mapping computer readable program product 353, according to an embodiment of the present invention, can be stored in a tangible computer readable storage medium 302 and can include, for example, instructions that, when executed by the computer 310, cause the computer 310 to perform the operation of mapping each of the one or more well perforations to one of the plurality of grid block cells to thereby define one or more perforated grid block cells. Because each of the one or more well perforations can be beneficially mapped to one of the plurality of grid block cells, the three dimensional equivalent well block radius determiner computer readable program product 355 can beneficially determine a three dimensional well block radius of one of the plurality of grid block cells housing the one of the one or more well perforations responsive to determining the partial penetration factor by the partial penetration factor determiner computer readable program product 352 and the vertical flow correction factor by the vertical flow correction factor determiner computer readable program product 354.

Moreover, according to an exemplary embodiment of the present invention, each of the plurality of grid block cells can have a uniform vertical height, thereby defining a uniform vertical height of a grid block cell, and a uniform horizontal length, thereby defining a uniform horizontal length of a grid block cell. Beneficially, according to an exemplary embodiment of the present invention, the uniform vertical height of a grid block cell and the uniform horizontal length of a grid block cell can each be associated with one of the three dimensions of the Cartesian coordinate system used to describe the three dimensional coordinate grid block and the location of each of the plurality of grid block cells positioned within the three dimensional coordinate grid block. Additionally, the three dimensional coordinate grid block can beneficially include a well penetrating through the three dimensional coordinate grid block, and the three dimensional well formation simulation data can include a radius of the well penetrating through the three dimensional coordinate grid block and a vertical height of the one of the one or more well perforations positioned within the one of the one or more perforated grid block cells.

In addition, according to an exemplary embodiment of the present invention, a three dimensional well block radius determiner machine 302 can further include a data initializer computer readable program product stored in a tangible computer readable storage medium. Beneficially, such a data initializer computer readable program product can beneficially include instructions that, when executed by the computer, cause the computer to perform the operations of: (a) determining the uniform vertical height of a grid block cell; (b) determining the uniform horizontal length of a grid block cell; (c) determining a total thickness of the three dimensional coordinate grid block, (d) determining a horizontal well formation permeability of the three dimensional simulated well formation, (e) determining a vertical well formation permeability of the three dimensional simulated well formation, (f) identifying a plurality of grid block cells positioned adjacent to the one of the one or more perforated grid block cells, to thereby define a plurality of adjacent grid block cells, and (g) mapping a depth of the one of the one or more perforated grid block cells and each of the plurality of adjacent grid block cells positioned within the three dimensional coordinate grid block. Furthermore, according to various exemplary embodiments of the present invention, the three dimensional coordinate location of the one of the one or more perforated grid block cells and the plurality of three dimensional coordinate locations of each of the plurality of adjacent grid block cells can each include at least a horizontal coordinate location and a vertical coordinate location. Beneficially, according to an exemplary embodiment of the present invention, the horizontal coordinate location and the vertical coordinate location can each be associated with one of the three dimensions of the Cartesian coordinate system used to describe the three dimensional coordinate grid block and the location of each of the plurality of grid block cells positioned within the three dimensional coordinate grid block.

In a particular exemplary embodiment of the present invention, the one or more perforated grid block cells can be only one perforated grid block cell housing one well perforation. Furthermore, the three dimensional coordinate grid block can beneficially include, by way of example, a plurality of top three dimensional coordinate locations defining a top of the three dimensional coordinate grid block, a plurality of bottom three dimensional coordinate locations defining a bottom of the three dimensional coordinate grid block, and a plurality of middle three dimensional coordinate locations defining locations positioned in between the plurality of top three dimensional coordinate locations and the plurality of bottom three dimensional coordinate locations, to thereby define a middle of the three dimensional coordinate grid block. In such an exemplary embodiment of the present invention, the three dimensional equivalent well block radius determiner computer readable program product 355 can further include instructions that, when executed by the computer 310, cause the computer 310 to perform the operation of determining whether the one of the one or more perforated grid block cells is positioned within the three dimensional coordinate grid block at the top of the three dimensional coordinate grid block, the bottom of the three dimensional coordinate grid block, or the middle of the three dimensional coordinate grid block.

Also according to various embodiments of the present invention, a three dimensional well block radius determiner machine can beneficially include, for example, a graphical user interface generator computer readable program product stored in a tangible computer readable storage medium and including instructions that, when executed by the computer, cause the computer to perform the operations of generating a graphical user interface capable of being displayed in human readable form on a display, and displaying a graphical user interface (as described below) on a display adapted to be in communication with the computer. Additionally, such a graphical user interface generator computer readable program product can also include instructions that, when executed by the computer, cause the computer to perform the operations of converting the three dimensional well formation, the three dimensional coordinate grid block, the one or more well perforations, the plurality of grid block cells, the one or more perforated grid block cells, the partial penetration factor, the vertical flow correction factor, the perforation index, and the perforation rate into a human-readable graphical form (as is known and understood by those skilled in the art) capable of being displayed on the display 314 or outputted to one or more output devices adapted to be in communication with the computer. Furthermore, the user interface generator computer readable program product can further include instructions that, when executed by the computer 310, cause the computer 310 to perform the operation of displaying on the display 314, the three dimensional well formation, the three dimensional coordinate grid block, the one or more well perforations, the plurality of grid block cells, the one or more perforated grid block cells, the partial penetration factor, the vertical flow correction factor, the perforation index, and the perforation rate cells in human-readable graphical form.

Figure 8:
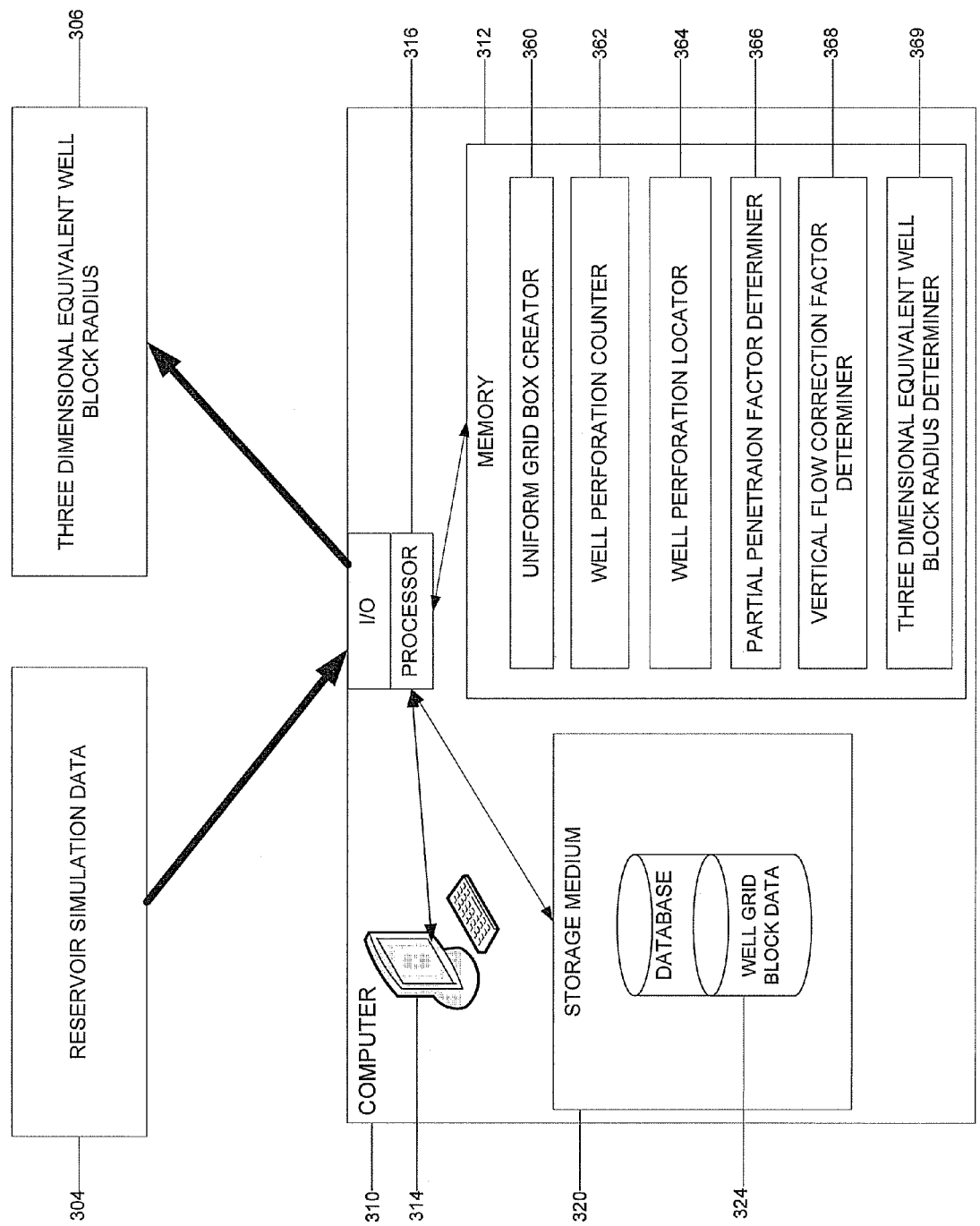
FIG. 8 is a schematic block diagram of a system to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.

As is perhaps best illustrated in FIG. 8, various embodiments of the present invention also advantageously provide a system to determine a three dimensional equivalent well block radius of a perforated grid block cell, with three dimensional flow, of a three dimensional coordinate grid block constructed over a three dimensional simulated well formation in a finite difference petroleum reservoir simulator. Such a system, according to various embodiments of the present invention can include, for example, a first tangible computer readable storage medium storing petroleum reservoir simulation data 304, a second tangible computer readable storage medium configured to store one or more three dimensional equivalent well block radiuses 406, and a computer 311. The computer, according to various embodiments of the present invention can beneficially include at least memory 312, a display 314, a processor 316, and a computer readable storage medium 420. The computer readable storage medium can beneficially include at least one database 324 configured to store a three dimensional simulated well formation created by the computer 310 responsive to petroleum reservoir simulation data stored on the first tangible computer readable storage medium 304. Furthermore, such a system according to exemplary embodiments of the present invention can include for example, a grid block creator 360, a well perforation counter 362, a well perforation locator 364, a partial penetration factor determiner 366, a vertical flow correction factor determiner 368, and a three dimensional equivalent well block radius determiner 369, each configured to be stored in the memory of the computer.

The grid block creator 360 can be configured, for example, to construct a three dimensional coordinate grid block, having a plurality of grid block cells, over the three dimensional simulated well formation stored in the at least one database 324. In addition, the well perforation counter 362 can be configured, for example, to count the quantity of well perforations positioned within the three dimensional coordinate grid block. Also according to various exemplary embodiments of the present invention, the well perforation locator 364 can be configured, for example, to locate the three dimensional coordinate location within the three dimensional coordinate grid block of each of the well perforations positioned within the three dimensional coordinate grid block to thereby define one or more perforated grid block cells. Furthermore, the partial penetration factor determiner 366 can be beneficially configured to determine a partial penetration factor for one of the one or more perforated grid block cells based on the quantity of well perforations positioned within the three dimensional coordinate grid block and the ratio of a collective vertical height of the one or more well perforations and a total thickness of the three dimensional coordinate grid block. The vertical flow correction factor determiner 368 can be configured, for example, to determine a vertical flow correction factor for the one of the one or more perforated grid block cells based on the quantity of well perforations positioned within the three dimensional coordinate grid block and a three dimensional coordinate location of the one of the one or more perforated grid block cells within the three dimensional uniform square coordinate grid block. Moreover, the three dimensional equivalent well block radius determiner 369 can be configured, according to various exemplary embodiments of the present invention, to determine a three dimensional equivalent well block radius of the one of the one or more perforated grid block cells responsive to the partial penetration factor determiner 366 and the vertical flow correction factor determiner 368.

Figure 9:
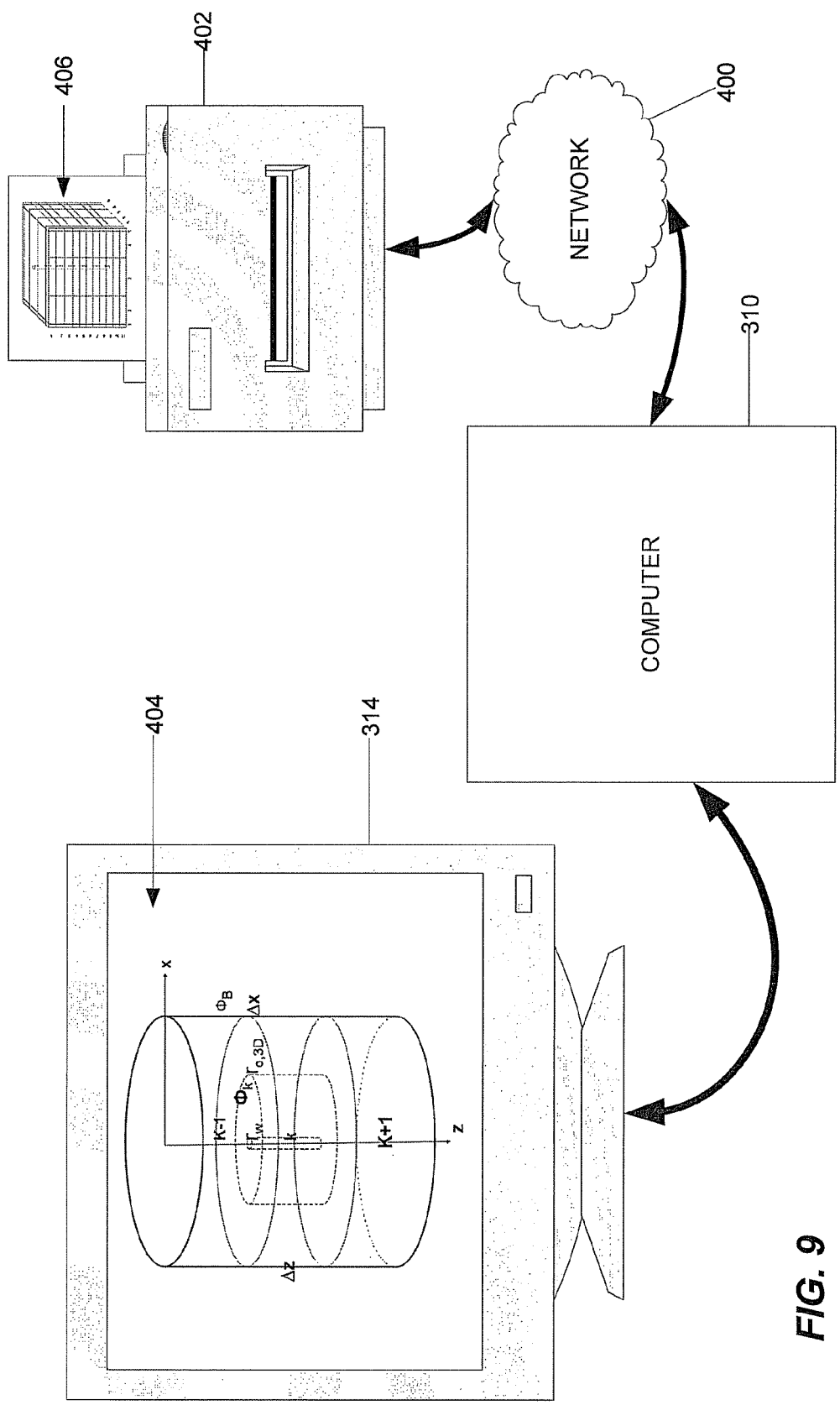
FIG. 9 is a schematic block diagram of petroleum reservoir simulator output data produced and displayed on one or more output devices adapted to be in communication with a computer according to various exemplary embodiments of the present invention.

As perhaps best illustrated in FIG. 9, various embodiments of the present invention can output, in human readable form, petroleum reservoir simulation data, simulated three dimensional well formations, constructed coordinate grid blocks, determined three dimensional equivalent well block radiuses, well perforation indices, and well perforation rates on one or more output devices 314, 402 adapted to be in communication with a computer 310. The computer 314, for example, can either be a part of, or can be adapted to communication with, a system to determine an equivalent well block radius according to various exemplary embodiments of the present invention or a machine to determine an equivalent well block radius according to various exemplary embodiments of the present invention. Moreover, the computer 310 can, for example, be adapted to execute a computer readable program product according to various exemplary embodiment of the present invention or a computer implemented method according to various exemplary embodiments of the present invention.

Furthermore, the one or more output devices adapted to be in communication with the computer 310 can be in communication with the computer through a communications network 400 as is known and understood by those skilled in the art. The communications network 400 can include, for example, a local area network, a wide area network, a telephony network, a wireline network, a wireless network, a wide area network, an infrared network, a radio-frequency network, an optical network, or any other communications network now or hereinafter created as is known and understood by those skilled in the art. Additionally, petroleum reservoirs, such as, for example, reservoir thickness sensors (as is known and understood by those skilled in the art), well radius sensors (as is known and understood by those skilled in the art), well perforation height sensors (as is known and understood by those skilled in the art), and well formation permeability sensors (as is known and understood by those skilled in the art) can also be adapted to be in communication with a computer 310 via a communications network 400.

Beneficially, data outputted to the one or more output devices 314, 402, including petroleum reservoir simulation data, simulated three dimensional well formations, constructed coordinate grid blocks, determined three dimensional equivalent well block radiuses, well perforation indices, well perforation rates, and any other output data capable of being displayed in human readable form on one or more output devices, can include image data. Image data, as is known and understood by those skilled in the art, can include a plurality of image data points, that, as known and understood by those skilled in the art, can be in the form of an array, a linked-list, a matrix, a queue, a stack, a tree, a binary tree, a b-tree, a hash table, a heap, a binomial heap, a set, a disjoint set, or any other data structure now or hereinafter developed as is known or understood by those skilled in the art. More specifically, according to various exemplary embodiments of the present invention, various well simulation data, three dimensional simulated well formation data or information, and constructed coordinate grid blocks, for example, can be processed and converted by the computer into a matrix of data points capable of being displayed on a display 314, outputted to a printer 402, or otherwise produced via an output device in graphical image form as is known and understood by those skilled in the art.

Advantageously, an output device can include, for example, a printer, a brail printer, a television, a monitor, a CRT monitor, an LCD monitor, a plasma monitor, an OLED screen, a DLP monitor, a video projection, a three-dimensional projection, a touch screen, and any other piece of electronic hardware equipment used to communicate the results of data processing carried out by any information processing system (such as a computer) now or hereinafter developed as is known or understood by those skilled in the art. Moreover, as used throughout, the term display can include, for example, a CRT monitor, a LCD monitor, a plasma monitor, a OLED screen, a television, a DLP monitor, a video projection, a three-dimensional projection, a touch screen, head-mounted video goggles, and any other graphical user interface device currently or hereinafter developed as is known and understood by those skilled in the art.

More particularly, as is perhaps best illustrated in FIGS. 10 through 13, various embodiments of the present invention can beneficially produce a graphical user interface 408 on a display 314 positioned to be in communication with the computer (not shown). Such a graphical user interface 408, as is known and understood by those skilled in the art, can be any type of user interface that allows humans to interact with computer programs using a graphical environment. A graphical user interface 408 can, for example, operate on Windows, Macintosh, Linux, Sun, X-Windows, or any other graphical operating system as is known and understood in the art. Such a graphical user interface 408 can beneficially include windows, dialog boxes, click buttons, text, graphics, diagrams, headings, size and layout controls, and any other graphical user interface attribute now known or hereinafter developed as is known and understood by those skilled in the art.

Figure 10:
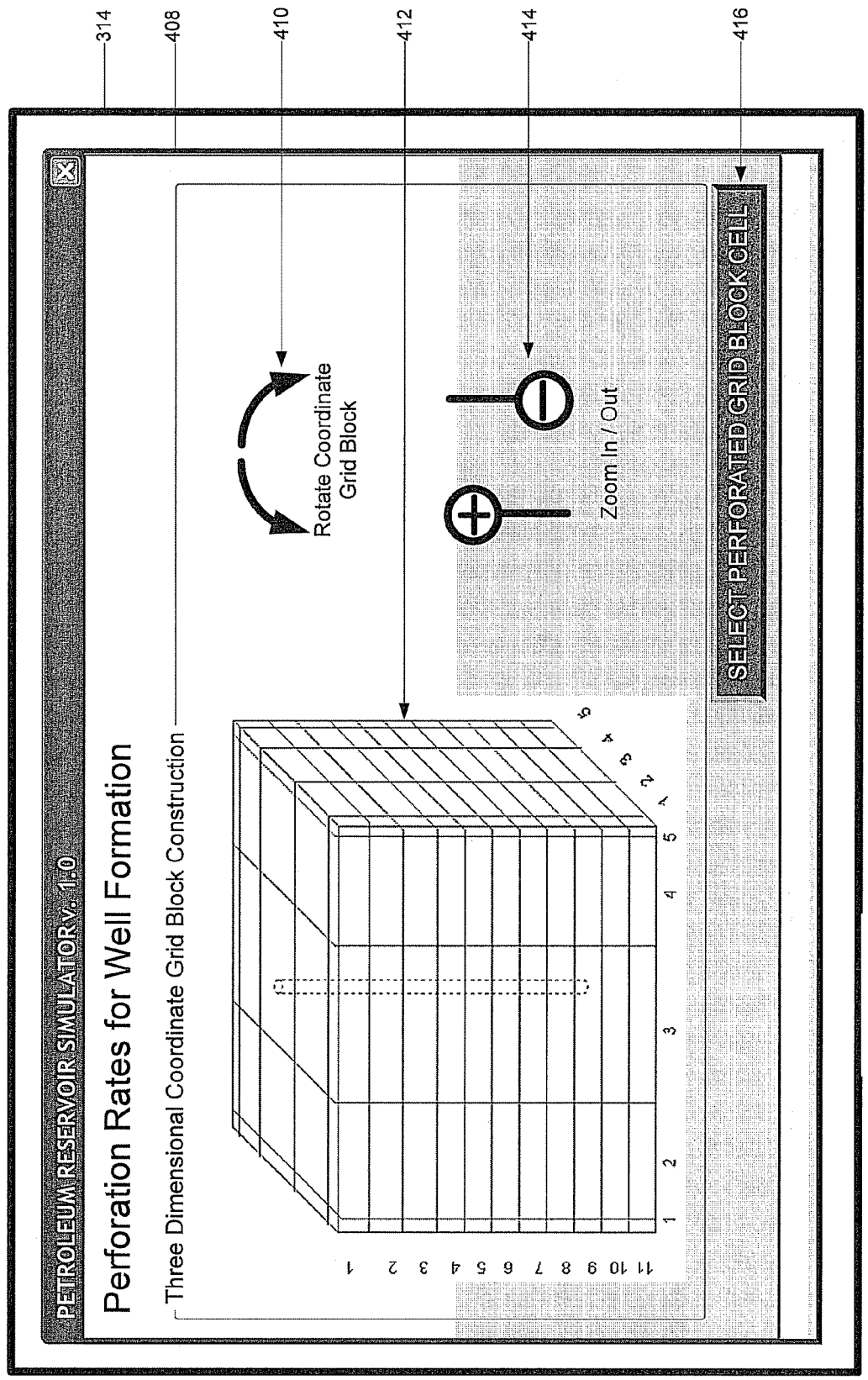
FIG. 10 is a schematic diagram of an exemplary graphical user interface of a petroleum reservoir simulator produced and displayed on a display adapted to be in communication with a computer according to an exemplary embodiment of the present invention.

By way of example only, FIGS. 10 through 13 illustrate an exemplary graphical user interface 408 generated according to various embodiments of the present invention. Such a graphical user interface 408, for example, may be generated by a user interface generator computer readable program product and displayed on a display 314 positioned to be in communication with the computer. As is perhaps best illustrated by FIG. 10, an exemplary graphical user interface 408 can include, for example, a graphical image of a three dimensional coordinate grid block constructed over a three dimensional simulated well formation 412 according to various embodiments of the present invention. Beneficially, such a graphical user interface can also include user interface tools 410, 414 (as is known and understood by those skilled in the art) to manipulate the displayed three dimensional coordinate grid block 412. For example, the graphical user interface can include user interface tools to rotate 410 the three dimensional coordinate grid block 412 and user interface tools to zoom in and zoom 414 out on the three dimensional coordinate grid block 412. Moreover, a graphical user interface according to exemplary embodiments of the present invention can include click buttons 416 that can enable a user of the graphical user interface to navigate the graphical user interface (as is known and understood by those skilled in the art). For example, FIG. 10 illustrates a click button, titled "Select Perforated Grid Block Cell" 416 that allows a user, when clicked, to select a particular perforated grid block cell within the three dimensional coordinate grid block for further simulation and analysis.

Figure 11:
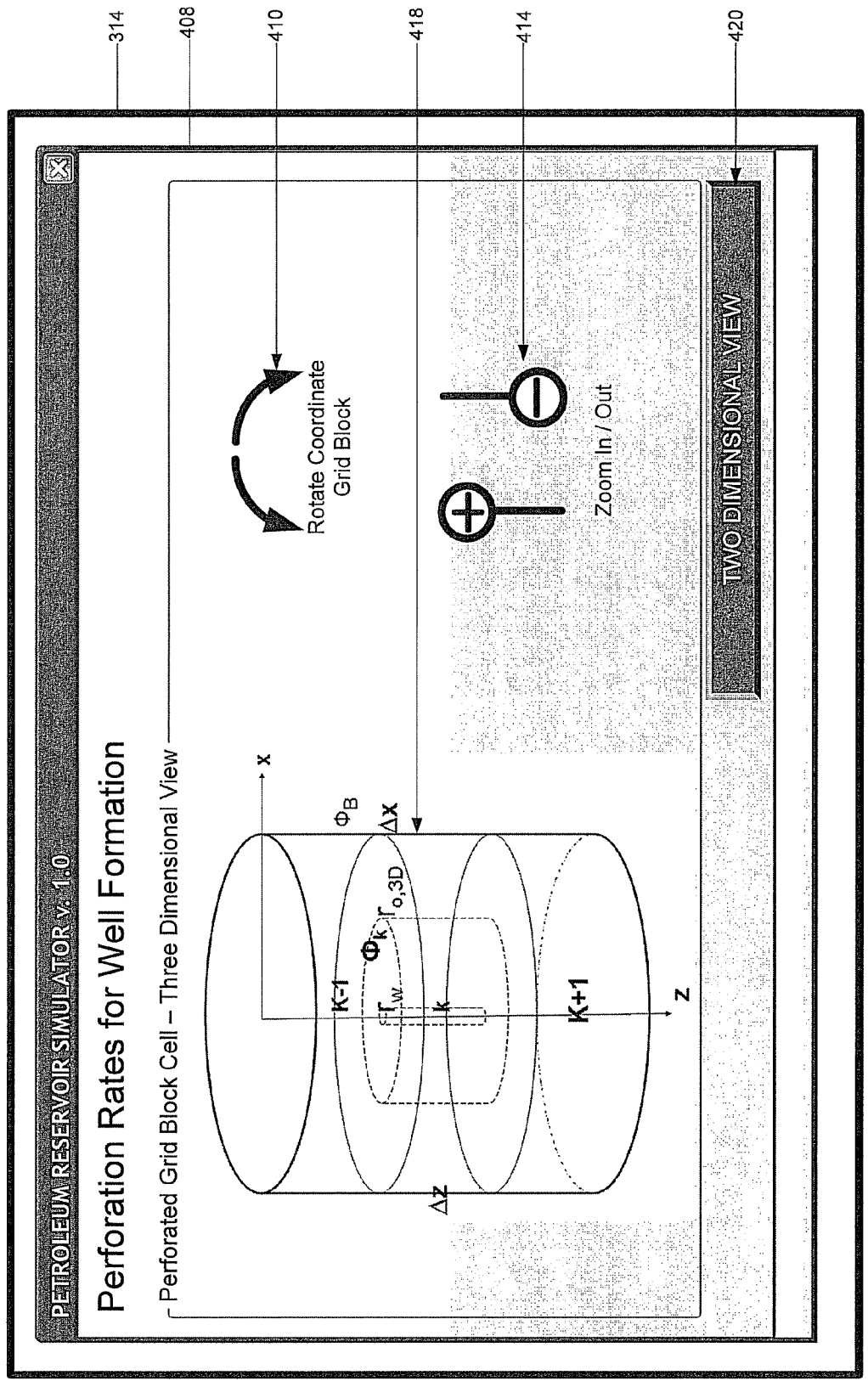
FIG. 11 is a schematic diagram of an exemplary graphical user interface of a petroleum reservoir simulator produced and displayed on a display adapted to be in communication with a computer according to an exemplary embodiment of the present invention.

Similarly, FIG. 11 also illustrates an exemplary graphical user interface 408 generated according to various embodiments of the present invention. As illustrated, such an exemplary graphical user interface 408 can, for example, a three dimensional graphical view of a perforated grid block cell 418 generated and displayed according to various embodiments of the present invention. The displayed three dimensional graphical view of a perforated grid block cell 418 beneficially allows users of a petroleum reservoir simulator to quickly and efficiently locate, view, and graphically manipulate a perforated grid block cell. Users, for instance, can use a mouse, a keyboard, or other input device to rotate the three dimensional graphical view of a perforated grid block cell 418 using image rotation user interface tools 410, or users can, for example, use a mouse, a keyboard, or other input device, to enlarge or shrink the three dimensional graphical view of a perforated grid block cell 418 by using the zoom in and zoom out user interface tools 414. A user can also, for example, use a click button 420 (i.e., by clicking on the click button 420 with a mouse, selecting the click button 420 with a keyboard, pressing the click button 420 using a touch screen, or otherwise manipulating the click button 420 using a user interface input device (as is known and understood by those skilled in the art) to cause the graphical user interface 408 to generate and display a two dimensional graphical view of a perforated grid block cell 422 according to various embodiments of the present invention.

Figure 12:
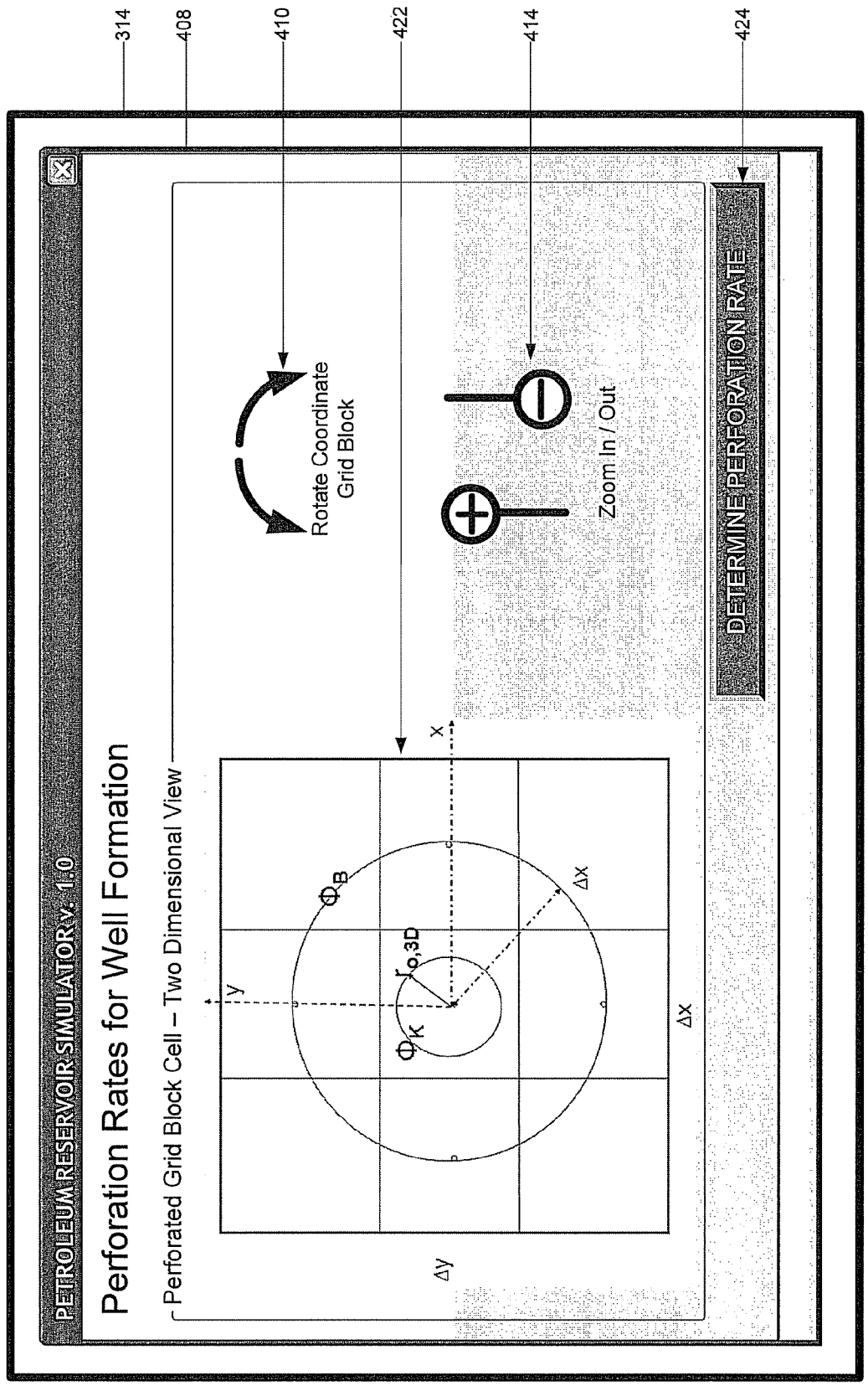
FIG. 12 is a schematic diagram of an exemplary graphical user interface of a petroleum reservoir simulator produced and displayed on a display adapted to be in communication with a computer according to an exemplary embodiment of the present invention.
Figure 13:
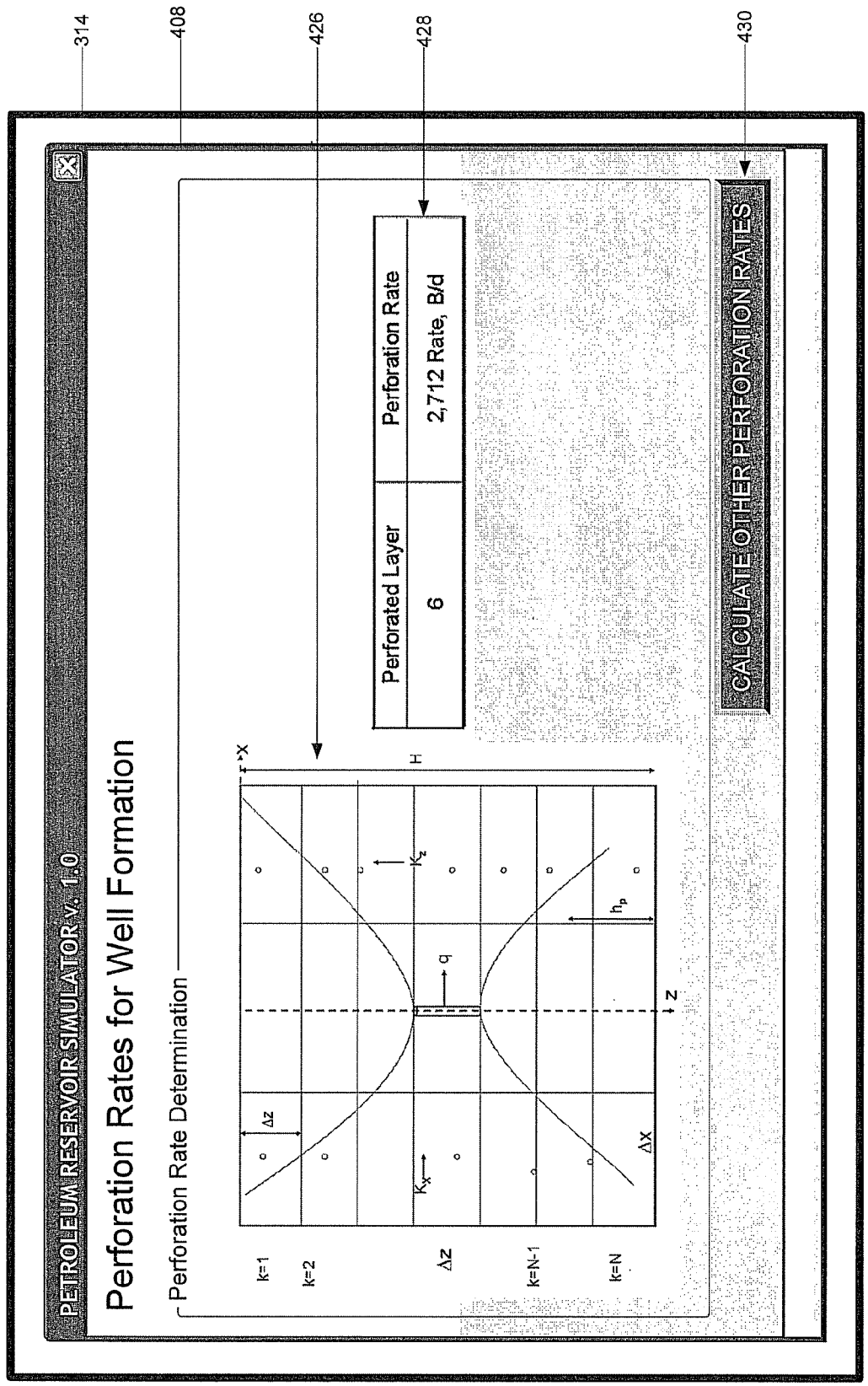
FIG. 13 is a schematic diagram of an exemplary graphical user interface of a petroleum reservoir simulator produced and displayed on a display adapted to be in communication with a computer according to an exemplary embodiment of the present invention.

Such a two dimensional graphical view of a perforated grid block cell 422 displayed via an exemplary graphical user interface 408 is perhaps best illustrated by FIG. 12. Furthermore, as is perhaps best illustrated by FIG. 12 and FIG. 13, a user can, for example, us a click button 424 (i.e., by clicking on the click button 424 with a mouse, selecting the click button 424 with a keyboard, pressing the click button 424 using a touch screen, or otherwise manipulating the click button 424 using a user interface input device (as is known and understood by those skilled in the art) to cause the graphical user interface 408 to generate a display a perforation rate for a perforated grid block cell 428 according to an exemplary embodiment of the present invention. As shown in FIG. 13, the graphical user interface 408 can also be configured, for example, according to an exemplary embodiment of the present invention, to generate and display a two dimensional view of a coordinate grid block showing the coordinate location of a perforated grid block cell within the coordinate grid block 426. Advantageously, a user can also, for example, use a click button 430 (i.e., by clicking on the click button 430 with a mouse, selecting the click button 430 with a keyboard, pressing the click button 430 using a touch screen, or otherwise manipulating the click button 430 using a user interface input device (as is known and understood by those skilled in the art) to cause the graphical user interface 408 to calculate and determine other perforation rates for other well perforations positioned within a three dimensional coordinate grid block.

Figure 14:
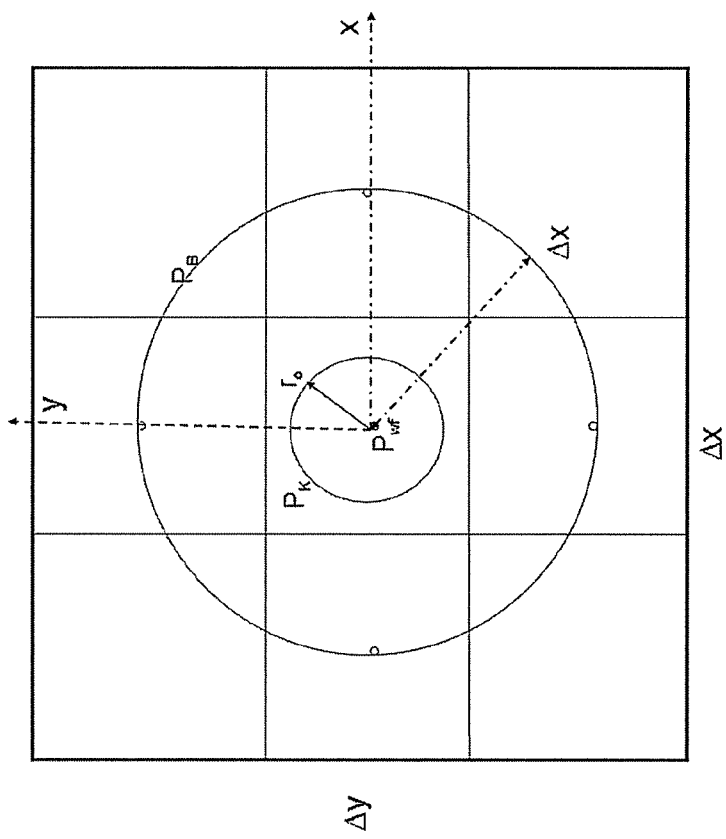
FIG. 14 is a schematic diagram of an areal view of the mathematical definition of the equivalent well block radius for horizontal flow of a perforated well where the well perforation is located in the middle of a three dimensional coordinate grid block according to an exemplary embodiment of this invention.

More particularly, consider for example a well perforation located in the middle of a square grid block cell positioned in the middle of a square coordinate grid block, as is perhaps best illustrated in FIG. 14. In FIG. 14, $r_o$ indicates or represents the equivalent well block radius, $P_{wf}$ indicates or represents the bottom hole flowing pressure, $P_k$ indicates or represents the grid block pressure of the central cell k, and $P_B$ indicates or represents the grid block pressure of the grid block cells surrounding the grid block cell housing the well perforation located in the middle of the square coordinate grid block. As is known and understood by those skilled in the art, the two dimensional flow rate into the perforation k located at the center of the central cell k is given by the multi-variable mathematical equation indicated or represented by:

$$q_k = WI_k(P_k - P_{wf}) \quad \text{(Equation 1)}$$

In Equation (1), $WI_k$ indicates or represents the well or perforation index for the grid block k, and is further defined by the multi-variable mathematical equation indicated or represented by:

$$WI_k = \frac{2\pi k_x \Delta z}{\ln\left(\frac{r_o}{r_w}\right)} \quad \text{(Equation 2)}$$

In Equation (2), $r_o$ is called the "equivalent well block radius" and is calculated by using Peaceman's formula. Peaceman's formula, as is known and understood by those skilled in the art can be defined in terms of a single-variable mathematical equation indicated or represented by:

$$r_0 = \Delta x e^{-\frac{\pi}{2}} \cong 0.2 \Delta x \quad \text{(Equation 3)}$$

In Equation (1), as it is known and understood by those skilled in the art, is valid only for radial flow with no vertical flow effects. Therefore, using $r_o$ defined by Equation (3) in Equation (2) to determine the well perforation index for a grid block cell and subsequently using such an index to calculate the flow rate into a grid block perforation yields erroneous results for simulations where vertical flow is a non-negligible factor. The magnitude of the erroneous results depends on the magnitude of the vertical flow, which can be small or large based on the vertical permeability and location of the perforation. Generally, edge perforations are more affected by vertical flow than perforations located in the center of a coordinate grid block, and accordingly, the present invention is particularly beneficial for such edge perforations. Moreover, various exemplary embodiments of the present invention, unlike in contrast to current methods and machines, produces accurate results even for thick reservoirs with high permeability where the effect of vertical flow on the perforation indices is especially pronounced.

For three dimensional flow rates of a partially penetrating vertical well, as is known and understood by those skilled in the art, the flow rate into a well perforation at a perforated grid block cell can be indicated or represented by:

$$q = \frac{2\pi \overline{k} \overline{h}}{\mu} \frac{h_p}{h_t} \left[ 1 + 7 \sqrt{\frac{r_w}{2h_p} \cos\left(\frac{\pi}{2} \frac{h_p}{h_t}\right)} \right] \frac{(\Phi_e - \Phi_{wf})}{\ln\left(\frac{r_e}{r_w}\right)} \quad \text{(Equation 4)}$$

where $\overline{k} = \sqrt{k_x k_z}$, $\overline{h} = h_t \sqrt{\frac{k_x}{k_z}}$.

Figure 15:
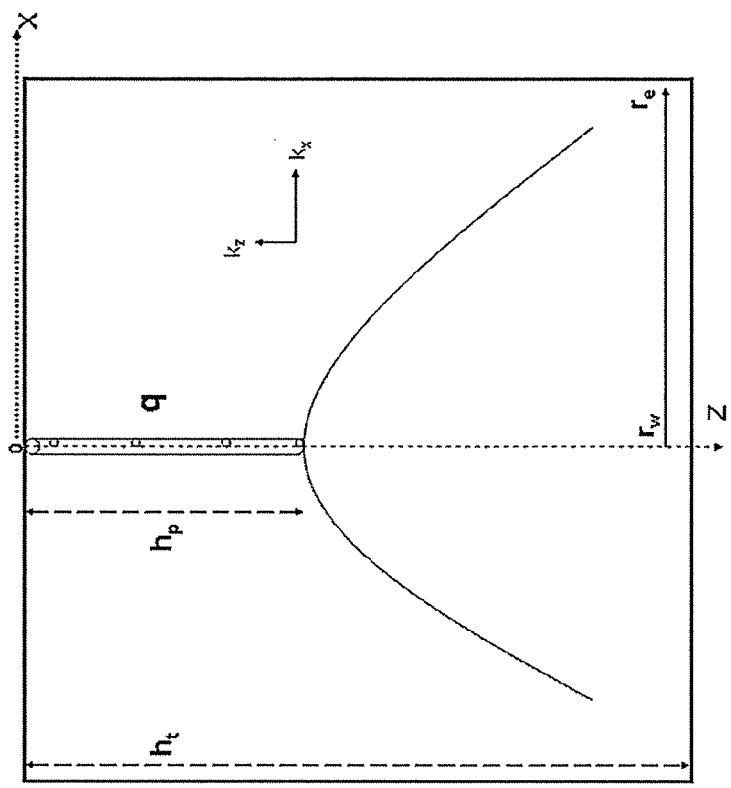
FIG. 15 is a schematic diagram of a partially penetrating well model according to an exemplary embodiment of this invention.

FIG. 15 perhaps best illustrates a partially penetrating well model for which flow rate into a well perforation at a perforated grid block cell can be determined using Equation 4 according to an exemplary embodiment of the present invention. In equation (7), $h_p$ indicates or represents the open perforated interval (i.e., well perforation), as is known and understood by those skilled in the art, $h_t$ indicates or represents the total formation thickness, as is known and understood by those skilled in the art, $\Phi_e$ indicates or represents the fluid potential at the drainage boundary, as is known and understood by those skilled in the art, and $\Phi_{wf}$ represents the specified well potential, as is known and understood by those skilled in the art. The fluid potential $\Phi$ can be beneficially defined by a mathematical equation indicated or represented by:

$$\Phi = p - \rho g z \quad \text{(Equation 5)}$$

In Equation (5), $\rho$ indicates or represents the average fluid density, as is known and understood by those skilled in the art, g indicates or represents the gravitational constant, as is known and understood by those skilled in the art, and z indicates or represents the vertical distance from a reference depth, which is usually the top of the well formation, as is known and understood by those skilled in the art. To calculate the perforation rate for a grid block k, for a three dimensional partially penetrating vertical well (as opposed to a two dimensional partially penetrating well as described above in Equation (4)), Equation (4) can be rewritten and expressed as a mathematical equation of multiple variables indicated or represented by:

$$q_k = \frac{2\pi \overline{h}}{\mu} \overline{h} \frac{\Delta z}{H} \left[ 1 + 7 \sqrt{\frac{r_w}{2\Delta z} \cos\left(\frac{\pi}{2} \frac{\Delta z}{H}\right)} \right] \frac{(\Phi_k - \Phi_{wf})}{\ln\left(\frac{r_{o,3D}}{r_w}\right)} \quad \text{(Equation 6)}$$

In Equation (6), $\Delta z$ indicates or represents the thickness of the open perforation, as is known and understood by those skilled in the art, and H indicates or represents the total petroleum reservoir thickness, as is known and understood by those skilled in the art. Furthermore, the term $\Phi_k$ in Equation (6) indicates or represents the fluid potential for grid block cell k, and can be beneficially calculated by the petroleum reservoir simulator according to various exemplary embodiments of the present invention. Additionally, $r_{o,3D}$ indicates or represents the unknown three dimensional equivalent well block radius on which $\Phi_k$ resides. A mathematical proof that $\Phi_k$ resides on (i.e., is located at) $r_{o,3D}$ is beneficially provided in Appendix C, below.

Beneficially, for example, embodiments of the present invention are not limited to two dimensional flow but instead take into account flow both in the horizontal and vertical directions. As calculated by Equation (6), the perforation rate, indicated or represented by $q_k$, assumes that a grid block cell k, with vertical thickness indicated or represented by $\Delta z$, receives flow from other grid block cells located above and below such a grid block cell in addition to receiving horizontal flow from surrounding adjacent grid block cells in the horizontal plane. That is, vertical flow contribution comes from the entire thickness H of the three dimensional coordinate grid block.

Rearranging Equation (6), the new well index or perforation index, as is known and understood by those skilled in the art, for a vertical well can beneficially be expressed as a mathematical equation of multiple variables indicated or represented by:

$$WI_k = \frac{2\pi k_x \Delta z}{\ln\left(\frac{r_{o,3D}}{r_w}\right)} \frac{\left[1 + 7\sqrt{\frac{r_w}{2\Delta z}\cos\left(\frac{\pi}{2}\frac{\Delta z}{H}\right)}\right]}{f_p} \quad \text{(Equation 7)}$$

Equation (7) can be expressed in simplified form:

$$WI_k = \frac{2\pi k_x \Delta z}{\ln\left(\frac{r_{o,3D}}{r_w}\right)} f_p, \quad \text{(Equation 8)}$$

$$\text{where } f_P = \left[1 + 7\sqrt{\frac{r_w}{2h_p}\cos\left(\frac{\pi}{2}\frac{\Delta z}{H}\right)}\right]. \quad \text{(Equation 9)}$$

The mathematical variable indicated or represented by $f_p$ in Equation (8) and Equation (9) indicates or represents the partial penetration factor. Beneficially, and so that embodiment of this present invention can be easily used in conjunction with legacy petroleum reservoir simulators, the partial penetration factor determined using Equation 9, above, equals one for a folly penetrating well or for a partially penetrating well with two dimensional flow (i.e., negligible three dimensional flow).

Equation (9), for example, represents mathematically a new definition of the well index or perforation index" (as is known and understood by those skilled in the art) for a vertical well that takes into account both horizontal and vertical flow according to an exemplary embodiment of the present invention. More specifically, according to various embodiments of the present invention, Equation (9) can be beneficially used to generate an expression for the perforation rate of a grid block cell, k. Such an expression for the perforation rate of a grid block cell, k, according to an exemplary embodiment of the present invention, can be indicated or represented mathematical by an equation of multiple variables:

$$q_k = WI_k(\Phi_k - \Phi_{wf}) \quad \text{(Equation 10)}$$

In contrast to current systems, methods, machines, and computer program products for determining the perforation rate of a grid block cell, k, as indicated or represented by Equation (1), which is only accurate for two dimensional well flow, Equation 10 includes a perforation index, $WI_k$, that takes into account the three dimensional flow effects through the use of $r_{o,3d}$, a mathematical indication or representation of the equivalent well block radius for three dimensional flow of a perforated grid block cell, k. Conversely, current definitions of $WI_k$ as currently known and understood in the art, (i.e., the definition of $WI_k$ as used in Equation (1)) only accounts for two dimensional horizontal well flow. In order to apply Equation 10, to determine the perforation rate of a grid block cell, k, due to three dimensional flow, however, a three dimensional equivalent well block radius should first be defined. According to an exemplary embodiment of the present invention, for example, a three dimensional equivalent well block radius indicated or represented mathematically by, $r_{o,3d}$, can be defined using a uniform grid block in the areal direction and a similarly uniform grid block in the vertical direction for an anisotropic porous media.

Certain exemplary embodiments of the present invention can accurately determine a three dimensional equivalent well block radius for homogeneous, anisotropic media with constant grid block cell size. Nevertheless, exemplary embodiments of the present invention, however, are advantageously not limited to determinations of a three dimensional equivalent well block radius defined using a uniform grid block. Specifically, in the case of variable grid sizes (i.e., varying grid block cell sizes in both areal and vertical directions), and completely heterogeneous systems, no analytical solution is possible. Accordingly, a general numerical solution, as set forth and detailed in Appendix B, should be used to determine an equivalent well block radius for three dimensional flow according to various exemplary embodiments of the present invention. Particularly, Appendix B, below, sets forth a thorough explanation of the determination of a three dimensional well block radius in instances where the coordinate grid block is a complete general nonuniform grid with complete heterogeneity (as is known and understood by those skilled in the art). As described in more detail in Appendix B, a solution for such completely heterogeneous systems requires only a solution of a tridiagonal linear system which can be performed at every time step of a petroleum reservoir simulator or, alternatively, at the beginning of a simulator run.

Figure 17:
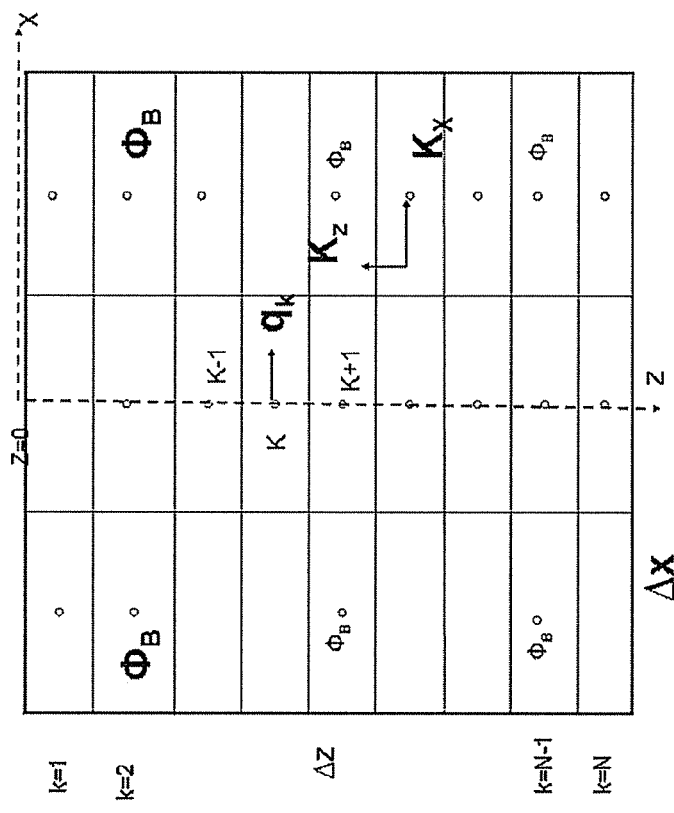
FIG. 17 is a schematic block diagram graphically illustrating the constant potential boundary conditions in the vertical plane surrounding a portion of an infinite reservoir where a well is located at the center of a three dimensional coordinate grid block according to an exemplary embodiment of the present invention.
Figure 16:
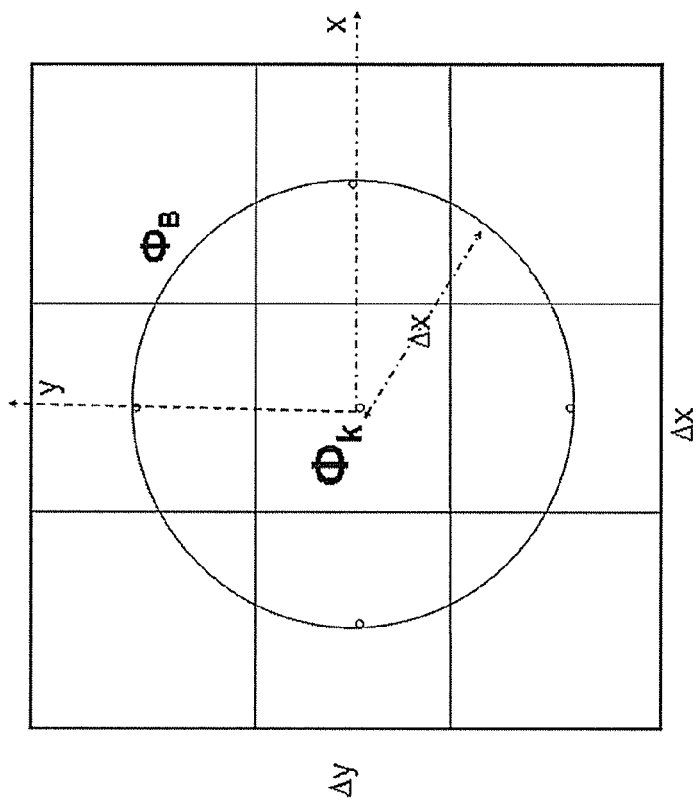
FIG. 16 is a schematic diagram graphically illustrating the constant potential boundary conditions in the areal plane surrounding a portion of an infinite reservoir or field where a well is located at the center of a three dimensional coordinate grid block according to an exemplary embodiment of the present invention.

Consider, by way of example, a portion of an infinite reservoir, alternatively called a field, where a well is located at the center of a three dimensional coordinate grid block as is perhaps best illustrated graphically by FIGS. 16 and 17 according to an exemplary embodiment of the present invention. According to such an exemplary embodiment of the present invention, x and y each indicate or represent orthogonal axes in the areal plane. Moreover, according to such an exemplary embodiment of the present invention, the portion of the reservoir represented by the three dimensional coordinate grid block can be beneficially divided into finite difference grid block cells such that $\Delta x = \Delta y$ in the areal directions. Additionally, for example, the entire reservoir thickness, indicated or represented by H, can be beneficially divided into $N_z$ (i.e., a mathematical variable representing a certain quantity) vertical layers with constant thickness indicated or represented by $\Delta z$ and constant porosity (as is known and understood by those skilled in the art). In this embodiment of the present invention, the location of each grid block cell can be represented by a three dimensional array of coordinates indicated or represented by, $k_x$, $k_y$, and $k_z$, such that the three coordinates are constant for any particular grid block cell and $k_x$ is equal to $k_y$ but not equal to $k_z$. Moreover, according to an exemplary embodiment of the present invention, the above described mathematical model can be beneficially simplified by assuming that all the neighboring grid block cells to the perforated grid block cells have constant potential, indicated or represented by $\Phi_B$, in the x, y direction, flow from the neighbor grid block cells into the central grid block cell is radial, and vertical flow only takes place along the vertical well axis, indicated or represented by z.

The constant potential assumption described above, and according to an exemplary embodiment of the present invention, is realistic for field-scale simulation models. As is known and understood by those skilled in the art, a field-scale simulation model can include, for example, models that span an entire section of an infinity reservoir. Specifically, it is natural to think that potentials in the neighboring grid block cells do not vary significantly over the simulation time step which is usually a couple of weeks to one month. Also, for example, wells generally reach pseudo steady state after the initial transient portion, or fluid expansion, of production. The transient portion of production is generally short compared to the long production lives of many typical reservoirs. Beneficially, the aforementioned assumptions are easily realized for thick, large oil reserves with high permeability.

Figure 19:
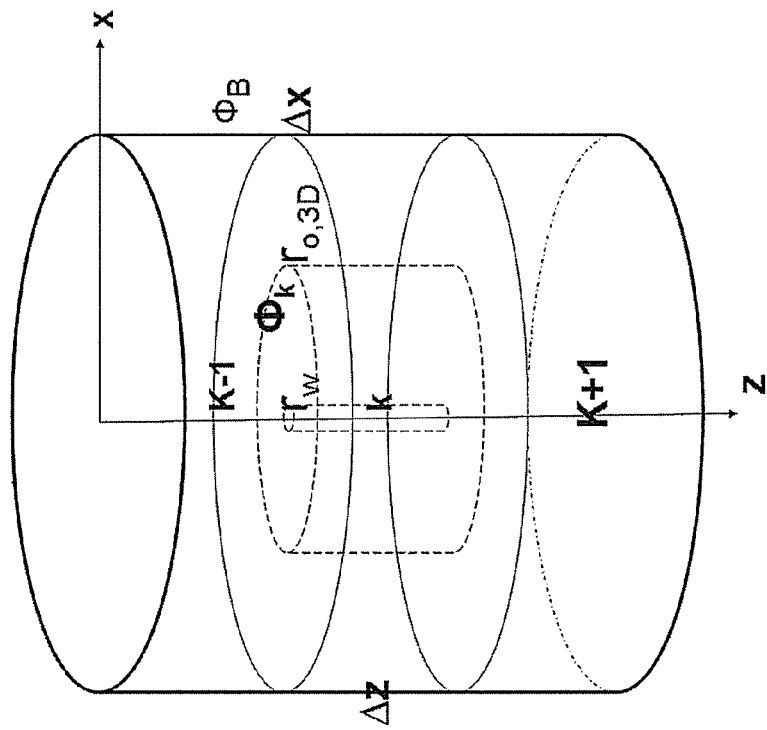
FIG. 19 is a schematic block diagram graphically illustrating a three dimensional view of the mathematical definition of the equivalent well block radius for three dimensional flow of a perforated well grid block cell according to an exemplary embodiment of the present invention.
Figure 18:
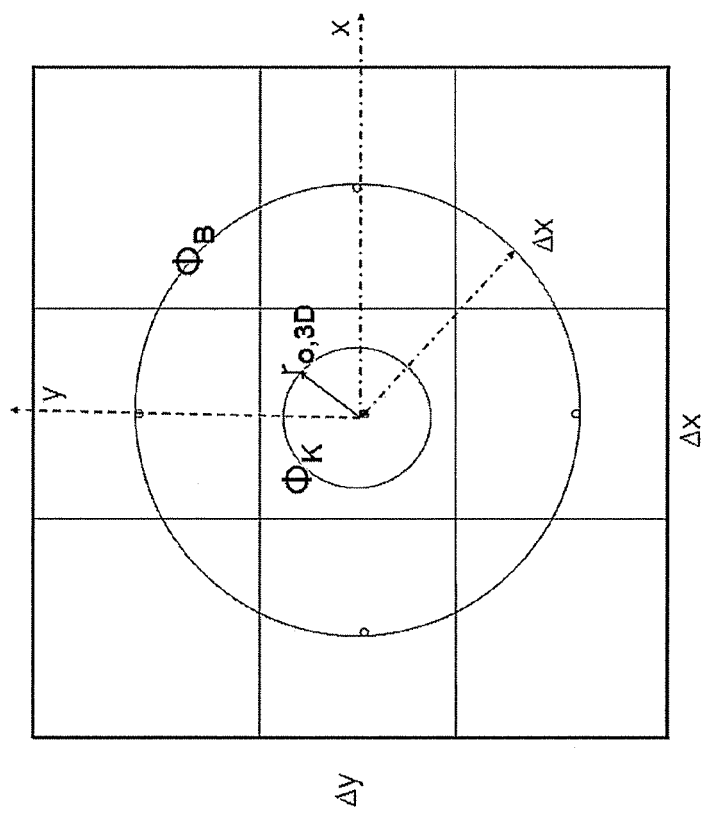
FIG. 18 is a schematic block diagram graphically illustrating an areal view of the mathematical definition of the equivalent well block radius for three dimensional flow of a perforated well grid block cell according to an exemplary embodiment of the present invention.

Furthermore, according to various exemplary embodiments of the present invention, an equivalent well block radius for three dimensional flow for a grid block cell k can be defined by a steady state volume balance equation for a grid block cell k, as is perhaps best illustrated graphically in FIGS. 18 and 19. Specifically, assuming constant fluid viscosity indicated or represented by μ (as is known and understood by those skilled in the art), the volume balance for a grid block cell k can be expressed as a mathematical equation of multiple variables:

$$4T_x(\Phi_B - \Phi_k) + T_z(\Phi_{k-1} - \Phi_k) + T_z(\Phi_{k+1} - \Phi_k) = 2\pi k_x \Delta z f_p \frac{(\Phi_B - \Phi_k)}{\ln \frac{\Delta x}{r_{o,3D}}}$$ (Equation 11)

where the transmissibility of the well can be indicated or represented by $T_x$ and $T_z$ as is known and understood the those skilled in the art.

Equation (11), according to various exemplary embodiments of the present invention, can define a new three dimensional equivalent well block radius, $r_{o,3D}$, for a square grid block cell of a finite deference petroleum reservoir simulator. Beneficially, this new three dimensional equivalent well block radius can take into account both horizontal and vertical flow effects thereby increasing the accuracy of simulated productivity indices and projection rates for perforated wells. Beneficially, for example, Equation (11) can be rearranged into a mathematical equation of multiple variables indicating or representing a three dimensional equivalent well block radius:

$$r_{o,3D} = \Delta x e^{-\frac{\pi f_p}{2 + \frac{1}{2}\frac{k_z}{k_x}\left(\frac{\Delta x}{\Delta z}\right)^2 \left[\left(\frac{\Phi_{k-1} - \Phi_k}{\Phi_B - \Phi_k}\right) + \left(\frac{\Phi_{k+1} - \Phi_k}{\Phi_B - \Phi_k}\right)\right]}}$$ (Equation 12)

In order to obtain an analytical expression for a three dimensional equivalent well block radius indicated or represented by $r_{o,3D}$, however, an analytical solution for the well potential, indicated or represented by $\Phi$ (as is known and understood by those skilled in the art), should be obtained first.

According to an exemplary embodiment of the present invention, a new analytical solution for the well potential, as further described and derived in Appendix A, (i.e., Appendix A, Equation A-31) can be substituted into Equation (12) thereby resulting in an analytical expression for a three dimensional equivalent well block radius for a single perforated grid block cell k with neighboring grid block cells indicated or represented by k−1 and k+1 respectively. The analytical expression for such a three dimensional equivalent well block radius can be indicated or represented by a mathematical equation of multiple variables:

$$r_{o,3D} = \Delta x e^{-\frac{\pi f_p}{2 + \frac{1}{2}\frac{k_z}{k_x}\left(\frac{\Delta x}{\Delta z}\right)^2 \left[2 - \frac{\cosh(\sqrt{\alpha}\, z_{k-1})}{\cosh(\sqrt{\alpha}\, z_k)} - \frac{\cosh(\sqrt{\alpha}\,(H - z_{k+1}))}{\cosh(\sqrt{\alpha}\,(H - z_k))}\right]}}$$ (Equation 13)

A close examination of Equation (13) reveals a close resemblance to Equation (3) which is the equivalent well block radius for two dimensional flow of a perforated well, otherwise known by those skilled in the art as Peaceman's equation. According to various embodiments of the present invention, Equation (13), for example, can be rewritten to obtain a general fowl for a three dimensional equivalent well block radius, $r_{o,3D}$, described mathematically by an equation of multiple variables indicated or represented by:

$$r_{o,3D} = \Delta x e^{-\frac{\pi f_p}{2 + f_z}}$$ (Equation 14)

Beneficially, the two new mathematical terms indicated or represented by $f_p$ and $f_z$ respectively in Equation (14) represent the effect of the three dimensional flow according to various embodiments of the present invention. The partial penetration factor indicated or represented by $f_p$, for example, can be defined by Equation (9), above, in instances where a three dimensional coordinate grid block includes only a single well perforation housed within a single perforated grid block cell. The other constant, known as the vertical flow correction factor and indicated or represented by $f_z$, reflects the effects of the vertical flow and, beneficially, can be dependent on the location of the well perforation within the three dimensional coordinate grid block. For example, the well perforation may be positioned at the top of the three dimensional coordinate grid block, at the bottom of the three dimensional coordinate grid block, or at some position between the top and bottom of the three dimensional coordinate grid block. Accordingly, various embodiments of the present invention can determine the location of the well perforation and select the expression of $f_z$ that corresponds to the well perforation location within the three dimensional coordinate grid block.

A close examination of Equation (14) reveals that a three dimensional well block radius indicated or represented by $r_{o,3D}$ can be beneficially reduced to a two dimensional expression for an equivalent well block radius, as indicated or represented by Equation (4), in cases where vertical flow is nonexistent or negligible. This equation is known generally as Peaceman's formula for two dimensional horizontal flow to those skilled in the art. More specifically, in scenarios where there is only two dimensional radial flow, $k_z=0$ and hence $f_z=0$ and $f_p=1$ because vertical flow is nonexistent and there is full penetration for a single grid block cell indicated or represented by k. Thus, for horizontal flow in situations where vertical flow is either negated or nonexistent, Equation (14) can be simplified and accordingly indicated or represented by:

$$r_{o,3D} = \Delta x e^{-\frac{\pi}{2}} \cong 0.2\Delta x,$$ (Equation 3)

As used by Equation (14), the partial penetration factor, indicated or represented by $f_p$, depends on the ratio of the perforated interval over the total well thickness, as is known and understood by those skilled in the art. Additionally as compared to the vertical flow correction factor, indicated or represented by $f_z$, the partial penetration factor does not depend on the coordinate location of a perforated well grid block cell in a three dimensional coordinate grid block. On the other hand, the vertical correction factor, $f_z$, depends on the location of the perforation along the vertical well axis, indicated or represented by z. Beneficially, the three dimensional well block radius presented in Equation (14) according to an embodiment of the present invention is computationally inexpensive. Furthermore, because it can be reduced to the well-known equation for two dimensional horizontal flow in cases where vertical flow is negligible or nonexistent, the three dimensional equivalent well block radius can be readily incorporated into legacy reservoir simulators.

Beneficially, embodiments of the present invention can determine the equivalent well block radius for three dimensional flow of a perforated well regardless of whether there is a single perforation or multiple perforations positioned within a three dimensional coordinate grid block and regardless of the location of the perforation or perforations within such a three dimensional coordinate grid block. For example, an embodiment of the present invention can be provided, as input, the location of a perforated grid block cell, such as perforation at the top of the well formation, perforation at the bottom of the well formation, or perforation away from, or in between, the top and bottom boundaries of the well formation. Depending on the number of perforations and the locations of the perforations of the well grid block, the new three dimensional well block radius parameters $f_p$ and $f_z$ can be determined using selected different mathematical equations. The selected different mathematical equations are presented herein with details of the various derivations presented in Appendix A, below.

Figure 20:
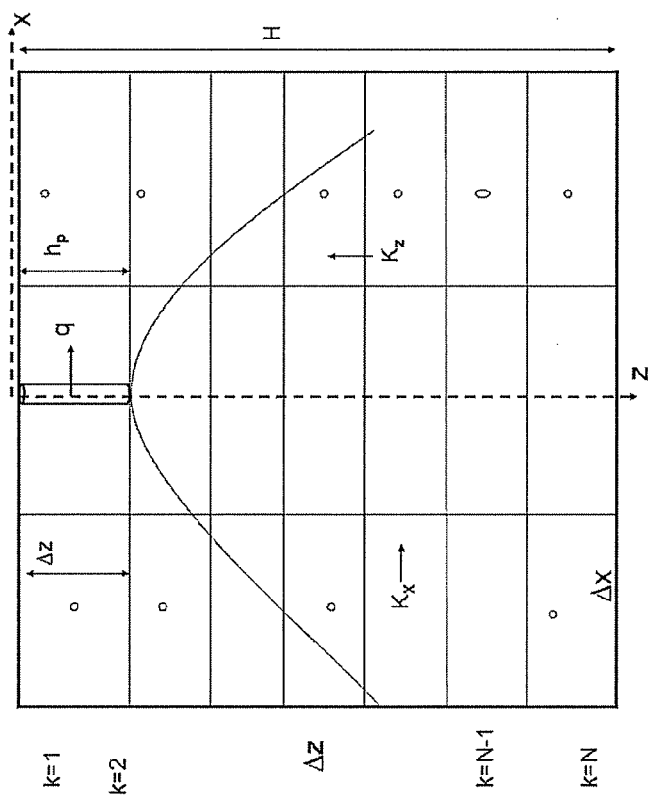
FIG. 20 is a schematic block diagram graphically illustrating a single perforated well grid block cell located in the top layer of a three dimensional simulated well formation according to an exemplary embodiment of the present invention.

As is perhaps best illustrated by FIG. 20, in one potential completion scenario, a single well perforation can be positioned, for example, at the top layer of a well formation according to an exemplary embodiment of the present invention. As described in greater detail above, a three dimensional coordinate grid block can be constructed over the well formation so as to house the single well perforation in a perforated grid block cell located at the top of the three dimensional coordinate grid block. Accordingly, for well grid blocks with only a single perforation, the partial penetration factor, $f_p$, can be indicated or represented mathematically as a function of multiple variables:

$$f_P = \left[1 + 7\sqrt{\frac{r_w}{2h_P}\mathrm{Cos}\left(\frac{\pi}{2}\frac{\Delta z}{H}\right)}\right] \quad \text{(Equation 16)}$$

where $r_w$ indicates or represents the radius of the well penetrating through the three dimensional coordinate grid block, $h_p$ indicates or represents the vertical height of the perforated interval, $\Delta z$ indicates or represents the vertical thickness of each well grid block (i.e., the uniform vertical height as described in greater detail above), and H indicates or represents the total thickness of the formation. Because the partial penetration factor as described in Equation 16 is not dependent on the coordinate location of the well perforation, the partial penetration factor as indicated and represented by Equation 16 can beneficially be used for any completion scenario where there is only a single well perforation positioned within the three dimensional coordinate grid block. Moreover, a partial penetration factor determined according to various exemplary embodiments of the present invention can vary between 0 and 1.

According to such an exemplary embodiment of the present invention where a single well perforation is positioned at the top layer of a well formation, the vertical flow correction factor, indicated or represented by $f_z$, can be described mathematically as a function of multiple variables:

$$f_z = \frac{1}{2}\frac{k_z}{k_x}\left(\frac{\Delta x}{\Delta z}\right)^2\left[1 - \frac{\mathrm{Cosh}(\sqrt{\alpha}\,(H - z_{k+1}))}{\mathrm{Cosh}(\sqrt{\alpha}\,(H - z_k))}\right] \quad \text{(Equation 17)}$$

where $z_k$ indicates or represents the depth of the perforation k, and $z_{k+1}$ is the depth of the next perforation in the z direction (i.e., the vertical direction along the well axis), as is understood by those skilled in the art. Additionally, as used throughout:

$$\alpha = \frac{4k_x}{k_z \Delta x^2} \quad \text{(Equation 17a)}$$

Figure 21:
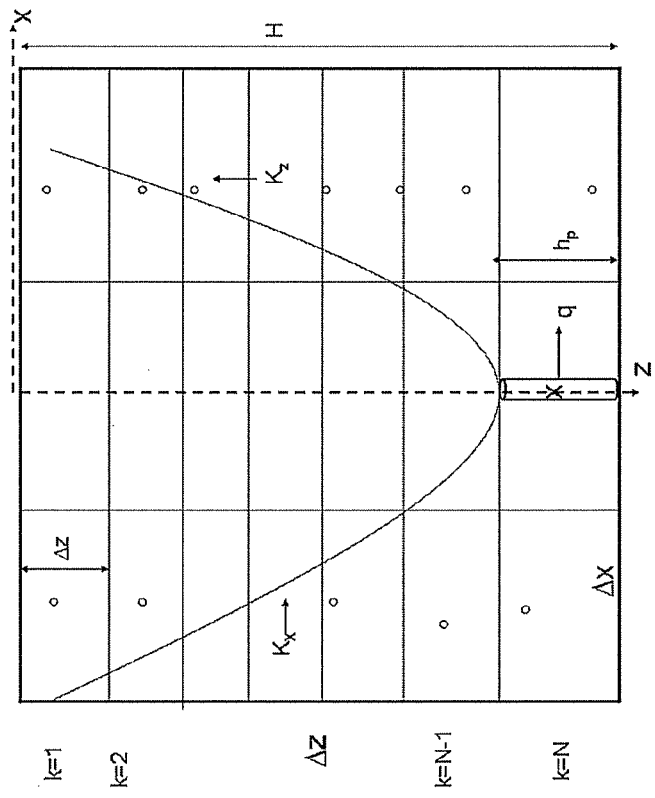
FIG. 21 is a schematic block diagram graphically illustrating a single perforated well grid block cell located in the bottom layer of a three dimensional simulated well formation according to an exemplary embodiment of the present invention.

As is perhaps best illustrated in FIG. 21, for example, in another potential completion scenario, a single well perforation can be positioned, for example, at the bottom layer of a well formation according to an exemplary embodiment of the present invention. As described in greater detail above, a three dimensional coordinate grid block can be constructed over the well formation so as to house the single well perforation in a perforated grid block cell located at the bottom of the three dimensional coordinate grid block. Accordingly, for well grid blocks with only a single perforation positioned at the bottom layer of the formation, the vertical flow correction factor, $f_z$, can be indicated or represented mathematically as a function of multiple variables:

$$f_z = \frac{1}{2}\frac{k_z}{k_x}\left(\frac{\Delta x}{\Delta z}\right)^2\left[1 - \frac{\mathrm{Cosh}(\sqrt{\alpha}\,z_{N-1})}{\mathrm{Cosh}(\sqrt{\alpha}\,z_N)}\right] \quad \text{(Equation 18)}$$

where N represents the perforated grid block number, and N−1 represents the neighboring grid block number on the vertical well axis.

Figure 22:
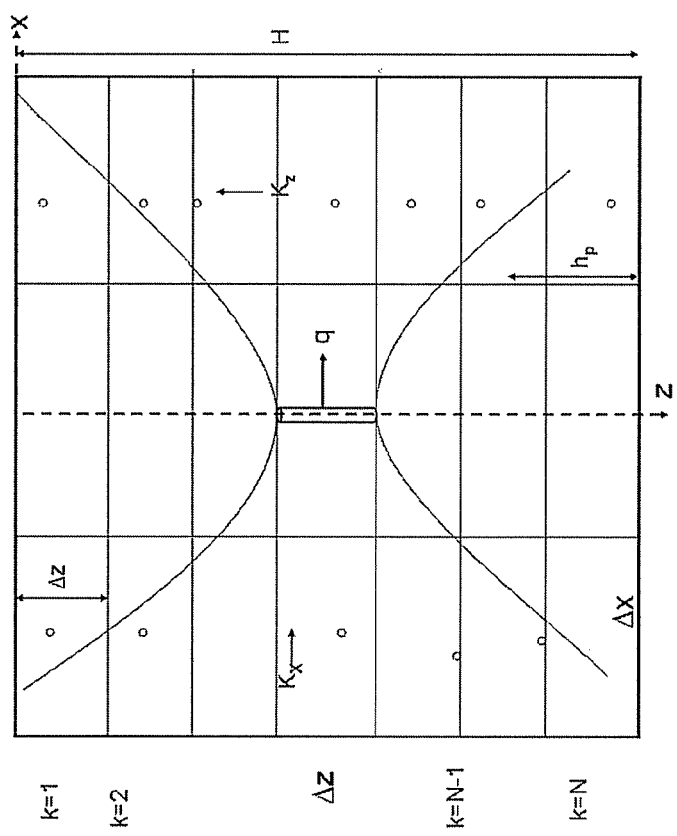
FIG. 22 is a schematic block diagram graphically illustrating a single perforated well grid block cell located in the layers of a well formation positioned between the top and bottom layers of a three dimensional simulated well formation according to an exemplary embodiment of the present invention.

As is perhaps best illustrated in FIG. 22, for example, in another potential completion scenario, a single well perforation can be positioned, for example, at layers of a well formation in between the top layers and the bottom layers of the well formation according to an exemplary embodiment of the present invention. As described in greater detail above, a three dimensional coordinate grid block can be constructed over the well formation so as to house the single well perforation in a perforated grid block cell located within the three dimensional coordinate grid block but neither at the top nor the bottom layers of such three dimensional coordinate grid block. Accordingly, for well grid blocks with only a single perforation positioned neither at the top nor the bottom layers of a well formation, the vertical flow correction factor, $f_z$, can be indicated or represented mathematically as a function of multiple variables:

$$f_z = \frac{1}{2}\frac{k_z}{k_x}\left(\frac{\Delta x}{\Delta z}\right)^2\left[2 - \frac{\mathrm{Cosh}(\sqrt{\alpha}\,z_{k-1})}{\mathrm{Cosh}(\sqrt{\alpha}\,z_k)} - \frac{\mathrm{Cosh}(\sqrt{\alpha}\,(H - z_{k+1}))}{\mathrm{Cosh}(\sqrt{\alpha}\,(H + z_k))}\right] \quad \text{(Equation 19)}$$

where k represents the coordinate location of the perforated well grid block and k−1 and k+1, respectively, represent the coordinate location of neighboring well grid blocks below and above the perforated well grid block on the vertical well axis.

Figure 23:
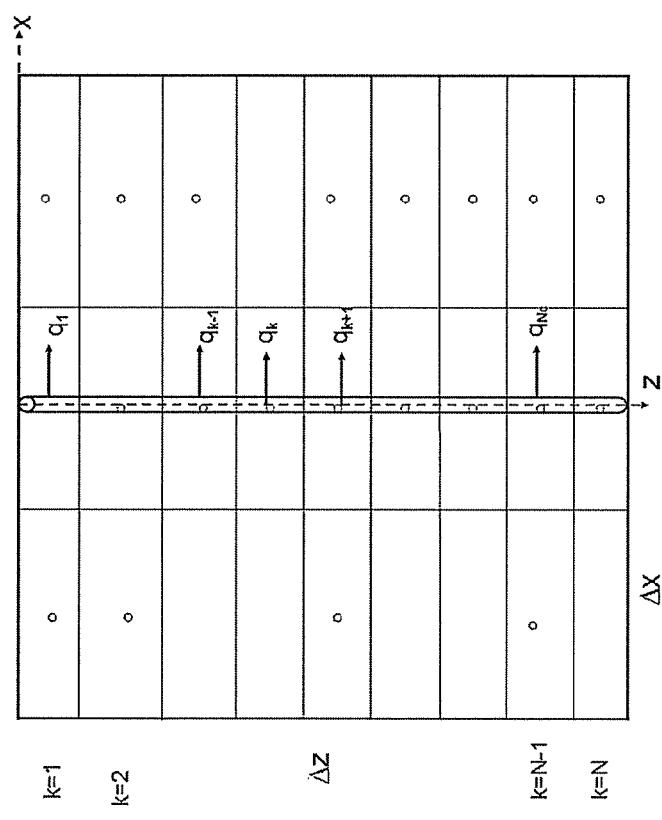
FIG. 23 is a schematic block diagram graphically illustrating a plurality of perforated well grid block cells positioned at a plurality of coordinate locations along a vertical well axis of a three dimensional simulated well formation according to an exemplary embodiment of the present invention.

In another embodiment of the present invention, the equivalent well grid block radius can be calculated for a well formation that has multiple perforations at multiple locations throughout the formation. In such a completion case, according to exemplary embodiments of the present invention, a three dimensional coordinate grid block can be constructed over the well formation so as to house the multiple well perforations in multiple perforated grid block cells each located at positions within the three dimensional coordinate grid block. Beneficially, embodiments of the present invention are agnostic to whether there is a single perforation or multiple perforations. FIG. 23, for example, perhaps best illustrates multiple perforated grid block cells positioned at multiple coordinate locations along the vertical well axis. According to an embodiment of the present invention, for example, if there are $N_c$ number of completions (i.e. perforated grid block cells, as is known and understood by those skilled in the art), then $f_p$ can be mathematically described by:

$$f_P = \left[1 + 7\sqrt{\frac{r_w}{2h_P}\cos\left(\frac{\pi}{2}\frac{N_c \Delta z}{H}\right)}\right] \quad \text{(Equation 20)}$$

where $r_w$ indicates or represents the radius of the well penetrating through the three dimensional coordinate grid block, $h_p$ indicates or represents the vertical height of the perforated interval, $N_c$ indicates or represents the quantity of perforated grid block cells (i.e., the number of completions as is understood by those skilled in the art), $\Delta z$ indicates or represents the vertical thickness of each well grid block (i.e., the uniform vertical height as described in greater detail above), and H indicates or represents the total thickness of the formation.

The mathematical representation of the partial penetration factor, $f_p$, is constant for scenarios where there is only a single well block perforation, regardless of the coordinate location of such perforation. Conversely, the partial penetration factor, $f_p$, as described by Equation (19), above, can be modified by the addition of the variable $N_c$ to take into account the scenarios involving multiple well grid block perforations. In scenarios, for example, where there are multiple grid block perforations, k, the vertical flow correction factor, $f_z$, can be mathematical indicated or represented as a function of multiple variables:

$$f_{z_k} = \frac{1}{2}\frac{k_z}{k_x}\left(\frac{\Delta x}{\Delta z}\right)^2 \quad \text{(Equation 21)}$$

$$\frac{\left\{\sum_{j=1}^{N_C}\delta(z_{k-1} \leq z_j)\frac{2f_{jL}}{\beta_{jL}}\cosh(\sqrt{a}\,z_{k-1}) + \delta(z_{k-1})z_j)\frac{2f_{jR}}{\beta_{jR}}\cosh(\sqrt{\alpha}\,(H - z_{k-1})) - \sum_{j=1}^{N_C}\delta(z_k \leq z_j)\frac{2f_{jL}}{\beta_{jL}}\cosh(\sqrt{\alpha}\,z_k) + \delta(z_k)z_j\frac{2f_{jR}}{\beta_{jR}}\cosh(\sqrt{\alpha}\,(H - z_k)) + \sum_{j=1}^{N_C}\delta(z_{k+1} \leq z_j)\frac{2f_{jL}}{\beta_{jL}}\cosh(\sqrt{a}\,z_{k+1}) + \delta(z_{k+1})z_j)\frac{2f_{jR}}{\beta_{jR}}\cosh(\sqrt{\alpha}\,(H - z_{k+1})) - \sum_{j=1}^{N_C}\delta(z_k \leq z_j)\frac{2f_{jL}}{\beta_{jL}}\cosh(\sqrt{a}\,z_k) + \delta(z_k)z_j)\frac{2f_{jR}}{\beta_{jR}}\cosh(\sqrt{\alpha}\,(H - z_k))\right\}}{\left\{\sum_{j=1}^{N_C}\delta(z_k \leq z_j)\frac{2f_{jL}}{\beta_{jL}}\cosh(\sqrt{\alpha}\,z_k)^j + \delta(z_k)z_j)\frac{2f_{jR}}{\beta_{jR}}\cosh(\sqrt{\alpha}\,(H - z_k))\right\}}$$

where $f_{ij}$, $\beta_{ij}$ are further defined in the Appendix A, below and $\delta(u)$ is the Dirac's delta function, as known and understood by those skilled in the art, indicated or represented by:

$$\delta(u) = \{{}_{0,u\,is\,false}^{1,u\,is\,true} \quad \text{(Equation 22)}$$

Figure 24A:
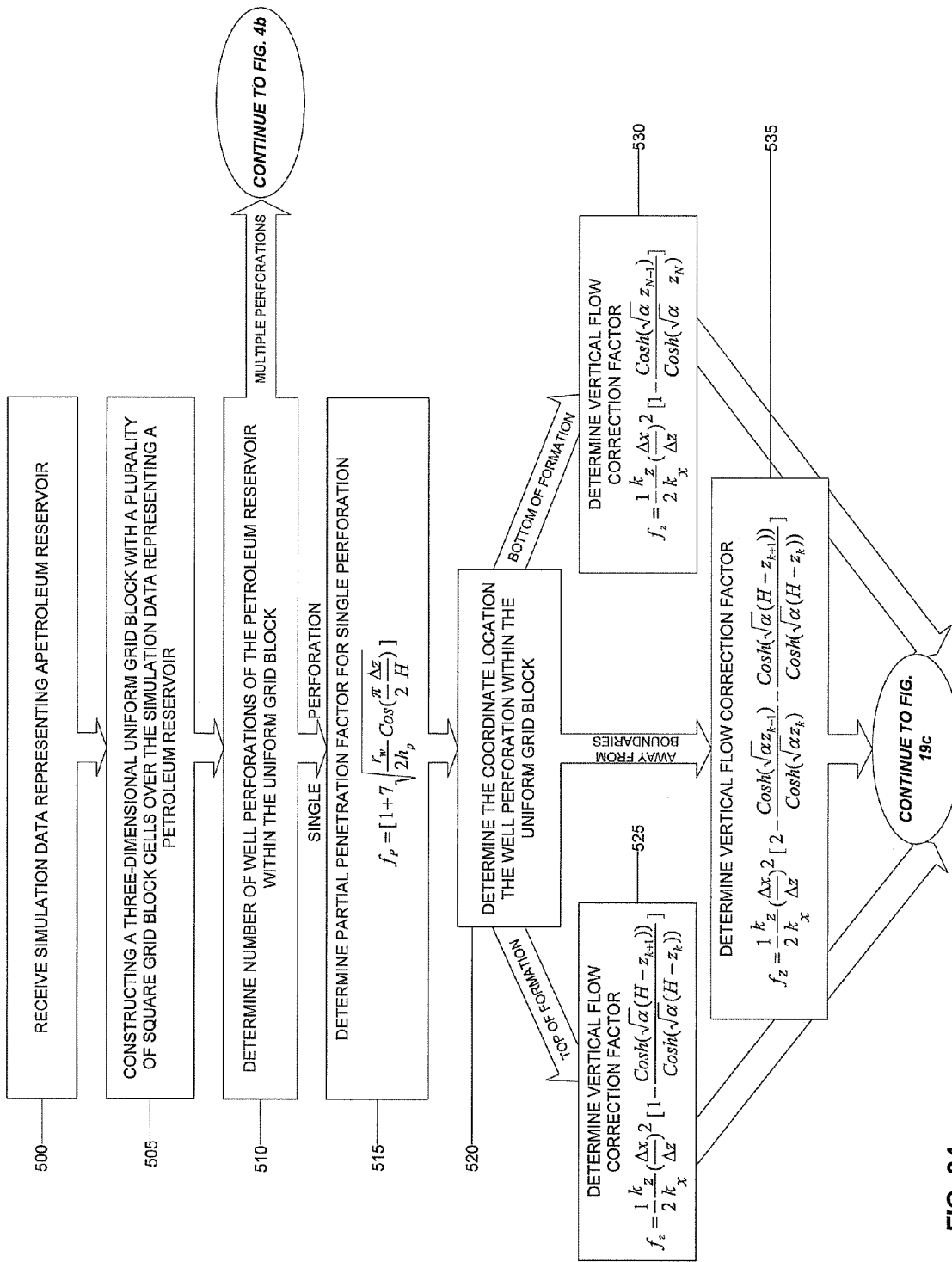
FIG. 24(a) is a low-level, detailed schematic block flow diagram illustrating various mathematical calculations and manipulations performed by a method to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.
Figure 24B:
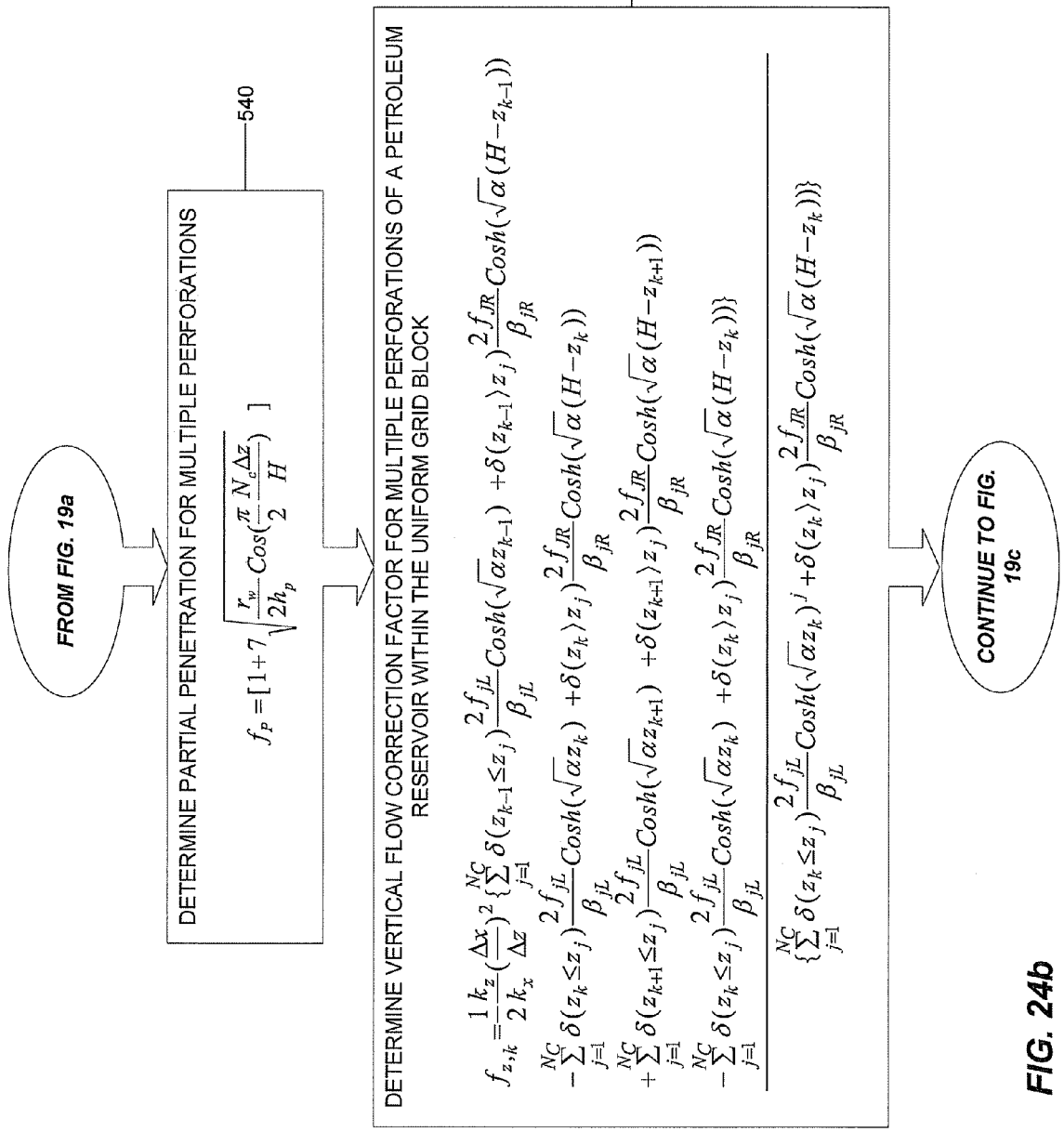
FIG. 24(b) is a low-level, detailed schematic block flow diagram illustrating various mathematical calculations and manipulations performed by a method to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.
Figure 24C:
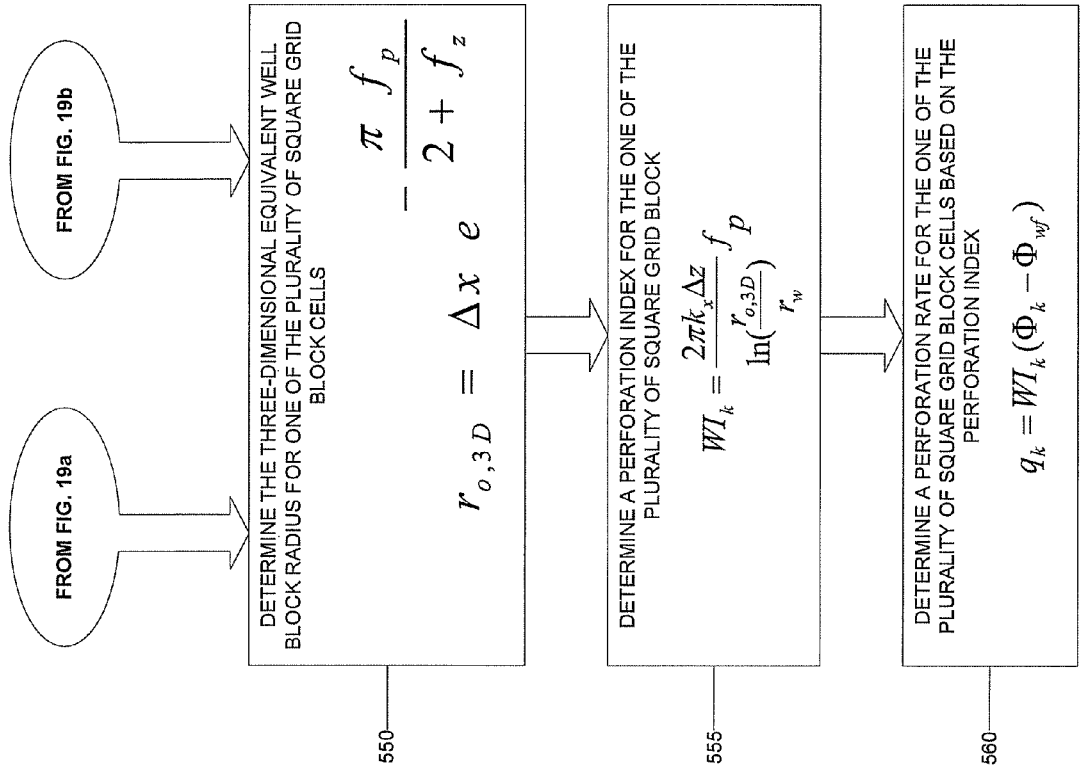
FIG. 24(c) is a low-level, detailed schematic block flow diagram illustrating various mathematical calculations and manipulations performed by a method to determine a three dimensional equivalent well block radius of a perforated grid block cell, with three dimensional flow, of a three dimensional coordinate grid block constructed over a three dimensional simulated well formation in a finite difference petroleum reservoir simulator according to an exemplary embodiment of the present invention.

As is perhaps best illustrated in FIG. 24, various embodiments of the present invention, including various exemplary machines, systems, computer implemented methods, and computer readable program products, can make beneficial use of one or more of the numbered equations, described in greater detail above, to determine a three dimensional equivalent well block radius of a perforated grid block cell, with three dimensional flow, of a three dimensional coordinate grid block constructed over a three dimensional simulated well formation in a finite difference petroleum reservoir simulator. For example, a computer readable program product, according to various exemplary embodiments of the present invention can beneficially include, for example, instructions that when executed by a computer cause the computer to perform the operation of receiving petroleum reservoir simulation data representing (or defining) an anisotropic porous media petroleum reservoir (block 500), as is known and understood by those skilled in the art. Such a computer readable program product can also include, by way of example, instructions that when executed by the computer, cause the computer to perform the operation of constructing a three dimensional uniform square coordinate grid block, having a plurality of square grid block cells, over a three dimensional simulated well formation generated responsive to petroleum reservoir simulation data received from a plurality of petroleum reservoir sensors (block 505). Beneficially, the three dimensional simulated well formation including one or more well perforations, each of the one or more well perforations being located in one or more perforated square grid block cells.

Furthermore, a computer readable program product according to an exemplary embodiment of the present invention can further include additional instructions that, when executed by the computer, cause the computer to perform the operations of counting the one or more well perforations positioned within the three dimensional uniform square coordinate grid block to thereby determine the total quantity count of the one or more perforated square grid block cells (block 510), and determining a partial penetration factor for one of the perforated square grid block cells based on a total quantity count of the one or more perforated square grid block cells and a ratio of a collective vertical height of the one or more well perforations and a total thickness of the three dimensional uniform square coordinate grid block. As is perhaps best illustrated by FIG. 24(a), in instances when only a single perforated square grid block cell is positioned within the three dimensional uniform square coordinate grid block, Equation (16) can be used to determine a partial penetration factor according to an exemplary embodiment of the present invention (block 515). Alternatively, as is perhaps best illustrated in FIG. 24(b), instances where a plurality of perforated square grid block cells are positioned within the three dimensional uniform square coordinate grid block, Equation (20) can be beneficially used to determine a partial penetration factor according to an exemplary embodiment of the present invention (block 540).

A computer readable program product according to an exemplary embodiment of the present invention can also include instructions that, when executed by the computer, cause the computer to perform the operations of determining a three dimensional coordinate location of the one of the one or more perforated square grid block cells positioned within the three dimensional uniform square coordinate grid block (block 520), and determining a vertical flow correction factor for the one of the one or more perforated square grid block cells based on the total quantity count of the one or more well perforations and a three dimensional coordinate location of the one of the one or more perforated square grid block cells positioned within the three dimensional uniform square coordinate grid block. As is perhaps best illustrated by FIG. 24(*a*), in instances when a single well perforation within a perforated square grid block cell is positioned in the top layers of the uniform square coordinate grid block, Equation (17) can beneficially be used to determine a vertical flow correction factor according to an exemplary embodiment of the present invention (block 525). In other instances when a single well perforation within a perforated square grid block cell is positioned in the bottom layers of the uniform square coordinate grid block, Equation (18) can beneficially be used to determine a vertical flow correction factor according to another exemplary embodiment of the present invention 530. In still other instances when a single well perforation within a perforated square grid block cell is positioned in the layers between the top and bottom layers of the uniform square coordinate grid block, Equation (19) can be beneficially used to determine a vertical flow correction factor according to an exemplary embodiment of the present invention (block 535).

As is perhaps best illustrated by FIG. 24(*b*), in cases when a plurality of well perforations are positioned in perforated square grid block cells throughout the uniform square coordinate grid block, Equation (21) can beneficially be used to determine a vertical flow correction factor in accordance with an exemplary embodiment of the present invention (block 545). Unlike the equations used to determine a vertical flow correction factor in cases when there is a single well perforation, in cases of multiple well perforations, the selection of an appropriate equation to determine a vertical flow correction factor does not, according to various embodiments of the present invention, depend on the location of each of the multiple well perforations within the three dimensional uniform coordinate grid block.

Moreover, as is perhaps best illustrated in FIG. 24(*c*), a computer implemented method according to various exemplary embodiments of the present invention can further include instructions that, when executed by the computer, cause the computer to perform the operations of determining, for the one of the one or more perforated square grid block cells, a three dimensional equivalent well block radius of the one of the one or more perforated square grid block cells using Equation (14) (block 550), determining a perforation index, using Equation (8), for the one of the one or more perforated square grid block cells responsive to determining the three dimensional equivalent well block radius for the one of the one or more perforated square grid block cells (block 555), and determining a perforation rate, using Equation (10) for the one of the one or more perforated square grid block cells responsive to determining the perforation index for the one of the one or more perforated square grid block cells (block 560). Furthermore, the operation of determining the equivalent well block radius for the one of the one or more perforated square grid block cells according to an exemplary embodiments of the present invention, for example, can further include instructions that, when executed by the computer, cause the computer to perform the operations of determining if vertical flow is present for the one of the one or more perforated square grid block cells, and if vertical flow is non-existent or negligible, reducing the three dimensional equivalent well block radius equation to a two dimensional equivalent well block radius equation indicated or represented by Equation (3).

Beneficially, the present invention includes systems, machines, computer readable program products, and computer implemented methods to determine the equivalent well block radius of a perforated grid block cell for three dimensional flow of a perforated well in a numerical petroleum reservoir simulator. For example, embodiments of the present invention can accurately solve the well index problem in a reservoir simulation for vertical wells where the perforation receives flow from all three dimensions. For vertical wells, embodiments of the present invention can provide new systems, machines, computer readable program products, and computer implemented methods that account for vertical flow in addition to horizontal flow into the perforation of a well grid block cell. The perforation rates for each well grid block cell can then be summed up to calculate the total well production or injection rate for a well formation. Current systems, machines, computer program products, and methods as known and understood by those skilled in the art, conversely, face difficulties because of the unavailability of a three dimensional perforation, or well index, formula. Accordingly, many current methods employ two dimensional formulas for situations involving three dimensional flow thereby resulting in errors in well rate calculations.

Various exemplary embodiments of the present invention, such as, for example, those using the above described mathematical equations to calculate a partial penetration factor and a vertical flow correction factor (i.e., Equation (16), Equation (17), Equation (18), Equation (19), Equation (20), and Equation (21)), require that the potential around the perforation blocks be considered constant and that pseudo steady-state flow conditions prevail (as is known and understood by those skilled in the art). For petroleum reservoir field simulations such assumptions can be easily realized. Three dimensional equivalent well block radiuses and well indices determined according to various embodiments of the present invention can be, for example, beneficially repeated at every time step during a petroleum reservoir simulation for changing rates, or such determinations can beneficially be made once at the beginning of the simulation run if the rates do not change significantly. Such assumptions are also easily justifiable for thick, high permeability, and large oil reservoirs.

Beneficially, various exemplary embodiments of the present invention involve the use of simple trigonometric functions that are computationally inexpensive to compute and can be easily incorporated into legacy reservoir simulators. Additionally, various embodiments of the present invention can be applied to complex cases with, multiple perforations in multiple locations across the well grid block. Beneficially, such various embodiments of the present invention for such complex cases are computationally inexpensive. According to various exemplary embodiments of the present invention, such complex cases can be described using ordinary differential equations to represent or indicate the well potential that can beneficially be solved numerically using a tridiagonal system of linear equations.

Advantageously, tested simulations employing various embodiments of the present invention have generated more accurate results for the equivalent well grid block radius and consequently the well perforation index than other current systems, methods, machines, and computer readable program products. The results of these tests, which are more fully described below, show the effectiveness and the benefits of various embodiments of the present invention.

Figure 26:
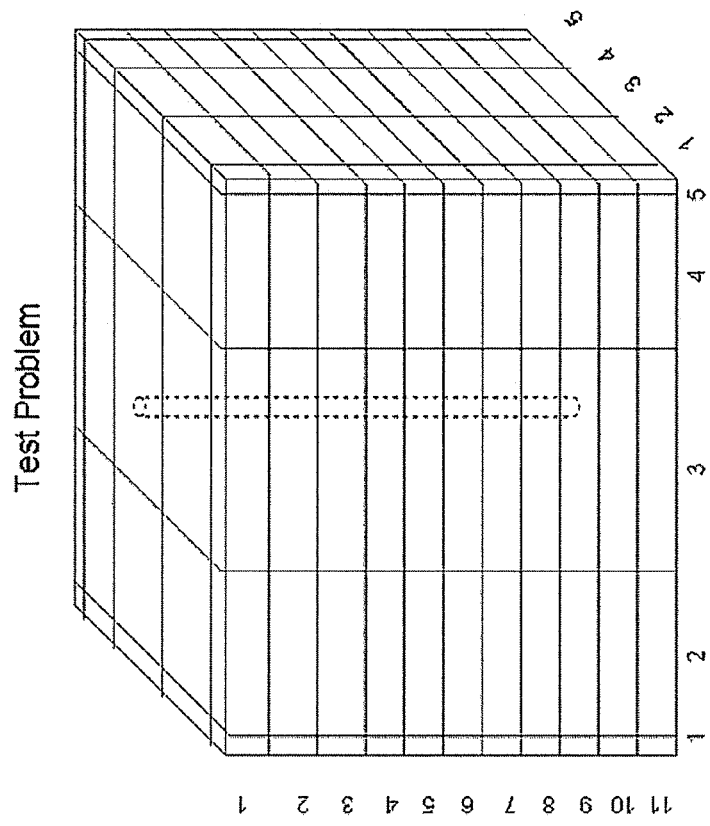
FIG. 26 is a schematic block diagram graphically illustrating a vertical, three dimensional view of a 5×5×11 three dimensional coordinate grid block constructed according to an exemplary embodiment of the present invention.
Figure 25:
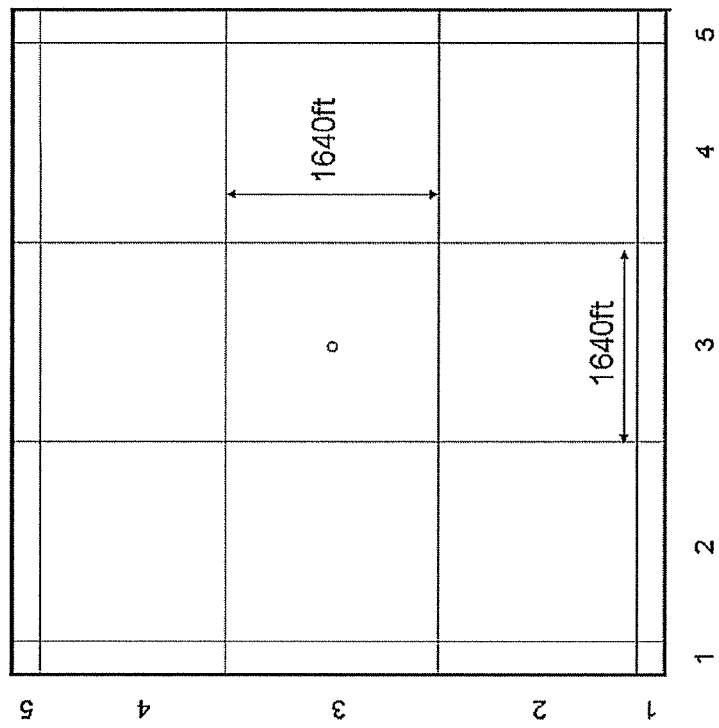
FIG. 25 is a schematic block diagram graphically illustrating an areal view of a 5×5×11 three dimensional coordinate grid block constructed according to an exemplary embodiment of the present invention.

FIGS. 25 and 26, for instance, illustrate graphically a 5×5×11 coordinate grid block according to an exemplary application of an embodiment of the present invention. More specifically, FIG. 25 shows an areal view of the coordinate grid block, and FIG. 26 shows a vertical or three dimensional view of the coordinate grid block. The outer two grid block cells, positioned at coordinates, i=1, 2 and; j=1, 2, which are chosen to be small, are used to simulate the constant potential boundary, as is understood by those skilled in the art. In this exemplary simulation, the well is positioned in the middle of the reservoir at coordinate location i=3, j=3. The areal grid size is the same for the x and y coordinate planes such that $\Delta x = \Delta y = 1640$ ft. The reservoir thickness is 100 ft and is divided into 11 layers with equal thickness such that $N_z = 11$ (i.e., representing or indicating 11 vertical layers) and $\Delta z = 9.09$ ft (i.e., indicating or representing the depth or thickness of each of the 11 vertical layers). Additionally, the reservoir is homogenous and anisotropic such that $k_x = k_y = 500$ md, $k_z = 100$ md, and $\phi = 0.25$ (as is understood by those skilled in the art). Additionally, the oil properties, as are known and understood by those skilled in the art, are set, in this particular simulation, to $\mu = 0.51$ cp, $\beta = 1.695$, $\Phi_B = 4800$ psi, $\Phi_{wf} = 4424$ psi, $r_w = 0.25$ ft.

For this exemplary simulation according to an embodiment of the present invention, an analytical solution, as outlined above, was compared against a numerical solution for the exemplary data and coordinate grid block as illustrated in FIGS. 25 and 26. Detailed mathematical derivations for equations used as a part of the analytical solution to this exemplary simulation are listed in Appendix A, below. Several well perforation completions, as are known and understood by those skilled in the art, are considered both analytically and numerically for this current simulation. For example, solutions are provided, both analytically and numerically for cases where there is a single well perforation located at either the top, middle, or bottom layers of the well formation and for cases where there are multiple well perforations located at the top, middle, or bottom of the well formation. The various solutions for each schema are listed in FIGS. 27 and 28.

For each well perforation completion, the three dimensional equivalent well perforation index was computed by both an analytical method, according to an exemplary embodiment of the present invention, and a numerical method. Additionally, the analytical results for the well perforation index was determined using the traditional two dimensional equivalent well block radius approach, as known and understood by those skilled in the art. An industrial simulator was used to demonstrate the benefits of the new three dimensional well block radius, according to an exemplary embodiment of the present invention, against the two dimensional well block radius. The results derived from the three methods were compared closely. The results, detailed below, highlight the accuracy of embodiments of the present invention which employ a three dimensional equivalent well block radius determination as compared to the two dimensional equivalent well block radius approach which does not take into consideration the effects of vertical flow.

More particularly, the simulation using a grid 5×5×11 system as shown in FIGS. 25 and 26 was compared against a 85×85×11 fine grid solution such that $\Delta x = 40$ ft, $\Delta z = 9.09$ ft (as is understood by those skilled in the art). The fine grid solution is assumed to represent the true solution, and error rates based on the true solution were calculated for the results of both the two dimensional solution and the three dimensional solution according to an embodiment according to the present invention. Well rates were computed by fixing the flowing well potential constant for various well perforation schemes as shown in FIGS. 27 and 28.

It is important to note that while the fine grid simulation results in a theoretically true solution, the fine grid simulation is computationally expensive and as a result, is not a viable solution to the well perforation index simulation. The coarse grid solution, according to an embodiment of the present invention, on the other hand, is computationally expensive and may be easily incorporated into legacy simulators.

FIG. 27, for example, presents the results for single well perforations located at the top, middle, and bottom of the well formation. FIG. 27 illustrates that while the conventional, two dimensional approach to calculating the equivalent well block radius results in approximately a 37 percent rate error in comparison to the fine grid solution, the three dimensional approach according to an embodiment of the present invention reduced this error rate to 4 percent. Specifically, the error rate was reduced from 800 B/d to 75 B/d. The equivalent well block radiuses and well perforation indexes were determined by an embodiment of the present invention to be 328 ft and 4.5 B/d/psi. As seen from FIG. 27, for the case of a single well perforation, the error level for the well perforation index was reduced, according to an exemplary embodiment of the present invention, by approximately ten times with practically no additional computational cost.

The same comparisons were made for well formations with multiple perforations located, respectively, in the top, middle, or bottom layers of the well formation. The results of the simulations are presented in FIG. 28. As seen from FIG. 28, the three dimensional approach according to an embodiment of the present invention reduces the error rate as compared to a fine grain solution to approximately 1.5 to 2 percent from the 20 percent error rate resulting from applications of the conventional, two dimensional approach. The rate error was reduced from 1500 B/d to 100 B/d. As seen from FIG. 28, for the case of a multiple well perforations, the error level for the well perforation index was reduced by more than ten times with practically no additional computational cost.

As described in greater detail above, numerical experiments have shown that for multiple perforated wells, perforations located at the end and away from the boundaries of a well formation show more three dimensional effects. Accordingly, perforation indices for such perforations should be calculated with great care. Perforations which are not at the boundary of the perforated intervals are less effected by three dimensional flow, and therefore, radial flow based well indices introduce less error. Advantageously, however, various embodiments of the present invention for determining a three dimensional equivalent well block radius and three dimensional well indices depend only on the coordinate grid block properties and not on the well formation boundary conditions (i.e., specified flow rate or bottom-hole pressure).

Accordingly, various embodiments of the present invention provide a close approximation for a three dimensional equivalent well block radius and can be easily be implemented in a numerical reservoir simulator. For isolated perforations, analytical solutions according to various embodiments of the present invention can be advantageously used in petroleum reservoir simulators. Moreover, various embodiments of the present invention are not limited to vertical wells and can easily be used to determine a three dimensional equivalent well block radius for horizontal wells and in multilateral wells as well. For horizontal wells and multilateral wells, for example, various embodiments of the present invention can be used to solve a tridiagonal system for the potential distribution along the well trajectories, as is understood by those skilled in the art.

Certain mathematical nomenclature has been employed throughout in order to simplify the mathematical expressions, formulas, and equations used herein. For example, as used throughout: k indicates or represents a grid block index (i.e., an indicator of a particular grid block cell); H indicates or represents a total formation thickness; N indicates or represents a number (i.e., quantity) of grid block cells; f indicates or represents a fraction; $k_x$ indicates or represents permeability in the x direction in Darcy; ky indicates or represents well formation permeability in the y direction in Darcy; $k_z$ indicates or represents well formation permeability in the z direction in Darcy; $\phi$ indicates or represents porosity; $\mu$ indicates or represents fluid viscosity in centipoise; $\rho$ indicates or represents fluid density in gr/cc; $\alpha$ indicates or represents a mathematical parameter defined by Equation A-10, below; WI indicates or represents a well perforation index in cc/sec/atm or bbl/day/psi; $r_o$ indicates or represents an equivalent well block radius in centimeters, $r_w$ indicates or represents a well radius in centimeters; $r_e$ indicates or represents drainage radius in centimeters, P indicates or represents pressure in psi; q indicates or represents production rate in cc/sec; $\Phi$ indicates or represents Potential in atm; T indicates or represents transmissibility in cc/sec/atm or b/d/psi; $\Delta x$ indicates or represents a grid block cell size in the x-axis direction in centimeters; $\Delta y$ indicates or represents a grid block cell size in the y-axis direction in centimeters; and $\Delta z$ indicates or represents a grid block cell size in the z-axis direction in centimeters.

Moreover, several subscript notations are used throughout. For example, as used throughout, the following subscripts have the following meanings: B indicates or represents a boundary; o indicates or represents a central cell; f indicates or represents flowing or fraction; j indicates or represents a completion number; k indicates or represents a grid block cell number (i.e., a grid block cell index); L indicates or represents left; LS indicates or represents left solution; t indicates or represents total; p indicates or represents perforated; R indicates or represents right; RS indicates or represents right solution; T indicates or represents total; e indicates or represents external (e.g., external drainage); w indicates or represents a well; $w_f$ indicates or represents a flowing well; o,3d indicates or represents a center grid block cell in a three dimensional coordinate grid block; x indicates or represents an areal x-axis direction; y indicates or represents an areal y-axis direction; and z indicates or represents a vertical direction.

It is important to note that while embodiments of the present invention have been described in the context of a fully functional system, those skilled in the art will appreciate that the mechanism of at least portions of the present invention or aspects thereof are capable of being distributed in the form of a computer readable program product stored in a tangible computer medium and a computer readable medium of instructions in a variety of forms for execution on a processor, processors, or the like, and that the present invention applies equally regardless of the particular type of signal bearing media used to actually carry out the distribution. Note, the computer readable program product can be in the form of microcode, programs, routines, and symbolic languages that provide a specific set or sets of ordered operations that control the functioning of the hardware and direct its operation, as known and understood by those skilled in the art.

Note, the computer 310, 311, shown schematically in FIG. 5, FIG. 7, and FIG. 8, represents a computer or computer cluster or computer farm and are not limited to any individual physical computers. The number of computers along with associated storage capacity and their architecture and configuration can be increased based on usage, demand, and capacity requirements for the system. Also note, the memory 412 can include volatile and nonvolatile memory known to those skilled in the art including, for example, RAM, ROM, and magnetic or optical disks, just to name a few. Additionally, examples of tangible computer medium include but are not limited to: nonvolatile hard-coded type media such as read only memories (ROMs), CD-ROMs, and DVD-ROMs, or erasable, electrically programmable read only memories (EEPROMs), recordable type media such as floppy disks, hard disk drives, solid state disk drives, hard disk RAIDs, direct attached storage devices, CD-R/RWs, DVD-RAMs, DVD-R/RWs, DVD+R/RWs, flash drives, memory sticks, HD-DVDs, mini disks, laser disks, Blu-ray disks, and other newer types of memories, and transmission type media such as digital and analog communication links as are known and understood by those skilled in the art. Note additionally, the processor 416 is not limited to any single processor or processor type and can include any number of central processing units, microprocessors, graphics processing units, digital signal processors, network processors, coprocessors, data processors, audio processors, and any other electronic circuits that can evaluate computer readable instructions as is known and understood to those skilled in the art.

In the drawings and specification, there have been disclosed a typical preferred embodiment of the invention, and although specific terms are employed, the terms are used in a descriptive sense only and not for purposes of limitation. Various embodiments of the invention have been described in considerable detail with specific reference to these various illustrated embodiments. It will be apparent, however, that various modifications and changes can be made within the spirit and scope of the invention as described in the foregoing specification and as defined in the appended claims.

APPENDIX A

Consider a portion of an infinite reservoir where a well is located in the center of the three dimensional coordinate grid block as is perhaps best illustrated by FIG. 26. Let this reservoir be divided into finite difference grid block cells such that $\Delta x = \Delta y$ in the areal directions (as is understood by those skilled in the art). Let the reservoir have a thickness of H and be divided into N equally thick vertical layers with thickness indicated or represented by $\Delta z$. Additionally, for the purposes of the derivations explained in this Appendix A, also assume a constant $k_x$ and a constant $k_y$, such that $k_x = k_y$, and a constant $k_z$ not equal to $k_x$. For simplicity, the following assumptions have also been made: (1) all the neighboring cells to the well cells have constant potential; (2) in the x, y direction, flow from the neighboring cells into the central cell is radial; and only vertical flow take place along the vertical well axis, z.

Derivation of a Three Dimensional Well Block Radius Equation

Because we are dealing with three dimensional flow, gravitational forces should be taken into account. This can be accomplished by defining a fluid potential, $\Phi$, and manipulating that value as opposed to a pressure value, P. In this derivation, we can set $$\Phi = P - \rho g z \quad \text{(Equation A-1)}.$$

In equation (A-1), P indicates or represents the fluid potential, $\rho$ indicates or represents the constant fluid density, g indicates or represents the universal gravitational constant, and z indicates or represents the depth defined from a reference point, usually the top depth of the well formation. We can also assume that the total thickness of the formation has been divided into N layers of equal thickness, as is perhaps best illustrated in FIG. 17. As shown in FIG. 17, it is assumed that the Potential $\Phi_B$ is constant for any neighboring grid block cell to grid block cell k.

The well production rate located in the central grid block can be calculated using Equation (6), as described above, for a partially penetrating well:

$$q_k = \frac{2\pi \bar{k}}{\mu} \bar{h} \frac{\Delta z}{H} \left[1 + 7\sqrt{\frac{r_w}{2\Delta z} \cos\left(\frac{\pi}{2}\frac{\Delta z}{H}\right)}\right] \frac{(\Phi_k - \Phi_{wf})}{\ln\left(\frac{r_{o,3D}}{r_w}\right)} \quad \text{(Equation A-2)}$$

where $\bar{k} = \sqrt{k_x k_z}$, $\bar{h} = h_1 \sqrt{\frac{k_x}{k_z}}$.

Accordingly, the new well index, for this scenario, becomes $$WI = \frac{\pi k_x h_P}{\ln\frac{r_{o,3d}}{r_w}} \left[1 + 7\sqrt{\frac{r_w}{2h_P} \cos\left(\frac{\pi}{2}\frac{h_P}{H}\right)}\right] = \frac{2\pi k_x h_P}{\ln\frac{r_{o,3D}}{r_w}} f_p \quad \text{(Equation A-3)}$$

where $f_p$ is the partial penetration factor which is equal to the partial penetration factor for a fully penetrating well of two dimensional horizontal flow. The perforation flow rate is given by $$q_k = WI(\Phi_k - \Phi_{wf}) \quad \text{(Equation A-4)}$$

where $\Phi_k$ is the grid block pressure of the perforated cell located at $r_{o,3D}$.

Considering grid block k, as illustrated in FIG. 17, and writing the steady state volume balance for constant viscosity μ, as is known and understood by those skilled in the art, we get:

$$4T_x(\Phi_B - \Phi_k) + T_z(\Phi_{k-1} - \Phi_k) + T_z(\Phi_{k+1} - \Phi_k) = \quad \text{(Equation A-5)}$$
$$2\pi k_x \Delta z f_p \frac{(\Phi_B - \Phi_k)}{\ln \Delta x / r_{o,3D}}$$

where $$T_x = k_x \Delta z \Delta x / \Delta x \quad \text{(Equation A-5a)}$$

$$T_z = k_z \Delta x \Delta y / \Delta z \quad \text{(Equation A-5b)}$$

Rearranging (A-5) and solving for $r_{o,3D}$, we get:

$$r_{o,3D} = \Delta x e^{-\frac{\pi f_p}{2 + \frac{1}{2}\frac{k_z}{k_x}\left(\frac{\Delta x}{\Delta z}\right)^2\left[\left(\frac{\Phi_{k-1} - \Phi_k}{\Phi_B - \Phi_k}\right) + \left(\frac{\Phi_{k+1} - \Phi_k}{\Phi_B - \Phi_k}\right)\right]}} \quad \text{(Equation A-6)}$$

Notice that for two dimensional, areal (x-y) flow, $k_z=0$, and $f_p=1$. In such a particular completion scenario where three dimensional or vertical flow is non-existent or negligible, the equivalent well block radius, $r_{o,3D}$ indicated or represented mathematically by Equation (A-6), beneficially reduces to $$r_{o,2D} = \Delta x e^{-\frac{\pi}{2}} \cong 0.2 \Delta x$$

which is the same which is the same formula that is commonly used as a part of legacy parallel petroleum reservoir simulators for two dimensional, horizontal flow.

Analytical Solution for the Potential Equation a. Differential Equation for Potential Advantageously, it is possible to write the single phase material balance equation for grid block cell k with no source term as:

$$4T_x(\Phi_B - \Phi_k) + T_z(\Phi_{k-1} - \Phi_k) + T_z(\Phi_{k+1} - \Phi_k) = 0$$

$$k = 1, N-1 \quad \text{(Equation A-7)}$$

Rearranging equation (A-7) we obtain $$(\Phi_B - \Phi_k) + \frac{k_z \Delta x^2}{4 k_x} \frac{(\Phi_{k-1} - 2\Phi_k + \Phi_{k+1})}{\Delta z^2} = 0 \quad \text{(Equation A-8)}$$

$$k = 1, N-1$$

For finite values $\Delta x$ and $\Delta z$ in equation (A-8), it is possible to recognize that:

$$\lim_{\Delta z \to 0} \frac{(\Phi_{k-1} - 2\Phi_k + \Phi_{k+1})}{\Delta z^2} = \frac{d^2\Phi}{dz^2} \quad \text{(Equation A-9)}$$

Furthermore, by defining $\overline{\Phi} = \Phi_B - \Phi$ and rearranging equation (A-9), we obtain:

$$\frac{d^2 \overline{\Phi}}{d^2 z} - \alpha \overline{\Phi} = 0 \quad \text{(Equation A-10)}$$

$$\alpha = \frac{4 k_x}{k_z \Delta x^2}$$

b. Solutions for the Differential Equation and Derivation of a Three Dimensional Well Block Radius Equation (A-10) is known and understood by those skilled in the art as a second order ordinary differential equation in variable z. Accordingly, as is also known and understood by those skilled in the art, two boundary conditions are needed for a unique solution for equation (A-10). It is possible to define three different conditions for a single perforation located at $z_s$: (1) a single perforation located at the bottom of the formation where $z_s$=H, (2) a single perforation located at the top of the formation where $z_s$=0, and (3) a single perforation $z_s$ located away from the upper and lower boundaries (that is, in the middle layers of the well formation between the top and bottom layers of the formation). We will refer solution for case (1) as left solution, for case (2) as right solution, as is known and understood by those skilled in the art.

Case 1: Perforation Located at the Bottom of a Well:

a. Analytical Solution for the Differential Equation

The solution to the perforation index problem for a single perforation located at the bottom of a well can be represented by second order ordinary differential equations:

$$\frac{\partial \Phi}{\partial Z} = 0, z = 0.0 \quad \text{(Equation A-11)}$$

$$\lim_{z_s \to H} \frac{\partial \Phi}{\partial z} = \frac{q\mu}{k_z \Delta x^2}, z_s = H \quad \text{(Equation A-12)}$$

Equation (A-10) is a second order ordinary differential equation, as is known and understood by those skilled in the art. Accordingly, Equation (A-10), together with the boundary conditions (A-11) and (A-12) has a solution presented below:

$$\Phi(z) = \Phi_B - \frac{q\mu}{B_L}\left[e^{\sqrt{\alpha}\,z} + e^{-\sqrt{\alpha}\,z}\right], 0 \le z \le H \quad \text{(Equation A-13A)}$$

Using the definition of $$\text{Cosh}(x) = \frac{e^{\sqrt{\alpha}\,x} + e^{-\sqrt{\alpha}\,x}}{2}$$

in Equation (A-13A), Equation (A-13A) beneficially reduces to a mathematical equation of multiple variables indicated or represented by:

$$\Phi(z) = \Phi_B - \frac{2q\mu}{\beta_L}\text{Cosh}(\sqrt{\alpha}\,z) \quad \text{(Equation A-13B)}$$

where, using oil field practical units, such as ft and md, $$\beta_L = 1.12710^{-3} k_z \Delta x^2 \sqrt{\alpha} \cdot \left[e^{\sqrt{\alpha}\,H} - e^{-\sqrt{\alpha}\,H}\right] \quad \text{(Equation A-14)}$$
$$= 2 \times 1.12710^{-3} k_z \Delta x^2 \sqrt{\alpha}\,\text{Sinh}(\sqrt{\alpha}\,H)$$

$$k_z \ge 0.$$

b. Well Block Radius

Now consider a single well perforation located at the bottom layer of the well as indicated or represented by the mathematical expression k=N. Since there is only one-dimensional flow in the z direction, Equation (A-6) beneficially reduces to a mathematical equation of multiple variable indicated or represented by:

$$r_{o,3D} = \Delta x e^{-\frac{\pi f_p}{2 + \frac{1}{2}\frac{k_z}{k_x}\left(\frac{\Delta x}{\Delta z}\right)^2 \left(\frac{\Phi_{N-1} - \Phi_N}{\Phi_B - \Phi_N}\right)}} \quad \text{(Equation A-15)}$$

Now substituting a potential solution defined by equation (A-13B) into equation (A-15) a resulting mathematical equation of multiple variables is produced, indicated or represented by:

$$\frac{\Phi_{N-1} - \Phi_N}{\Phi_B - \Phi_N} = \quad \text{(Equation A-16)}$$

$$\frac{\left[\Phi_B - \frac{2q}{\beta_L}\text{Cosh}(\sqrt{\alpha}\,z_{N-1})\right] - \left[\Phi_B - \frac{2q}{\beta_L}\text{Cosh}(\sqrt{\alpha}\,z_N)\right]}{\frac{2q}{\beta_L}\text{Cosh}(\sqrt{\alpha}\,z_N)} = 1 - \frac{\text{Cosh}(\sqrt{\alpha}\,z_{N-1})}{\text{Cosh}(\sqrt{\alpha}\,z_N)}$$

Further substituting equation (A-16) into equation (A-15), a multi-variable mathematical function for an equivalent well block radius for three dimensional flow for a well perforation positioned at the bottom of a well formation can be generated, indicated or represented as:

$$r_{o,3D} = \Delta x e^{-\frac{\pi f_p}{2 + \frac{1}{2}\frac{k_z}{k_x}\left(\frac{\Delta x}{\Delta z}\right)^2 \left(1 - \frac{\text{Cosh}(\sqrt{\alpha}\,z_{N-1})}{\text{Cosh}(\sqrt{\alpha}\,z_N)}\right)}} \quad \text{(Equation A-17)}$$

The equivalent well block radius mathematical formula indicated or represented by Equation (A-17) is beneficially for a single perforation block located at the bottom of the well such that $z=z_N$ (as known and understood by those skilled in the art). To separate and further illustrate the effects of three dimensional vertical flow, a mathematical function for a three dimensional equivalent well block radius as indicated or represented by Equation (A-17) can be rewritten in the following form:

$$r_{o,3D} = \Delta X e^{-\frac{\pi f_p}{2 + f_z}} \quad \text{(Equation A-18)}$$

$$f_P = \left[1 + 7\sqrt{\frac{r_w}{2h_p}}\text{Cos}\left(\frac{\pi}{2}\frac{\Delta z}{H}\right)\right]$$

$$f_z = \frac{1}{2}\frac{K_z}{K_x}\left(\frac{\Delta X}{\Delta z}\right)^2 \left(1 - \frac{\text{Cosh}(\sqrt{\alpha}\,z_{N-1})}{\text{Cosh}(\sqrt{\alpha}\,z_N)}\right)$$

In Equation (A-18), $f_z$ indicates or represents the vertical flow correction factor, as understood by those skilled in the art, and $f_p$ indicates or represents the partial penetration factor, as is understood by those skilled in the art. For horizontal flow, $k_z=0$, $f_z=0$, and $f_p=1$ (as is understood by those skilled in the art). Therefore, $r_{o,3D}$ can be beneficially simplified or reduced in such instances where vertical flow is non-existent or negligible, to a mathematical expression indicated or represented by $$r_{o,2D} = \Delta x e^{-\frac{\pi}{2}} \cong 0.2\Delta x.$$

Notably, this simplified expression is the same equation as Peaceman's equation which is commonly used as a part of legacy parallel reservoir simulators to determine a two dimensional equivalent well block radius.

Case 2: Perforation Located at the Top of the Well:

a. Analytical Solution for the Differential Equation

The solution to the perforation index problem for a single perforation located at the top layer of a well can be represented by second order ordinary differential equations as understood by those skilled in the art.

Let $\bar{z} = H - z$ (Equation A-19)

$$\lim \frac{\partial \bar{\Phi}}{\partial \bar{z}} = \frac{q\mu}{K_z \Delta X^2} \quad \bar{z}_S = H \; z = 0$$

$z \to 0$ (Equation A-20)

$$\frac{\partial \bar{\Phi}}{\partial \bar{Z}} = 0, \bar{z} = 0 \; z = H$$

$$\Phi(\bar{z}) = \Phi_B - \frac{q\mu}{\beta_R}\left[e^{\sqrt{\alpha}\,\bar{z}} + e^{-\sqrt{\alpha}\,\bar{z}}\right],$$ (Equation A-21)

$0 \le \bar{z} \le H, z > z_S$

Using the definition of $$\cosh(x) = \frac{e^{\sqrt{\alpha}\,x} + e^{-\sqrt{\alpha}\,x}}{2}$$

in Equation (A-21), Equation (A-21) reduces to the following form:

$$\Phi(\bar{z}) = \Phi_B - \frac{2q}{\beta_R}\cosh\!\left(\sqrt{\alpha}\,\bar{z}\right)$$ (Equation A-22)

where (Equation A-22a)
$$\beta_R = 1.12710^{-3} K_z \Delta x^2 \sqrt{\alpha}\left[e^{\sqrt{\alpha}(H-z_s)} - e^{-\sqrt{\alpha}(H-z_s)}\right] =$$
$$2 \times 1.12710^{-3} K_z \Delta x^2 \sqrt{\alpha}\,\sinh\!\left(\sqrt{\alpha}\,(H-z_s)\right)$$

b. Well Block Radius

It is possible to rewrite Equation (A-22) for the top perforation k and k+1 using a mathematical function of multiple variables indicated or represented by:

$$r_{o,3D} = \Delta x e^{-\frac{\pi f_p}{2 + \frac{1}{2}\frac{k_z}{k_x}\left(\frac{\Delta x}{\Delta z}\right)^2 \left[\frac{\Phi(z_{k+1}) - \Phi(z_k)}{\Phi_B - \Phi(z_k)}\right]}}$$ (Equation A-23)

Beneficially, Equation (A-22) can be substituted mathematically into Equation (A-23) to thereby generate a mathematical equation of multiple variables indicating or representing the equivalent well block radius for three dimensional flow for a well perforated at the top of the well formation results:

$$\boxed{r_{o,3D} = \Delta x e^{-\frac{\pi f_p}{2 + \frac{1}{2}\frac{k_z}{k_x}\left(\frac{\Delta x}{\Delta z}\right)^2 \left[1 - \frac{\cosh(\sqrt{\alpha}(H - z_{k+1}))}{\cosh(\sqrt{\alpha}(H - z_k))}\right]}}}$$ (Equation A-24)

Equation (A-24) can be represented by the following series of equations:

$$r_{o,3D} = \Delta x e^{-\frac{\pi f_p}{2 + f_z}}$$ (Equation A-24a)

$$f_P = \left[1 + 7\sqrt{\frac{r_w}{2h_p}\cos\!\left(\frac{\pi}{2}\frac{\Delta z}{H}\right)}\right]$$ (Equation A-24b)

$$f_z = \frac{1}{2}\frac{k_z}{k_x}\left(\frac{\Delta x}{\Delta z}\right)^2 \left[1 - \frac{\cosh(\sqrt{\alpha}(H - z_{k+1}))}{\cosh(\sqrt{\alpha}(H - z_k))}\right]$$ (Equation A-24c)

Again it is evident that a three dimensional equivalent well block radius, according to various exemplary embodiments of the present invention and as defined in Equation (A-24), will collapse into a two dimensional equivalent well block radius equation for two dimensional horizontal well flow where $k_z=0$ (as is known and understood by those skilled in the art).

Case 3: Perforation Located Away from the Bottom and the Top of the Well:

In some completion scenarios according to exemplary embodiments of the present invention, a well perforation can be located away from the bottom and top layers of a well formation. In such a particular completion scenario, it is possible to define two analytical solutions for a potential equation (as is known and understood by those skilled in the art) with respect to the location of the perforation source. As used in this section herein, the term "left" solution means the "upper" solution for a vertical well (as is understood by those skilled in the art), and the term "right" solution means the "lower" solution for a vertical well (as is understood by those skilled in the art).

a. Analytical Solution for the Differential Equation

Let $\Phi_L(z)$ be the solution to the left (upper for a vertical well) of the perforation source, q, and $\Phi_R(z)$ be the solution to the right of the perforation source, q (lower portion for the vertical well), as is understood by those skilled in the art. The solution to the perforation index problem for a single perforation located in between the top and bottom of the well formation can be therefore indicated or represented by the following mathematical functions of multiple variables:

$$\Phi_L(z) = \Phi_B - \frac{2q_L}{\beta_L}\cosh\!\left(\sqrt{\alpha z}\right) \; z \le z_S$$ (Equation A-25)

$$\Phi_R(z) = \Phi_B - \frac{2q_R}{\beta_R}\cosh\!\left(\sqrt{\alpha}\,(H-z)\right) \; z > z_S$$ (Equation A-26)

$$\beta_L = 2 \times 1.12710^{-3} k_z \Delta x^2 \sqrt{\alpha}\,\sinh\!\left(\sqrt{\alpha}\left(z_S + \frac{\Delta z}{2}\right)\right)$$ (Equation A-26a)

$$\beta_R = 2 \times 1.12710^{-3} k_z \Delta x^2 \sqrt{\alpha}\,\sinh\!\left(\sqrt{\alpha}\left(H - \left(z_S + \frac{\Delta z}{2}\right)\right)\right)$$ (Equation A-26b)

At the perforation source location, $z=z_s$ such that, as is understood by those skilled in the art:

$$\Phi_L(z_S) = \Phi_L(z_S)$$ (Equation A-27)

$$q = q_L + q_R$$ (Equation A-28)

where subscript L stands for left and R stands for right. Substituting Equation (A-25) and Equation (A-26) into Equation (A-27) and simplifying, it is possible to obtain a mathematical function of multiple variables indicated or represented by:

$$q_L \frac{\cosh(\sqrt{\alpha}\,z)}{\beta_L} = q_R \frac{\cosh(\sqrt{\alpha}\,(H-z))}{\beta_R}$$ (Equation A-29)

According to an exemplary embodiment of the present invention, it is also possible to solve Equation (A-28) and Equation (A-29) simultaneously for $q_L$ and $q_R$ to obtain a series of mathematical expressions of multiple variables indicated or represented by:

$$q_L = \frac{\frac{2\cosh(\sqrt{\alpha}\,(H-z_S))}{\beta_R}}{\frac{2\cosh(\sqrt{\alpha}\,(H-z_S))}{\beta_R} + \frac{2\cosh(\sqrt{\alpha}\,z_S)}{\beta_L}} q \quad \text{(Equation A-30a)}$$

$$q_R = \frac{\frac{2\cosh(\sqrt{\alpha}\,z_S)}{\beta_R}}{\frac{2\cosh(\sqrt{\alpha}\,(H-z_S))}{\beta_R} + \frac{2\cosh(\sqrt{\alpha}\,z_S)}{\beta_L}} q \quad \text{(Equation A-30b)}$$

By substituting the above two solutions (indicated or represented, respectively, by Equation (A-30a) and Equation (A-30b)) into Equation (A-25) and Equation (A-26), both a Left and a Right analytical solution to the well potential equation result:

$$\Phi_L(z) = \Phi_B - \frac{2q}{\beta_L} \frac{\frac{2\cosh(\sqrt{\alpha}\,(H-z_S))}{\beta_R}}{\frac{2\cosh(\sqrt{\alpha}\,(H-z_S))}{\beta_R} + \frac{2\cosh(\sqrt{\alpha}\,z_S)}{\beta_L}} \cosh(\sqrt{\alpha}\,z) \quad \text{(Equation A-31a)}$$

where $z \leq z_S$ $$\Phi_R(z) = \Phi_B - \frac{2q}{\beta_L} \frac{\frac{2\cosh(\sqrt{\alpha}\,z_S)}{\beta_R}}{\frac{2\cosh(\sqrt{\alpha}\,(H-z_S))}{\beta_R} + \frac{2\cosh(\sqrt{\alpha}\,z_S)}{\beta_L}} \cosh(\sqrt{\alpha}\,(H-z)) \quad \text{(Equation A-31b)}$$

where $z > z_S$ b. Well Block Radius

By substituting Equation (A-30a) and Equation (A-30b) into Equation (A-6) and rearranging the terms of the resulting equation, it is possible to formulate a mathematical function of multiple variables that represents the equivalent well block radius for three dimensional flow of a well with a single perforation located at some location between the top and the bottom of the well formation. Such a mathematical expression can be indicated or represented by:

$$r_{o,3D} = \Delta x e^{-\frac{\pi f_p}{2 + \frac{1}{2}\frac{k_z}{k_x}\left(\frac{\Delta x}{\Delta z}\right)^2 \left[2 - \frac{\cosh(\sqrt{\alpha}\,z_{K-1})}{\cosh(\sqrt{\alpha}\,z_K)} - \frac{\cosh(\sqrt{\alpha}\,(H-z_{K+1}))}{\cosh(\sqrt{\alpha}\,(H-z_K))}\right]}} \quad \text{(Equation A-32)}$$

Beneficially, to separate and further illustrate the effects of three dimensional vertical flow, a mathematical function for a three dimensional equivalent well block radius as indicated or represented by Equation (A-32) can be rewritten in the following form:

$$r_{o,3D} = \Delta x e^{-\frac{\pi f_p}{2 + f_z}} \quad \text{(Equation A-32a)}$$

$$f_P = \left[1 + 7\sqrt{\frac{r_w}{2h_p}\cos\left(\frac{\pi}{2}\frac{\Delta z}{H}\right)}\right] \quad \text{(Equation A-32b)}$$

$$f_z = \frac{1}{2}\frac{k_z}{k_x} \left(\frac{\Delta x}{\Delta z}\right)^2 \left[2 - \frac{\cosh(\sqrt{\alpha}\,z_{k-1})}{\cosh(\sqrt{\alpha}\,z_k)} - \frac{\cosh(\sqrt{\alpha}\,(H-z_{k+1}))}{\cosh(\sqrt{\alpha}\,(H-z_k))}\right] \quad \text{(Equation A-32c)}$$

Well Block Radius for Multiple Well Perforations:

According to an exemplary embodiment of the present invention, let the well have $N_c$ number of completions for well perforations j=1, $N_c$ (as is understood by those skilled in the art). For this particular completion scenario, it is not necessary that all of the well perforations be continuous. Particularly, it is possible to have a set of well perforations followed by a non-perforated interval and again followed by a new perforated interval. To simplify the derivations, however, for the purposes of the this discussion it is assumed that all the perforations are contiguous within the well formation.

Potential Solution

Before the three dimensional equivalent well block radius equation can be defined, it is necessary to use the superposition principle to find the solution that reflects the effect of each perforation. A potential solution for a single perforation was defined earlier by Equation (A-31a) or Equation (A-31b). Moreover, let the potential drop be indicated or represented mathematically by $$\Delta\Phi(z) = \Phi_B - \Phi(z) \quad \text{(Equation A-33)}$$

The total potential drop at location $z_i$, due the effect of all the perforations with rates can further be indicated or represented as:

$$q_j, j = 1, \ldots N_C \quad \text{(Equation A-34)}$$

$$\Delta_T \Phi(z_i) = \sum_{j=1}^{N_C} \left\{ \frac{2q_{jL}}{\beta_{jL}} \cosh(\sqrt{\alpha}\,z_i), z_i \leq z_j \right\}, or,$$

$$\left\{ \frac{2q_{jR}}{\beta_{jR}} \cosh(\sqrt{\alpha}\,(H-z_i)), z_i \rangle z_j \right\}$$

Well Block Radius for Grid Block k

Recalling the equivalent well block radius equation for block k, according to various exemplary embodiments of the present invention:

$$r_{o,3D,k} = \Delta x e^{-\frac{\pi f_P}{2+\frac{1}{2}\frac{k_z}{k_x}(\frac{\Delta x}{\Delta z})^2[(\frac{\Phi_{k-1}-\Phi_k}{\Phi_B-\Phi_k})+(\frac{\Phi_{k+1}-\Phi_k}{\Phi_B-\Phi_k})]}}$$

(Equation A-6)

terms in Equation (A-6) can beneficially be indicated or represented mathematically as:

$$\Delta\Phi_k = \Phi_B - \Phi_k = \qquad \text{(Equation A-35)}$$

$$\sum_{j=1}^{j=N_c} \delta(z_k \le z_j)\frac{2q_{jL}}{\beta_{jL}}\text{Cosh}(\sqrt{\alpha}\, z_k) + \delta(z_k)z_j)$$

$$\frac{2q_{jR}}{\beta_{jR}}\text{Cosh}(\sqrt{\alpha}\,(H-z_k))$$

and $\Phi_{k-1} - \Phi_k = \Delta\Phi_K - \Delta\Phi_{K-1}$.

Furthermore, where $\Delta\Phi_K$ is defined by Equation (A-33), $$\Phi_{k-1} - \Phi_k = \qquad \text{(Eq. A-36)}$$

$$\sum_{j=1}^{N_c} \delta(z_{k-1} \le z_j)\frac{2q_{jL}}{\beta_{jL}}\text{Cosh}(\sqrt{\alpha}\, z_{k-1}) + \delta(z_{k-1})z_j)$$

$$\frac{2q_{jR}}{\beta_{jR}}\text{Cosh}(\sqrt{\alpha}\,(H-z_{k-1})) -$$

$$\left\{\sum_{j=1}^{N_C} \delta(z_k \le z_j)\frac{2q_{jL}}{\beta_{jL}}\text{Cosh}(\sqrt{\alpha}\, z_k) + \delta(z_k)z_j)\right.$$

$$\left.\frac{2q_{jR}}{\beta_{jR}}\text{Cosh}(\sqrt{\alpha}\,(H-z_k))\right\}$$

$$\Phi_{k+1} - \Phi_k = \qquad \text{(Eq. A-37)}$$

$$\sum_{j=1}^{N_c} \delta(z_{k+1} \le z_j)\frac{2q_{jL}}{\beta_{jL}}\text{Cosh}(\sqrt{\alpha}\, z_{k+1}) + \delta(z_{k+1})z_j)$$

$$\frac{2q_{jR}}{\beta_{jR}}\text{Cosh}(\sqrt{\alpha}\,(H-z_{k+1})) -$$

$$\left\{\sum_{j=1}^{N_c} \delta(z_k \le z_j)\frac{2q_{jL}}{\beta_{jL}}\text{Cosh}(\sqrt{\alpha}\, z_k) + \delta(z_k)z_j)\right.$$

$$\left.\frac{2q_{jR}}{\beta_{jR}}\text{Cosh}(\sqrt{\alpha}\,(H-z_k))\right\}$$

where $$\delta(z_k \le z_j) = \{_0 1^{,z_k \le z_j}$$

$$\beta_{jL} = 2x1.12710^{-3}k_z\Delta x^2\sqrt{\alpha}\,\text{Sinh}\left(\sqrt{\alpha}\left(z_j + \frac{\Delta z}{2}\right)\right) \qquad \text{(Equation A-38a)}$$

$$\beta_{jR} = 2x1.12710^{-3}k_z\Delta x^2\sqrt{\alpha}\,\text{Sinh}\left(\sqrt{\alpha}\left(H - \left(z_j + \frac{\Delta z}{2}\right)\right)\right) \qquad \text{(Equation A-38b)}$$

Substitution of Equation (A-35) and Equation (A-36) into Equation (A-6) can beneficially yield an equivalent well block radius for a grid block cell block k due to perforation rates at j=1, Nc (as is understood by those skilled in the art), where j is also grid block cell number which has a perforation located in that particular grid block cell. By substitution of analytical expressions into Equation (A-6), it becomes clear that the equivalent well block radius is independent of inner boundary conditions such as a specified rate or specified pressure, as is known and understood by those skilled in the art. Advantageously, the equivalent well block radius, according to various exemplary embodiments of the present invention, is only a function of geometry. Specifically, the three dimensional equivalent well block radius equation is only a function of $\Delta x$, $\Delta y$, $\Delta z$, and $k_x$, $k_z$, such that:

$$r_{o,3D} = \Delta x e^{-\frac{\pi f_P}{2+f_z}} \qquad \text{(Equation A-39a)}$$

$$f_P = \left[1 + 7\sqrt{\frac{r_w}{2h_p}\text{Cos}\left(\frac{\pi}{2}\frac{N_C\Delta z}{H}\right)}\right] \qquad \text{(Equation A-39b)}$$

$$f_{z,k} = \frac{\frac{1}{2}\frac{k_z}{k_x}\left(\frac{\Delta x}{\Delta z}\right)^2\left\{\sum_{j=1}^{N_C}\delta(z_{k-1}\le z_j)\frac{2f_{jL}}{\beta_{jL}}\text{Cosh}(\sqrt{\alpha}\,z_{k-1}) + \delta(z_{k-1})z_j)\frac{2f_{jR}}{\beta_{jR}}\text{Cosh}(\sqrt{\alpha}\,(H-z_{k-1})) - \sum_{j=1}^{N_C}\delta(z_k\le z_j)\frac{2f_{jL}}{\beta_{jL}}\text{Cosh}(\sqrt{\alpha}\,z_k) + \delta(z_k)z_j)\frac{2f_{jR}}{\beta_{jR}}\text{Cosh}(\sqrt{\alpha}\,(H-z_k)) + \sum_{j=1}^{N_C}\delta(z_{k+1}\le z_j)\frac{2f_{jL}}{\beta_{jL}}\text{Cosh}(\sqrt{\alpha}\,z_{k+1}) + \delta(z_{k+1})z_j)\frac{2f_{jR}}{\beta_{jR}}\text{Cosh}(\sqrt{\alpha}\,(H-z_{k+1})) - \sum_{j=1}^{N_C}\delta(z_k\le z_j)\frac{2f_{jL}}{\beta_{jL}}\text{Cosh}(\sqrt{\alpha}\,z_k) + \delta(z_k)z_j)\frac{2f_{jR}}{\beta_{jR}}\text{Cosh}(\sqrt{\alpha}\,(H-z_k))\right\}}{\left\{\sum_{j=1}^{N_C}\delta(z_k\le z_j)\frac{2f_{jL}}{\beta_{jL}}\text{Cosh}(\sqrt{\alpha}\,z_k)^j + \delta(z_k)z_j)\frac{2f_{jR}}{\beta_{jR}}\text{Cosh}(\sqrt{\alpha}\,(H-z_k))\right\}} \qquad \text{(Equation A-39c)}$$

where $f_{jL}$, $f_{jR}$ are defined similarly to Equation (A-30a) and Equation (A-30b), respectively. More specifically, $f_{jL}$ and $f_{jR}$ can be expressed as mathematical equations of multiple variables indicated or represented as:

$$f_{jL} = \frac{\frac{2\mathrm{Cosh}(\sqrt{\alpha}\,H - z_j))}{\beta_R}}{\frac{2\mathrm{Cosh}(\sqrt{\alpha}\,H - z_j))}{\beta_R} + \frac{2\mathrm{Cosh}(\sqrt{\alpha}\,z_j)}{\beta_L}} q \quad \text{(Equation A-39d)}$$

$$f_{jR} = \frac{\frac{2\mathrm{Cosh}(\sqrt{\alpha}\,z_j))}{\beta_R}}{\frac{2\mathrm{Cosh}(\sqrt{\alpha}\,H - z_j))}{\beta_R} + \frac{2\mathrm{Cosh}(\sqrt{\alpha}\,z_j)}{\beta_L}} q \quad \text{(Equation A-39e)}$$

Because the well rate, q, as indicated or represented mathematically by Equation (A-39c) cancels out, the vertical flow correction factor $f_z$, according to various exemplary embodiments of the present invention, beneficially is only function of geometric properties and permeabilities. Furthermore, although Equation (A-39) appears difficult to compute, a simple numerical solution which involves the solution of a tridiagonal system (as is known and understood by those skilled in the art) for the potential equation can be performed to solve the equation in a computationally inexpensive fashion.

APPENDIX B

For the more general case of unequal grid sizes and heterogeneity (i.e., varying permeabilities and porosity for each grid block cell, as is known and understood by those skilled in the art) a numerical solution should be employed to determine a three dimensional equivalent well block radius. Advantageously, the numerical solution, according to various exemplary embodiments of the present invention, only requires a solution of a one dimensional set of linear equations. Beneficially, such a one dimensional system of linear equations can be solved in a computationally inexpensive fashion by the Thomas algorithm, as it is known and understood by those skilled in the art.

Consider, by way of example, a steady state potential equation for a completely heterogeneous porous media (a reservoir) with dimensions $L_x$, $L_y$, and H, in the x, y, and z directions, respectively, such that:

$$\frac{\partial}{\partial x} K_x(x,y,z)\frac{\partial \Phi}{\partial x} + \frac{\partial}{\partial y} K_y(x,y,z)\frac{\partial \Phi}{\partial y} + \frac{\partial}{\partial z} K_z(x,y,z)\frac{\partial \Phi}{\partial z} + q(x,y,z) = 0.0 \quad \text{(Equation B-1)}$$

Moreover, let the reservoir be divided into non-equal grids in all directions as indicated and represented mathematically by:

$$\Delta x_i, i=1, N_x$$
$$\Delta y_i, i=1, N_y$$
$$\Delta z_k, k=1, N_z$$

Furthermore, let the well be completed at layers $j=1, N_c$, with known flow rates $q_j$, $j=1, N_c$, as is known and understood by those skilled in the art. The material, or volume, balance for grid block cells (i, j, k), can be mathematically indicated or represented as the following one dimensional linear equation:

$$T_{x_{i-1/2,j,k}}(\Phi_B - \Phi_{i,j,k}) + T_{x_{i+1/2,j,k}}(\Phi_B - \Phi_{i,j,k}) + T_{y_{i,j-1/2,k}}(\Phi_B - \Phi_{i,j,k}) + T_{y_{i,j+1/2,k}}(\Phi_B - \Phi_{i,j,k}) + T_{z_{i,j,k-1}}(\Phi_{i,j,k-1} - \Phi_{i,j,k}) + T_{z_{i,j,k+1}}(\Phi_{i,j,k+1} - \Phi_{i,j,k}) - q_{i,j,k} = 0.0 \quad \text{(Equation B-2)}$$

Rearranging Equation (B2) above, and taking into consideration the fact that the well is located at the areal location (i, j) and that there is only flow at the vertical index, k, such that $q_{i,j,k} = q_k$, Equation (B-2) can be indicated or represented as:

$$T_{z_{i,j,k-1}} \Phi_{i,j,k-1} - \left(T_{x_{i-1/2,j,k}} + T_{x_{i+1/2,j,k}} + T_{y_{i,j-1/2,k}} + T_{y_{i,j+1/2,k}}\right)\Phi_{i,j,k} + T_{z_{i,j,k+1}} \Phi_{i,j,k+1} =$$
$$q_K - \left(T_{x_{i-1/2,j,k}} + T_{x_{i+1/2,j,k}} + T_{y_{i,j-1/2,k}} + T_{y_{i,j+1/2,k}}\right)\Phi_B \quad \text{(Equation B-3)}$$

$$k = 1, N_Z$$
$$i = 1, N_x$$
$$j = 1, N_y$$

$$T_{z,i,j,K-1} = \frac{(\Delta z_{k-1} + \Delta z_k)(k_{z,k-1} k_{z,k})}{\Delta z_k k_{z,k-1} + \Delta z_{k-1} k_k} \quad \text{(Equation B-4)}$$

$$T_{x_{i-1/2,j,k}} = \frac{(\Delta x_{i-1} + \Delta x_i)(k_{x,i-1,j,k} k_{x,i,j,k})}{\Delta x_i k_{x,i-1,j,k} + \Delta x_{i-1} k_{x,i,j,k}} \quad \text{(Equation B-5)}$$

$$T_{y_{i,j-1/2,k}} = \frac{(\Delta y_{j-1} + \Delta y_j)(k_{y,i,j-1,k} k_{y,i,j,k})}{\Delta y_j k_{y,i,j-1,k} + \Delta y_{j-1} k_{y,i,j,k}} \quad \text{(Equation B-6)}$$

The other transmissibilities in Equations (B-3) to (B-6) are obtained using Harmonic averages of the permeabilities for non-equal grid sizes, as known and understood by those skilled in the art.

Equation (B-3) can be advantageously abbreviated as a linear system in one dimension with unknown $\Phi$:

$$A_K \Omega_{k-1} + B_k \Omega_k + C_k \Omega_{k+1} = D_k$$

$$k=1, N_z \quad \text{(Equation B-7)}$$

$$A_k = T_{z_{i,j,k-1}} \quad \text{(Equation B-8)}$$

$$B_k = -(T_{x_{i-1/2,j,k}} + T_{x_{i+1/2,j,k}} + T_{y_{i,j-1/2,k}} + T_{y_{i,j+1/2,k}} + T_{z_{i,j,k-1}} + T_{z_{i,j,k}}) \quad \text{(Eq. B-9)}$$

$$C_k = T_{z_{i,j,k+1}} \quad \text{(Equation B-10)}$$

$$D_k = q_k - (T_{x_{i-1/2,j,k}} + T_{x_{i+1/2,j,k}} + T_{y_{i,j-1/2,k}} + T_{y_{i,j+1/2,k}})\Phi_B \quad \text{(Equation B-11)}$$

Boundary Conditions:
a. Top of the Well, z=0, Assuming Well Location is at Coordinate (i,j)

Because there is no flow at this boundary condition, a no flow boundary condition can be indicated or represented mathematically as $\partial \Phi / \partial z = 0$. Accordingly:

$$A_1 = 0.0, \quad \text{(Equation B-12)}$$

$$B_1 = -(T_{x_{i-1/2,j,1}} + T_{x_{i+1/2,j,1}} + T_{y_{i,j-1/2,1}} + T_{y_{i,j+1/2,1}} + T_{z_{i,j,1}}) \quad \text{(Equation B-13)}$$

$$c_1 = T_{z_{i,j,1}} \quad \text{(Equation B-14)}$$

$$d_1 = q_1 - (T_{x_{i-1/2,j,1}} + T_{x_{i+1/2,j,1}} + T_{y_{i,j-1/2,1}} + T_{y_{i,j+1/2,1}})\Phi_B \quad \text{(Equation B-15)}$$

b) At the Bottom of the Well, z=H, Assuming Well Location is at Coordinate (i,j)

Similarly, because there is no flow at this boundary condition, a no flow boundary condition can be indicated or represented mathematically as $$\frac{\partial \Phi}{\partial z} = 0.$$

Accordingly:

$$A_{N_z} = T_{z_{i,j,N_z-1}} \quad \text{(Equation B-17)}$$

$$B_{N_z} = -\begin{pmatrix} T_{x_{i-1/2,j,N_z}} + T_{x_{i+1/2,j,N_z}} + \\ T_{y_{i,j-1/2,N_z}} + T_{y_{i,j+1/2,N_z}} + T_{z_{i,j,N_z-1}} \end{pmatrix} \quad \text{(Equation B-18)}$$

$$C_{N_z} = 0. \quad \text{(Equation B-19)}$$

$$D_{N_z} = q_{N_z} - \begin{pmatrix} T_{x_{i-1/2,j,N_z}} + T_{x_{i+1/2,j,N_z}} + \\ T_{y_{i,j-1/2,N_z}} + T_{y_{i,j+1/2,N_z}} \end{pmatrix}\Phi_B \quad \text{(Equation B-20)}$$

$$WI_k = \frac{2\pi K_{xy}^{\bar{k}} h_P}{\ln\left(\frac{r_{o,3D}}{r_W}\right)} \underbrace{\left[1 + 7\sqrt{\frac{r_w}{2h_P}\cos\left(\frac{\pi}{2}\frac{h_P}{H}\right)}\right]}_{f_P} = \frac{2\pi k_{xy}^{\bar{k}} h_P}{\ln\left(\frac{r_{o,3D}}{r_w}\right)} f_P \quad \text{(Equation B-24)}$$

In the above described equations, according to various exemplary embodiments of the present invention, the inner boundary condition, i.e., the rate specification $\{q_1, q_2, \ldots q_{N_z}\}$ needs to be input such as $\{0, q_2, .0, q_4, q_5, 0., 0, \ldots q_{N_z}\}$ or any other specified set as is known and understood by those skilled in the art. Moreover, Equation (B-7), with the boundary conditions as indicated or represented by Equations (B-13) through (B-20), forms a tridiagonal set of equations which can be advantageously solved by the Thomas algorithm for $\Phi_k$, k=1, $N_z$, as known and understood by those skilled in the art.

Next, a generalized expression for the equivalent well block radius for three dimensional flow is derived using Equation (B-7). Such a generalized expression for an equivalent well block radius for three dimensional flow can beneficially be indicated or represented mathematically as:

$$r_{o,3D,k} = \Delta xe^{-\frac{\pi f_P}{2 + \frac{1}{2}\left[\frac{T_{z_{k-1/2}}}{T_{x_{k-1/2}}}\left(\frac{\Phi_{k-1}-\Phi_k}{\Phi_B-\Phi_k}\right) + \frac{T_{z_{k+1/2}}}{T_{x_{k+1/2}}}\left(\frac{\Phi_{k+1}-\Phi_k}{\Phi_B-\Phi_k}\right)\right]}} \quad \text{(Equation B-21)}$$

Advantageously, the equivalent well block radius for three dimensional flow calculated by Equation B-21 is the most general case which includes any reservoir heterogeneity and an equal grid size in all directions.

c. Pressure Specified Well Bore Potential $\Phi_{wf}$

To determine a pressure specified well bore potential, indicated or represented by $\Phi_{wf}$, according to an exemplary embodiment of the present invention, the mathematical expressions $A_k$, $C_k$ can be indicated or represented by Equation (B-8) and Equation (B-10), respectively. Furthermore, the mathematical expressions $B_k$, $D_k$ can beneficially be indicated or represented mathematically as:

$$B_k = -\begin{pmatrix} T_{x_{i-1/2,j,N_z}} + T_{x_{i+1/2,j,N_z}} + T_{y_{i,j-1/2,N_z}} + \\ T_{y_{i,j+1/2,N_z}} + T_{z_{i,j,N_z-1}} + WI_k \end{pmatrix} \quad \text{(Equation B-22)}$$

$$D_k = \begin{pmatrix} T_{x_{i-1/2,j,k}} + T_{x_{i+1/2,j,k}} + \\ T_{y_{i,j-1/2,k}} + T_{y_{i,j+1/2,k_k}} \end{pmatrix}\Phi_B - WI_k \Phi_{wf} \quad \text{(Equation B-23)}$$

Equations (B-22) and (B-23) apply for completions k where there is a completion such as $\{0, WI_2, .0, WI_4, WI_5, 0., 0, \ldots WI_{N_z}\}$, where and where $\bar{k}_{xy} = \sqrt{\bar{k}_x \bar{k}_y}$, and $\bar{k}_x$ indicates or represents the harmonic averaged permeability among blocks i−1, i, and i+1, as is known and understood by those skilled in the art. Similarly, $\bar{k}_y$ indicates or represents the harmonic average for j−1, j, and j+1.

Because the calculations for such a numerical solution, as presented in this Appendix B and according to various exemplary embodiments of the present invention involve $r_{o,3D}$ in the coefficient matrix used in Equation (B-22) and Equation (B-23), the following procedure, according to various exemplary embodiments of the present invention, can be advantageously used to numerically determine the perforation index for a heterogeneous reservoir with a non-equal grid: (1) make an initial estimate of $r_{o,3d,k}^{iter} = 0.2 \, \Delta X_i$; (2) calculate $WI_k$ for the perforated grid blocks k using Equation (B-24); (3) form the coefficients of the tridiagonal system represented by Equation (B-7); (4) solve Equation (B-7) for $\Phi_k$=1, $N_z$; (5) calculate $r_{o,3d,k}^{iter+1}$ using Equation (B-21); (6) determine whether $\|r_{o,3d,k}^{iter+1} - r_{o,3d,k}^{iter}\| \leq \epsilon$, otherwise set $r_{o,3d,k}^{iter} = r_{o,3d,k}^{iter+1}$; and (7) repeat steps 2 through 6, above, until $\|r_{o,3d,k}^{iter+1} - r_{o,3d,k}^{iter}\| \leq \epsilon$.

APPENDIX C

This Appendix C presents a mathematical proof, as is known and understood by those skilled in the art, beneficially proving that the fluid potential for a grid block cell k positioned within a coordinate grid block, indicated or represented by $\Phi_k$, resides on (i.e., is located at) the three dimensional equivalent well block radius for the grid block cell k, indicated or represented by $r_{o,3D}$. Specifically, suppose, for example, that there is a well formation with a plurality of grid block cells within the well formation collectively forming a coordinate grid block. In such a case, according to an exemplary embodiment of the present invention, the flow from the grid block cells positioned on the outer layers of the well formation to the wellbore with specified potential at an external radius Δx into the wellbore with a specified flowing well potential $\Phi_{wf}$ at $r_w$ with a perforated thickness Δz (out of a total formation thickness H) can be indicated or represented by:

$$q_k = 2\pi k_x \Delta z \left[1 + 7\sqrt{\frac{r_w}{2\Delta z}\cos\left(\frac{\pi}{2}\frac{\Delta z}{H}\right)}\right]\frac{(\Phi_B - \Phi_{wf})}{\ln\left(\frac{\Delta x}{r_w}\right)} \quad \text{(Equation C-1)}$$

Equation (C-1), above, is known as Muskat's equation by those skilled in the art. Solving for $\Phi_{wf}$ from Equation (C-1), a solution for $\Phi_{wf}$ can be indicated or represented mathematically by:

$$\Phi_{wf} = \Phi_B - \frac{q_k \ln\left(\frac{\Delta x}{r_w}\right)}{2\pi k_x \Delta z f_P} \quad \text{(Equation C-2)}$$

Additionally, Muskat's equation, as is it known by those skilled in the art, can beneficially be written for the region ($r_w$, $r_{o,3D}$). By letting $q_k^{(1)}$ be the flow rate, the Muskat's equation can be indicated or represented as:

$$q_k^{(1)} = 2\pi k_x \Delta z f_P \frac{(\Phi_k - \Phi_{wf})}{\ln\left(\frac{r_{o,3D}}{r_w}\right)} \quad \text{(Equation C-3)}$$

Further by substituting $\Phi_{wf}$ as defined by Equation (C-2) into Equation (C-3), another mathematical expression for flow rate can be generated, indicated or represented by:

$$q_k^{(1)} = 2\pi k_x \Delta z f_P \frac{1}{\ln\left(\frac{r_{o,3D}}{r_w}\right)}\left(\Phi_k - \Phi_B + \frac{q_k \ln\left(\frac{\Delta x}{r_w}\right)}{2\pi k_k \frac{\Delta z}{H} f_P}\right) \quad \text{(Equation C-4)}$$

$$q_k^{(1)} = 2\pi k_x \Delta z f_P \frac{1}{\ln\left(\frac{r_{o,3D}}{r_w}\right)}(\Phi_k - \Phi_B) + \frac{q_k \ln\left(\frac{\Delta x}{r_w}\right)}{\ln\left(\frac{r_{o,3D}}{r_w}\right)} \quad \text{(Equation C-5)}$$

Moreover, by further rearranging the terms in Equation (C-5), according to various embodiments of the present invention, the following mathematical equality of multiple variables can be generated:

$$q_k^{(1)} - \frac{q_k \ln\left(\frac{\Delta x}{r_w}\right)}{\ln\left(\frac{r_{o,3D}}{r_w}\right)} = 2\pi k_x \Delta z f_P \frac{1}{\ln\left(\frac{r_{o,3D}}{r_w}\right)}(\Phi_k - \Phi_B) \quad \text{(Equation C-6)}$$

If, for example, $q_k^{(1)} = q_k = q$ (i.e., which we assume for the purposes of this proof as is known and understood by those skilled in the art) then the following mathematical expressions result:

$$\left(1 - \frac{\ln\left(\frac{\Delta x}{r_w}\right)}{\ln\left(\frac{r_{o,3D}}{r_w}\right)}\right)q = 2\pi k_x \Delta z f_P \frac{1}{\ln\left(\frac{r_{o,3D}}{r_w}\right)}(\Phi_k - \Phi_B) \quad \text{(Equation C-7)}$$

$$\left(\frac{\ln\left(\frac{r_{o,3D}}{r_w}\right) - \ln\left(\frac{\Delta x}{r_w}\right)}{\ln\left(\frac{r_{o,3D}}{r_w}\right)}\right)q = 2\pi k_x \Delta z f_P \frac{1}{\ln\left(\frac{r_{o,3D}}{r_w}\right)}(\Phi_k - \Phi_B) \quad \text{(Equation C-8)}$$

$$\left(\frac{\ln\left(\frac{r_{o,3D}}{\Delta x}\right)}{\ln\left(\frac{r_{o,3D}}{r_w}\right)}\right)q = 2\pi k_x \Delta z f_P \frac{1}{\ln\left(\frac{r_{o,3D}}{r_w}\right)}(\Phi_k - \Phi_B) \quad \text{(Equation C-9)}$$

Solving for q, the following mathematical expression of multiple variables results:

$$q = 2\pi k_x \Delta z f_P \frac{1}{\ln \frac{\Delta x}{r_{o,3D}}}(\Phi_B - \Phi_k) \quad \text{(Equation C-10)}$$

Notably, the mathematical equation indicated or represented by Equation (C-10) is the same as the mathematical equation indicated or represented by Equation (C-1). That is, $q = q_k$. Therefore, the flow rate is the same from Δx to $r_{o,3D}$ and also is the same from $r_{o,3D}$ to $r_w$. Therefore, $\Phi_k$ is located at $r_{o,3D}$.

The invention claimed is:

1. An equivalent well block radius determiner machine to determine an equivalent well block radius of a perforated well in a petroleum reservoir simulator, the equivalent well block radius determiner machine comprising:
   a computer having at least a processor, memory, and a database storing simulated well formation data received from a plurality of petroleum reservoir sensors to thereby define a simulated well formation;
   a partial penetration factor determiner computer readable program product stored in a tangible computer readable storage medium and including instructions that, when executed by the computer, cause the computer to perform the operation of determining a partial penetration factor for one of one or more well perforations of the simulated well formation responsive to a total quantity count of the one or more well perforations and a ratio of a collective vertical height of the one or more well perforations and a total thickness of the simulated well formation;
   a vertical flow correction factor computer readable program product stored in a tangible computer readable storage medium and including instructions that, when executed by the computer, cause the computer to perform the operation of determining a vertical flow correction factor for the one of the one or more well perforations responsive to the total quantity count of the one or more well perforations and responsive to determining a location of the one of the one or more well perforations within the simulated well formation; and
   an equivalent well block radius determiner computer readable program product stored in a tangible computer readable storage medium and including instructions that, when executed by the computer, cause the computer to perform the operation of determining an equivalent well block radius of the one of the one or more well perforations responsive to the partial penetration factor computer readable program product and the vertical flow correction factor computer readable program product.

2. The equivalent well block radius determiner machine as defined in claim 1, wherein the equivalent well block radius of the one of the one or more well perforations determined by the equivalent well block radius determiner computer program product is based on an exponential function of a ratio of a partial penetration factor for the one of the one or more well perforations and a vertical flow correction factor for the one of the one or more well perforations.

3. The equivalent well block radius determiner machine as defined in claim 1,
wherein the computer implemented method further includes a grid block constructor computer readable program product stored in a tangible computer readable storage medium and including instructions that, when executed by the computer, cause the computer to perform the operation of constructing a coordinate grid block over the simulated well formation having a plurality of grid block cells; and
wherein each of the one or more well perforations of the simulated well formation are each located within a different one of the plurality of grid block cells to thereby define one or more perforated grid block cells.

4. The equivalent well block radius determiner machine as defined in claim 3, wherein the equivalent well block radius of the one of the one or more well perforations determined by the equivalent well block radius determiner computer program product is based on a product of a horizontal length of a perforated grid block cell and the exponential function of a ratio of a partial penetration factor for the one of the one or more well perforations and a vertical flow correction factor for the one of the one or more well perforations.

5. The equivalent well block radius determiner machine as defined in claim 4,
wherein the simulated well formation is a three dimensional simulated well formation;
wherein the coordinate grid block is a three dimensional coordinate grid block having a plurality of three dimensional grid block cells; and
wherein the equivalent well block radius determined by the equivalent radius determiner computer readable program product accounts for both horizontal and vertical flow of the one of the one or more well perforations.

6. The equivalent well block radius determiner machine as defined in claim 5, wherein the grid block constructor computer readable program product further includes instructions that, when executed by the computer, cause the computer to perform the operation of superimposing a uniform grid positioned over the three dimensional simulated well formation in an areal direction and a uniform grid positioned over the three dimensional simulated well formation in a vertical direction to thereby create a three dimensional uniform coordinate grid block including a plurality of uniform grid block cells each having equal dimensions in the areal direction and constant thickness in the vertical direction.

7. The equivalent well block radius determiner machine as defined in claim 6,
wherein the three dimensional uniform coordinate grid block includes a well penetrating through the three dimensional uniform coordinate grid block;
wherein the simulated well formation data includes a radius of the well penetrating through the three dimensional uniform coordinate grid block and a vertical height of the one of the one or more well perforations;
wherein the partial penetration factor for the one of the one or more well perforations is determined responsive to a vertical height of a grid block cell, a total thickness of the three dimensional uniform coordinate grid block, the radius of the well penetrating through the three dimensional uniform coordinate grid block, and the vertical height of the one of the one or more well perforations; and
wherein the vertical flow correction factor for the one of the one or more well perforations is determined responsive to a vertical thickness of a grid block cell, a horizontal length of a grid block cell, and a depth of each of the one or more perforated grid block cells and each of the plurality of grid block cells positioned adjacent to each of the one or more perforated grid block cells within the three dimensional uniform coordinate grid block.

8. A non-transitory tangible computer readable medium having a computer program stored thereof and including instructions that when executed by a computer cause the computer to perform the operations of:
constructing a coordinate grid block, having a plurality of grid block cells, over a simulated well formation generated responsive to petroleum reservoir simulation data received from a plurality of petroleum reservoir sensors, the simulated well formation having one or more well perforations, each being located in one or more perforated grid block cells;
determining, responsive to constructing the coordinate grid block, an equivalent well block radius of one of the one or more perforated grid block cells based on a product of a horizontal length of a perforated grid block cell and the exponential function of a ratio of a partial penetration factor for the one of the one or more perforated grid block cells and a vertical flow correction factor for the one of the one or more grid block cells, the partial penetration factor being based on a total quantity count of the one or more perforated grid block cells and a ratio of a collective vertical height of the one or more well perforations and a total thickness of the three dimensional coordinate grid block and the vertical flow correction factor being based on the total quantity count of the one or more well perforations and a three dimensional coordinate location of the one of the one or more perforated grid block cells positioned within the three dimensional coordinate grid block.

9. The non-transitory tangible computer readable medium as defined in claim 8,
wherein the simulated well formation is a three dimensional simulated well formation;
wherein the coordinate grid block is a three dimensional coordinate grid block having a plurality of three dimensional grid block cells; and
wherein the equivalent well block radius accounts for both horizontal and vertical flow of the one of the one or more well perforations.

10. The non-transitory tangible computer readable medium as defined in claim 9,
wherein the coordinate grid block includes a well penetrating through the coordinate grid block;
wherein the petroleum reservoir simulation data includes a radius of the well penetrating through the coordinate grid block and a vertical height of the one of the one or more well perforations positioned within the one of the one or more perforated grid block cells;
wherein the partial penetration factor for the one of the one or more perforated grid block cells is determined based on the radius of the well penetrating through the coordinate grid block and the vertical height of the one of the one or more well perforations, and responsive to determining a vertical height of the one of the one or more perforated grid block cells and a total thickness of the coordinate grid block; and wherein the vertical flow correction factor for the one of the one or more perforated grid block cells is determined responsive to determining a vertical thickness of the one of the one or more perforated grid block cells, a horizontal length of a grid block cell, and a depth of each of the one or more perforated grid block cells and each of the plurality of grid block cells positioned adjacent to each of the one or more perforated grid block cells within the three dimensional uniform coordinate grid block.

11. The non-transitory tangible computer readable medium as defined in claim 10, wherein the computer implemented method further includes a grid block constructor computer readable program product stored in a tangible computer readable storage medium and including instructions that, when executed by the computer, cause the computer to perform the operation of constructing a coordinate grid block over the simulated well formation having a plurality of grid block cells; and wherein each of the one or more well perforations of the simulated well formation are each located within a different one of the plurality of grid block cells to thereby define one or more perforated grid block cells.

12. The non-transitory tangible computer readable medium as defined in claim 11, wherein the grid block constructor computer readable program product further includes instructions that, when executed by the computer, cause the computer to perform the operation of superimposing a uniform grid positioned over the three dimensional simulated well formation in an areal direction and a uniform grid positioned over the three dimensional simulated well formation n a vertical direction to thereby create a three dimensional uniform coordinate grid block including a plurality of uniform grid block cells each having equal dimensions in the areal direction and constant thickness in the vertical direction.

13. A three dimensional equivalent well block radius determiner machine to determine a three dimensional equivalent well block radius of a perforation of a well with three dimensional flow in a finite difference petroleum reservoir simulator, the three dimensional equivalent well block radius determiner machine comprising:

a database storing a simulated well formation generated responsive to petroleum reservoir simulation data received from a plurality of petroleum reservoir sensors, the simulated well formation including one or more well perforations positioned within;

a computer adapted to be in communication with the database and having at least a processor and memory;

a grid block constructor computer readable program product stored in a tangible computer readable storage medium and including instructions that, when executed by the computer, cause the computer to perform the operation of constructing a coordinate grid block over the simulated well formation stored in the database;

a partial penetration factor determiner computer readable program product stored in a tangible computer readable storage medium and including instructions that, when executed by the computer, cause the computer to perform the operation of determining a partial penetration factor for one of the one or more well perforations responsive to a total quantity count of the one or more well perforations and a ratio of a collective vertical height of the one or more well perforations and a total thickness of the coordinate grid block;

a vertical flow correction factor computer readable program product stored in a tangible computer readable storage medium and including instructions that, when executed by the computer, cause the computer to perform the operation of determining a vertical flow correction factor for one of the one or more well perforations responsive to the total quantity count of the one or more well perforations and responsive to determining a coordinate location of the one of the one or more well perforations within the coordinate grid block; and a three dimensional equivalent well block radius determiner computer readable program product stored in a tangible computer readable storage medium and including instructions that, when executed by the computer, cause the computer to perform the operation of determining a three dimensional equivalent well block radius of the one of the one or more well perforations responsive to determining the partial penetration factor and the vertical flow correction factor.

14. The three dimensional equivalent well block radius determiner machine as defined in claim 13, wherein the grid block constructor computer readable program product further includes instructions that, when executed by the computer, cause the computer to perform the operation of superimposing a uniform grid positioned over the three dimensional simulated well formation, stored in the database, in an areal direction and a uniform grid positioned over the three dimensional simulated well formation, stored in the database, in a vertical direction to thereby create a three dimensional uniform coordinate grid block including a plurality of uniform grid block cells each having equal dimensions in the areal direction and constant thickness in the vertical direction;

wherein the three dimensional equivalent well block radius determiner machine further includes a well perforation mapping computer readable program product stored in a tangible computer readable storage medium and including instructions that, when executed by the computer, cause the computer to perform the operation of mapping each of the one or more well perforations to one of the plurality of uniform grid block cells to thereby define one or more perforated grid block cells.

15. The three dimensional equivalent well block radius determiner machine as defined in claim 14, wherein each of the plurality of uniform grid block cells has a uniform vertical height, thereby defining a uniform vertical height of a grid block cell, and a uniform horizontal length, thereby defining a uniform horizontal length of a grid block cell;

wherein the three dimensional uniform coordinate grid block includes a well penetrating through the three dimensional uniform coordinate grid block; and wherein the three dimensional well formation simulation data includes a radius of the well penetrating through the three dimensional uniform coordinate grid block and a vertical height of the one of the one or more well perforations positioned within the one of the one or more perforated grid block cells.

16. The three dimensional equivalent well block radius determiner machine as defined in claim 15, wherein the three dimensional well block radius determiner machine further includes a data initializer computer readable program product stored in a tangible computer readable storage medium and including instructions that, when executed by the computer, cause the computer to perform the operations of:
  determining the uniform vertical height of a grid block cell,
  determining the uniform horizontal length of a grid block cell,
  determining a total thickness of the three dimensional uniform coordinate grid block,
  determining a horizontal permeability of the three dimensional simulated well formation,
  determining a vertical permeability of the three dimensional simulated well formation,
  identifying a plurality of uniform grid block cells positioned adjacent to the one of the one or more perforated grid block cells, to thereby define a plurality of adjacent uniform grid block cells, and
  mapping a depth of the one of the one or more perforated grid block cells and each of the plurality of adjacent uniform grid block cells within the three dimensional uniform coordinate grid block.

17. The three dimensional equivalent well block radius determiner machine as defined in claim 16,
  wherein the partial penetration factor for the one of the one or more well perforations is determined responsive to determining the uniform vertical height of a grid block cell, the total thickness of the three dimensional uniform coordinate grid block, and responsive to the radius of the well penetrating through the three dimensional uniform coordinate grid block and the vertical height of the one of the one or more well perforations; and
  wherein the vertical flow correction factor for the one of the one or more perforated grid block cells is determined responsive to determining the uniform vertical thickness of a grid block cell and the uniform horizontal length of a grid block cell and responsive to mapping the depth of each of the one or more perforated grid block cells and each of the plurality of adjacent uniform grid block cells within the three dimensional uniform coordinate grid block.

18. The three dimensional equivalent well block radius determiner machine as defined in claim 17,
  wherein the one or more perforated grid block cells is one perforated grid block cell housing one well perforation;
  wherein the three dimensional uniform coordinate grid block includes a plurality of top three dimensional coordinate locations defining a top of the three dimensional uniform coordinate grid block, a plurality of bottom three dimensional coordinate locations defining a bottom of the three dimensional uniform coordinate grid block, and a plurality of middle three dimensional coordinate locations defining locations positioned in between the plurality of top three dimensional coordinate locations and the plurality of bottom three dimensional coordinate locations, to thereby define a middle of the three dimensional uniform coordinate grid block;
  wherein the three dimensional equivalent well block radius determiner computer readable program product further includes instructions that, when executed by the computer, cause the computer to perform the operation of determining whether the one of the one or more perforated grid block cells is positioned within the three dimensional uniform coordinate grid block at the top of the three dimensional uniform coordinate grid block, the bottom of the three dimensional uniform coordinate grid block, or the middle of the three dimensional uniform coordinate grid block; and
  wherein the vertical flow correction factor for the one of the one or more perforated grid block cells is determined responsive to the uniform vertical height of a grid block cell, the uniform horizontal length of a grid block cell, the horizontal permeability of the three dimensional simulated well formation, the vertical permeability of the three dimensional simulated well formation, responsive to mapping the plurality of adjacent uniform grid block cells, and responsive to determining whether the one of the one or more perforated grid block cells is positioned at the top of the three dimensional uniform coordinate grid block, the bottom of the three dimensional uniform coordinate grid block, or the bottom of the three dimensional grid block.

19. A three dimensional equivalent well block radius determiner machine to determine a three dimensional equivalent well block radius of a perforated grid block cell, with three dimensional flow, of a three dimensional coordinate grid block constructed over a three dimensional simulated well formation in a finite difference petroleum reservoir simulator, the three dimensional equivalent well block radius determiner machine comprising:
  a first database storing petroleum reservoir simulation data received from a plurality of petroleum reservoir sensors adapted to receive data describing an anisotropic porous media well formation located within a petroleum reservoir;
  a second database storing a three dimensional simulated well formation generated responsive to the well formation simulation data stored in the first database;
  a computer adapted to be in communication with the first and second databases and having at least a processor and memory;
  a simulator initializer computer readable program product stored in a tangible computer readable storage medium and including instructions that, when executed by the computer, cause the computer to perform the operations of:
    constructing a three dimensional coordinate grid block, having a plurality of grid block cells, over the three dimensional simulated well formation stored in the second database, the three dimensional simulated well formation including one or more well perforations, and
    mapping, responsive to constructing the three dimensional coordinate grid block, each of the one or more well perforations to one of the plurality of grid block cells to thereby define one or more perforated grid block cells;
  a three dimensional equivalent well block radius determiner computer readable program product stored in a tangible computer readable storage medium and including instructions that, when executed by the computer, cause the computer to perform the operations of:
    determining, responsive to constructing the three dimensional coordinate grid block by the simulator initializer computer readable program product, a partial penetration factor for one of the one or more perforated grid block cells based on a total quantity count of the one or more well perforations and a ratio of a collective vertical height of the one or more well perforations and a total thickness of the three dimensional coordinate grid block,
    determining, responsive to constructing the three dimensional coordinate grid block and mapping each of the one or more well perforations to one of the plurality of grid block cells, a vertical flow correction factor for the one of the one or more perforated grid block cells based on the total quantity count of the one or more perforated grid block cells and a three dimensional coordinate location of the one of the one or more perforated grid block cells within the three dimensional coordinate grid block, and determining, responsive to determining the partial penetration factor and the vertical flow correction factor for the one of the one or more perforated grid block cells, a three dimensional equivalent well block radius of the one of the one or more perforated grid block cells.

20. The three dimensional equivalent well block radius determiner machine as defined in claim 19, wherein the three dimensional coordinate grid block includes a well penetrating through the three dimensional coordinate grid block;

wherein each of the plurality of grid block cells has a uniform vertical height, thereby defining a uniform vertical height of a grid block cell, and a uniform horizontal length, thereby defining a uniform horizontal length of a grid block cell;

wherein the petroleum reservoir simulation data stored in the first database includes a radius of the well penetrating through the three dimensional coordinate grid block and a vertical height of the one of the one or more well perforations positioned within the one of the one or more perforated grid block cells;

wherein the simulator initializer computer readable program product further includes instructions that, when executed by the computer, cause the computer to perform the operations of:

determining the uniform vertical height of a grid block cell;

determining the uniform horizontal length of a grid block cell;

determining a total thickness of the three dimensional coordinate grid block, determining a horizontal permeability of the three dimensional simulated well formation, determining a vertical permeability of the three dimensional simulated well formation, identifying a plurality of grid block cells positioned adjacent to the one of the one or more perforated grid block cells, to thereby define a plurality of adjacent grid block cells, and mapping a depth of the one of the one or more perforated grid block cells and each of the plurality of adjacent grid block cells within the three dimensional coordinate grid block.

21. The three dimensional equivalent well block radius determiner machine as defined in claim 20, wherein the partial penetration factor for the one of the one or more perforated grid block cells is determined responsive to determining the uniform vertical height of a grid block cell, the total thickness of the three dimensional coordinate grid block, and responsive to the radius of the well penetrating through the three dimensional coordinate grid block and the vertical height of the one of the one or more well perforations; and wherein the vertical flow correction factor for the one of the one or more perforated grid block cells is determined responsive to determining the uniform vertical thickness of a grid block cell and the uniform horizontal length of a grid block cell and responsive to mapping the depth of each of the one or more perforated grid block cells and each of the plurality of adjacent grid block cells within the three dimensional coordinate grid block.

22. The three dimensional equivalent well block radius determiner machine as defined in claim 21, wherein the one or more perforated grid block cells is one perforated grid block cell housing one well perforation;

wherein the three dimensional coordinate grid block includes a plurality of top three dimensional coordinate locations defining a top of the three dimensional coordinate grid block, a plurality of bottom three dimensional coordinate locations defining a bottom of the three dimensional coordinate grid block, and a plurality of middle three dimensional coordinate locations defining locations positioned in between the plurality of top three dimensional coordinate locations and the plurality of bottom three dimensional coordinate locations, to thereby define a middle of the three dimensional coordinate grid block;

wherein the three dimensional equivalent well block radius determiner computer readable program product further includes instructions that, when executed by the computer, cause the computer to perform the operation of determining whether the one of the one or more perforated grid block cells is positioned within the three dimensional coordinate grid block at the top of the three dimensional coordinate grid block, the bottom of the three dimensional coordinate grid block, or the middle of the three dimensional coordinate grid block; and wherein the vertical flow correction factor for the one of the one or more perforated grid block cells is determined responsive to the uniform vertical height of a grid block cell, the uniform horizontal length of a grid block cell, the horizontal permeability of the three dimensional simulated well formation, the vertical permeability of the three dimensional simulated well formation, responsive to mapping the plurality of adjacent grid block cells, and responsive to determining whether the one of the one or more perforated grid block cells is positioned at the top of the three dimensional coordinate grid block, the bottom of the three dimensional coordinate grid block, or the bottom of the three dimensional grid block.

23. The three dimensional equivalent well block radius determiner machine as defined in claim 19, wherein the three dimensional coordinate grid block constructed by the simulator initializer computer readable program product is constructed by superimposing a uniform grid positioned over the three dimensional simulated well formation, stored in the second database, in an areal direction and a uniform grid positioned over the three dimensional simulated well formation, stored in the second database, in a vertical direction where each of the resulting plurality of grid block cells has equal dimensions in the areal direction and constant thickness in the vertical direction.

24. The three dimensional equivalent well block radius determiner machine as defined in claim 19, wherein each of the plurality of grid block cells has equal dimensions in both the areal direction and the vertical direction such that each of the plurality of grid block cells is a square grid block cell;

wherein the simulator initialize computer readable program product further includes instructions that, when executed by the computer, cause the computer to perform the operations of:

generating a three dimensional simulated well formation responsive to the well formation simulation data stored in the first database, counting the one or more well perforations positioned within the three dimensional coordinate grid block to thereby determine the total quantity count of the one or more perforated grid block cells, and determining a three dimensional coordinate location of the one of the one or more perforated grid block cells positioned within the three dimensional coordinate grid block; and wherein the three dimensional equivalent well block radius determiner machine further includes a well perforation rate determiner computer readable program product stored in a tangible computer readable storage medium and including instructions that, when executed by the computer, cause the computer to perform the operations of:

determining a perforation index for the one of the one or more perforated grid block cells responsive to determining the three dimensional equivalent well block radius for the one of the one or more perforated grid block cells, and determining a perforation rate for the one of the one or more perforated grid block cells responsive to determining the perforation index for the one of the one or more perforated grid block cells.

25. A computer readable program product stored in a non-transitory tangible computer readable storage medium and including instructions that when executed by a computer cause the computer to perform the operations of:

constructing a three dimensional coordinate grid block, having a plurality of grid block cells, over a three dimensional simulated well formation generated responsive to petroleum reservoir simulation data received from a plurality of petroleum reservoir sensors, the three dimensional simulated well formation including one or more well perforations, each of the one or more well perforations being located in one or more perforated grid block cells;

determining, responsive to constructing the three dimensional coordinate grid block, a partial penetration factor for one of the perforated grid block cells based on a total quantity count of the one or more perforated grid block cells and a ratio of a collective vertical height of the one or more well perforations and a total thickness of the three dimensional coordinate grid block;

determining, responsive to constructing the three dimensional coordinate grid block, a vertical flow correction factor for the one of the one or more perforated grid block cells based on the total quantity count of the one or more well perforations and a three dimensional coordinate location of the one of the one or more perforated grid block cells positioned within the three dimensional coordinate grid block; and determining, responsive to determining the partial penetration factor and the vertical flow correction factor for the one of the one or more perforated grid block cells, a three dimensional equivalent well block radius of the one of the one or more perforated grid block cells.

26. The compute readable program product as defined in claim 25, wherein the three dimensional coordinate grid block is constructed responsive to superimposing a uniform grid positioned over the three dimensional simulated well formation in an areal direction and a uniform grid positioned over the three dimensional simulated well formation in a vertical direction where each of the resulting plurality of grid block cells has equal dimensions in the areal direction and constant thickness in the vertical direction.

27. The computer readable program product as defined in claim 26, wherein the computer readable program product further includes instructions, that when executed by the computer, cause the computer to perform the operations of:

counting the one or more well perforations positioned within the three dimensional coordinate grid block to thereby determine the total quantity count of the one or more perforated grid block cells; and mapping a three dimensional coordinate location of the one of the one or more perforated grid block cells positioned within the three dimensional coordinate grid block.

28. The computer readable program product as defined in claim 27, wherein the three dimensional coordinate grid block includes a well penetrating through the three dimensional coordinate grid block;

wherein each of the plurality of grid block cells has a uniform vertical height, thereby defining a uniform vertical height of a grid block cell, and a uniform horizontal length, thereby defining a uniform horizontal length of a grid block cell;

wherein the petroleum reservoir simulation data includes a radius of the well penetrating through the three dimensional coordinate grid block and a vertical height of the one of the one or more well perforations located in the one of the one or more perforated grid block cells;

wherein the computer readable program product further includes instructions, that when executed by the computer, cause the computer to perform the operations of:

determining the uniform vertical height of a grid block cell;

determining the uniform horizontal length of a grid block cell;

determining a total thickness of the three dimensional coordinate grid block;

identifying a plurality of grid block cells positioned adjacent to the one of the one or more perforated grid block cells, to thereby define a plurality of adjacent grid block cells, and mapping a depth of the one of the one or more perforated grid block cells and each of the plurality of adjacent grid block cells positioned within the three dimensional coordinate grid block.

29. The computer readable program product as defined in claim 28, wherein the partial penetration factor for the one of the one or more perforated grid block cells is determined responsive to determining the uniform vertical height of a grid block cell, the total thickness of the three dimensional coordinate grid block, and responsive to the radius of the well penetrating through the three dimensional coordinate grid block and the vertical height of the one of the one or more well perforations;

wherein the vertical flow correction factor for the one of the one or more perforated grid block cells is determined responsive to determining the uniform vertical thickness of a grid block cell and the uniform horizontal length of a grid block cell and responsive to mapping the depth of each of the one or more perforated grid block cells and each of the plurality of adjacent grid block cells positioned within the three dimensional coordinate grid block.

30. The computer readable program product as defined in claim 29, wherein the one or more perforated grid block cells is one perforated grid block cell housing one well perforation;

wherein the three dimensional coordinate grid block includes a plurality of top three dimensional coordinate locations defining a top of the three dimensional coordinate grid block, a plurality of bottom three dimensional coordinate locations defining a bottom of the three dimensional coordinate grid block, and a plurality of middle three dimensional coordinate locations defining locations positioned in between the plurality of top three dimensional coordinate locations and the plurality of bottom three dimensional coordinate locations, to thereby define a middle of the three dimensional coordinate grid block;

wherein the computer readable program product further includes instructions that, when executed by the computer, cause the computer to perform the operation of determining whether the one of the one or more perforated grid block cells is positioned within the three dimensional coordinate grid block at the top of the three dimensional coordinate grid block, the bottom of the three dimensional coordinate grid block, or the middle of the three dimensional coordinate grid block; and wherein the vertical flow correction factor for the one of the one or more perforated square grid block cells is determined responsive to at least the uniform vertical height of a square grid block cell and the uniform horizontal length of a square grid block cell, and responsive to determining whether the one of the one or more perforated square grid block cells is positioned at the top of the three dimensional uniform square coordinate grid block, the bottom of the three dimensional uniform square coordinate grid block, or the bottom of the three dimensional uniform square grid block.

31. The computer readable program product as defined in claim 30, wherein the computer readable program product further includes instructions that, when executed by the computer, cause the computer to perform the operations of:

determining a perforation index for the one of the one or more perforated grid block cells responsive to determining the three dimensional equivalent well block radius for the one of the one or more perforated grid block cells; and determining a perforation rate for the one of the one or more perforated grid block cells responsive to determining the perforation index for the one of the one or more perforated grid block cells.

32. A computer implemented method to determine a three dimensional equivalent well block radius of a perforated square grid block cell, with three dimensional flow, of a three dimensional coordinate grid block constructed over a three dimensional simulated well formation in a finite difference petroleum reservoir simulator, the computer implemented method comprising the steps of:

generating, by a computer in a first computer process, a three dimensional simulated well formation responsive to information received from a plurality of petroleum reservoir sensors adapted to receive well formation simulation data describing an anisotropic porous media well formation located within a petroleum reservoir;

constructing, by the computer in a second computer process, responsive to generating the three dimensional simulated well formation by the computer in the first computer process, a three dimensional uniform square coordinate grid block, having a plurality of square grid block cells over the three dimensional simulated well formation, the three dimensional uniform square coordinate grid block being formed from a superimposition of a uniform grid positioned over the three dimensional simulated well formation in an areal direction and a uniform grid positioned over the three dimensional simulated well formation in a vertical direction such that each of the resulting plurality of square grid block cells has equal dimensions in the areal direction and constant thickness in the vertical direction;

counting, by the computer in a third computer process, a quantity of one or more well perforations positioned within the three dimensional uniform square coordinate grid block constructed by the computer in the second computer process, each of the one or more well perforations being positioned within one of the plurality of square grid block cells to thereby define one or more perforated square grid block cells;

determining, by the computer in a fourth computer process, responsive to counting the quantity of the one or more well perforations by the computer in the third computer process, when the three dimensional uniform square coordinate grid block includes one perforated square grid block cell, a partial penetration factor for the one perforated square grid block cell based on a ratio of a vertical height of the one perforated square grid block cell and a total thickness of the three dimensional uniform square coordinate grid block;

determining, by the computer in a fifth computer process, when the three dimensional uniform square coordinate grid block includes more than one perforated square grid block cells, a partial penetration factor for more than one perforated square grid block cells based on the quantity of well perforations positioned within the three dimensional uniform square coordinate grid block, counted by the computer in the third computer process, and a ratio of a total vertical height of the more than one perforated square grid block cells and a total thickness of the three dimensional uniform square coordinate grid block;

mapping, by the computer in a sixth computer process, responsive to counting the quantity of well perforations by the computer in the third computer process, when the three dimensional uniform square coordinate grid block includes one perforated square grid block cell, a three dimensional coordinate location of the one perforated square grid block cell positioned within the three dimensional uniform square coordinate grid block;

determining, by the computer in a seventh computer process, when the three dimensional uniform square coordinate grid block includes one perforated square grid block cell, a vertical flow correction factor for one perforated square grid block cell responsive to counting the quantity of well perforations by the computer in the third computer process and mapping the three dimensional coordinate location of the perforated square grid block cell positioned within the three dimensional uniform square coordinate grid block by the computer in the sixth computer process;

determining, by the computer in an eighth computer process, when the three dimensional uniform square coordinate grid block includes more than one perforated square grid block cells, a vertical flow correction factor for more than one perforated square grid block cells responsive counting the quantity of well perforations by the computer in the third computer process;

determining, by the computer in a ninth computer process, when the three dimensional uniform square coordinate grid block includes one perforated square grid block cell, a three dimensional equivalent well block radius associated of the one perforated square grid block cell responsive to determining, by the computer, the partial penetration factor for the one perforated square grid block cell in the fourth computer process and the vertical flow correction factor for one perforated square grid block cell in the seventh computer process; and determining, by the computer in a tenth computer process, when the three dimensional uniform square coordinate grid block includes more than one perforated square grid block cells, a three dimensional equivalent well block radius of one of the more than one perforated square grid block cells responsive to determining, by the computer, the partial penetration factor for more than one perforated square grid block cells in the fifth computer process and the vertical flow correction factor for more than one perforated square grid block cells in eighth computer process.

* * * * *